US009852373B2

(12) United States Patent
De Stefano

(10) Patent No.: US 9,852,373 B2
(45) Date of Patent: Dec. 26, 2017

(54) PROPERTIES LINK FOR SIMULTANEOUS JOINT INVERSION

(71) Applicant: WesternGeco LLC, Houston, TX (US)

(72) Inventor: Michele De Stefano, Milan (IT)

(73) Assignee: WESTERNGECO L.L.C., Houston, TX (US)

( * ) Notice: Subject to any disclaimer, the term of this patent is extended or adjusted under 35 U.S.C. 154(b) by 97 days.

(21) Appl. No.: 14/727,630

(22) Filed: Jun. 1, 2015

(65) Prior Publication Data
US 2016/0086079 A1   Mar. 24, 2016

Related U.S. Application Data

(60) Provisional application No. 62/006,634, filed on Jun. 2, 2014.

(51) Int. Cl.
| | |
|---|---|
| *G06N 3/08* | (2006.01) |
| *G06N 7/00* | (2006.01) |
| *G01V 11/00* | (2006.01) |
| *G06N 3/04* | (2006.01) |

(52) U.S. Cl.
CPC .............. *G06N 3/08* (2013.01); *G01V 11/00* (2013.01); *G06N 3/04* (2013.01); *G06N 7/00* (2013.01); *G01V 2210/622* (2013.01); *G01V 2210/64* (2013.01); *G01V 2210/642* (2013.01); *G01V 2210/66* (2013.01)

(58) Field of Classification Search
None
See application file for complete search history.

(56) References Cited

U.S. PATENT DOCUMENTS

| | | | | |
|---|---|---|---|---|
| 5,444,619 A | * | 8/1995 | Hoskins et al. | ........ E21B 49/00 702/14 |
| 6,388,947 B1 | * | 5/2002 | Washbourne | ............ G01V 1/42 367/38 |
| 7,805,250 B2 | | 9/2010 | Colombo et al. | |
| 8,374,974 B2 | * | 2/2013 | Chen et al. | .......... G06K 9/6298 706/8 |
| 2004/0267454 A1 | | 12/2004 | Granjeon | |
| 2008/0015782 A1 | | 1/2008 | Saltzer et al. | |
| 2009/0271118 A1 | * | 10/2009 | Saltzer | ................... G01V 1/306 702/14 |
| 2010/0014384 A1 | | 1/2010 | Colombo et al. | |

(Continued)

FOREIGN PATENT DOCUMENTS

| | | |
|---|---|---|
| CN | 102478668 A * | 5/2012 |
| WO | 2016166228 A1 | 12/2012 |

OTHER PUBLICATIONS

Cigizoglu, H.K. et al. (2006). "Generalized regression neural network in modelling river sediment yield". Advances in Engineering Software 37:2, Feb. 2006, pp. 63-68. doi:10.1016/j.advengsoft.2005.05.002.*

(Continued)

*Primary Examiner* — Stanley K Hill
*Assistant Examiner* — Benjamin Buss

(57) ABSTRACT

A method can include receiving data associated with a geologic environment; based on at least a portion of the data, estimating relationships for multiple properties of the geologic environment; and based at least in part on the relationships, performing simultaneous joint inversion for at least one property of the geologic environment.

18 Claims, 41 Drawing Sheets

(56) References Cited

U.S. PATENT DOCUMENTS

| | | | |
|---|---|---|---|
| 2011/0255371 A1* | 10/2011 | Jing | G01V 1/28 367/73 |
| 2013/0085731 A1 | 4/2013 | De Stefano et al. | |
| 2014/0180593 A1* | 6/2014 | Schmedes | G01V 11/00 702/14 |

OTHER PUBLICATIONS

Van Der Baan, M. et al. (2000). "Neural networks in geophysical applications". Geophysics, vol. 65, No. 4 (Jul.-Aug. 2000); pp. 1032-1047.*

De Stefano, M, et al. (2011). "Multiple-domain, simultaneous joint inversion of geophysical data with application to subsalt imaging." Geophysics, 76(3), R69-R80. DOI: 10.1190/1.3554652.*

De Groot, P.F.M. (1999). "Seismic reservoir characterisation using artificial neural networks." in 19th Mintrop Seminar, pp. 16-18. May 18, 1999.*

Gallardo, L.A. et al. (2012). "Robust geophysical integration through structure-coupled joint inversion and multispectral fusion of seismic reflection, magnetotelluric, magnetic, and gravity images: Example from Santos Basin, offshore Brazil." Geophysics, 77(5), B237-B251. DOI: 10.1190/geo2011-0394.1.*

Colombo, D. et al. (2014). "Exploration beyond seismic: The role of electromagnetics and gravity gradiometry in deep water subsalt plays of the Red Sea." Interpretation, 2(3), SH33-SH53. doi: 10.1190/INT-2013-0149.1.*

Colombo, D. et al., (2007). "Geophysical modeling via simultaneous joint inversion of seismic, gravity, and electromagnetic data: Application to prestack depth imaging", The Leading Edge, Mar. 2007, pp. 326-331.*

Colombo, D. et al. (2007). "Simultaneous joint inversion of seismic and gravity data for long offset prestack depth migration in Northern Oman", CSPG CSEG Convention, 2007, pp. 191-195.*

Marroquin, I.D. et al. (2009). "A visual data-mining methodology for seismic-facies analysis: Part 1 - Testing and comparison with other unsupervised clustering methods". Geophysics, Vol. 74, No. 1 January-February 2009. 11 pp.. Doi: 10.1190/1.3046455.*

Goh, A.T.C. (2002). "Probabilistic neural network for evaluating seismic liquefaction potential". Can. Geotech. J. 39: 219-232 (2002). pp. 219-232. DOI: 10.1139/T01-073.*

West, B.P. et al. (2002). "Interactive seismic facies classification using textural attributes and neural networks." The Leading Edge, 21(10), 1042-1049. DOI: 10.1190/1.1518444.*

Diouf, D. et al. (2013). Retrieving aerosol characteristics and sea-surface chlorophyll from satellite ocean color multi-spectral sensors using a neural-variational method. Remote Sensing of Environment, 130, 74-86. DOI: 10.1016/j.rse.2012.11.002.*

M. Lien, "Simultaneous Joint Inversion of amplitude-versus-offset and controlled-source electromagnetic data by implicit representation of common parameter structure", Geophysics, vol. 78, No. 4, pp. ID15-ID27, 2013.

P.G.Lelievre, C.G. Farquharson and C.A. Hurich, "Joint Inversion of Seismic traveltimes and gravity data on unstructured grids with application to mineral exploration," Geophysics, vol. 77, No. 1, pp. K1-K15, 2012.

M. De Stefano, F. Golfre Andreasi, S. Re, M. Virgilio and F.F Snyder, "Multiple-domain, simultaneous joint inversion of geophysical data with application to subsalt imaging," Geophysics, vol. 76, No. 3, pp. R69-R80, 2011.

W. Hu, A. Abubakar and T.M. Habashy, "Joint electromagnetic and seismic inversion using structural cross-gradients constraints," Geophysics, vol. 74, No. 6, pp. R99-R109, 2009.

L.A. Gallardo and M.A. Meju, "Joint two-dimensional DC resistivity and seismic traveltime inversion with cross-gradients constraints," Journal of Geophysical Research, vol. 109, No. B3, 2004 (11 pages).

P. Dell'Aversana, "Integration of seismic, MT and gravity data in a thrust belt interpretation," First Break, vol. 19, pp. 335-341, 2001.

E. Haber and D. Oldenburg, "Joint inversion: a structural approach," Inverse Problems, vol. 13, No. 1, pp. 63-77, 1977.

D.F. Specht, "A General Regression Neural Network," IEEE Transactions on Neural Networks, vol. 2, No. 6, pp. 568-576, 1991.

E. Parzan, "On estimation of a probability density function and mode," Annals of Mathematical Statistics, vol. 33, pp. 1065-1076, 1962.

T. Cacoullos, "Estimation of a Multivariate density," Ann. Inst. Statist. Math., vol. 18, No. 2, pp. 179-189, 1966.

A. Tarantola, Inverse Problem Theory and Methods for Model Parameter Estimation, SIAM, 2004 (358 pages).

T. Kanungo, D.M. Mount, N.S. Netanyahu, C.D. Piatko, R. Silverman and A.Y. Wu, "An Efficient k-means Clusturing Algorithm: Analysis and Implementation," IEEE Transactions on pattern analysis and machine intelligence, vol. 24, No. 7, pp. 881-892, 2002.

K. Kohonen, "Intro to SOM," Laboratory of Computer and Information Science, Helsinki University of Technology, Mar. 18, 2005. [Online], Available: http://www.cis.hut.fi/projects/somtoolbox/theory/somalgorithm.shtml, [Accessed Sep. 26, 2016] (3 pages).

"Vector Quantization," Wikipedia, Dec. 17, 2013. [Online]. Available: https://enwikipedia.org/wiki/vector_quantization [Accessed Sep. 26, 2016] (5 pages).

"Determining the number of clusters in a data set," Wikipedia, Jul. 11, 2013 [Online]. Available: https://en.wikipedia.org/wiki/Determining_the_number_of_clusters_in_a_data_set [Accessed Sep. 26, 2016] (5 pages).

"Robust Statistics," Wikipedia, Jan. 31, 2014 [Online]. Available: https://en.wikipedia.org/wiki/Robust_statistics [Accessed Sep. 26, 2016] (14 pages).

R. Rustom and A.J. Adeloye, "Replacing outliers and missing values from activated sludge data using Kohonen Self Organizing Map," Journal of environmental engineering, vol. 133, No. 9, pp. 909-916, 2007.

International Search Report and Written Opinion issued in the related PCT application PCT/US2015/033682, dated Aug. 26, 2016 (17 pages).

International Preliminary Report on Patentability for the equivalent International patent application PCT/US2015/033682 dated Apr. 20, 2017.

* cited by examiner

PROPERTIES LINK FOR SIMULTANEOUS JOINT INVERSION

RELATED APPLICATIONS

This application claims priority to and the benefit of a U.S. Provisional application Ser. No. 62/006,634, filed 2 Jun. 2014, which is incorporated by reference herein.

BACKGROUND

Interpretation is a process that may examine one or more types of data such as, for example, seismic data (e.g., location and time or depth), in an effort to identify subsurface structures (e.g., horizons, faults, etc.). Structures may be, for example, faulted stratigraphic formations indicative of hydrocarbon traps or flow channels. In the field of resource extraction, enhancements to interpretation can allow for construction of a more accurate model, which, in turn, may improve data analysis for purposes of resource extraction (e.g., via one or more field operations).

SUMMARY

A method can include receiving data associated with a geologic environment; based on at least a portion of the data, estimating relationships for multiple properties of the geologic environment; and based at least in part on the relationships, performing simultaneous joint inversion for at least one property of the geologic environment. A system can include a processor; memory operatively coupled to the processor; and one or more modules that include processor-executable instructions stored in the memory to instruct the system to receive data associated with a geologic environment; based on at least a portion of the data, estimate relationships for multiple properties of the geologic environment; and based at least in part on the relationship, perform simultaneous joint inversion for at least one property of the geologic environment. One or more computer-readable storage media can include computer-executable instructions to instruct a computer to: receive data associated with a geologic environment; based on at least a portion of the data, estimate relationships for multiple properties of the geologic environment; and, based at least in part on the relationship, perform simultaneous joint inversion for at least one property of the geologic environment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
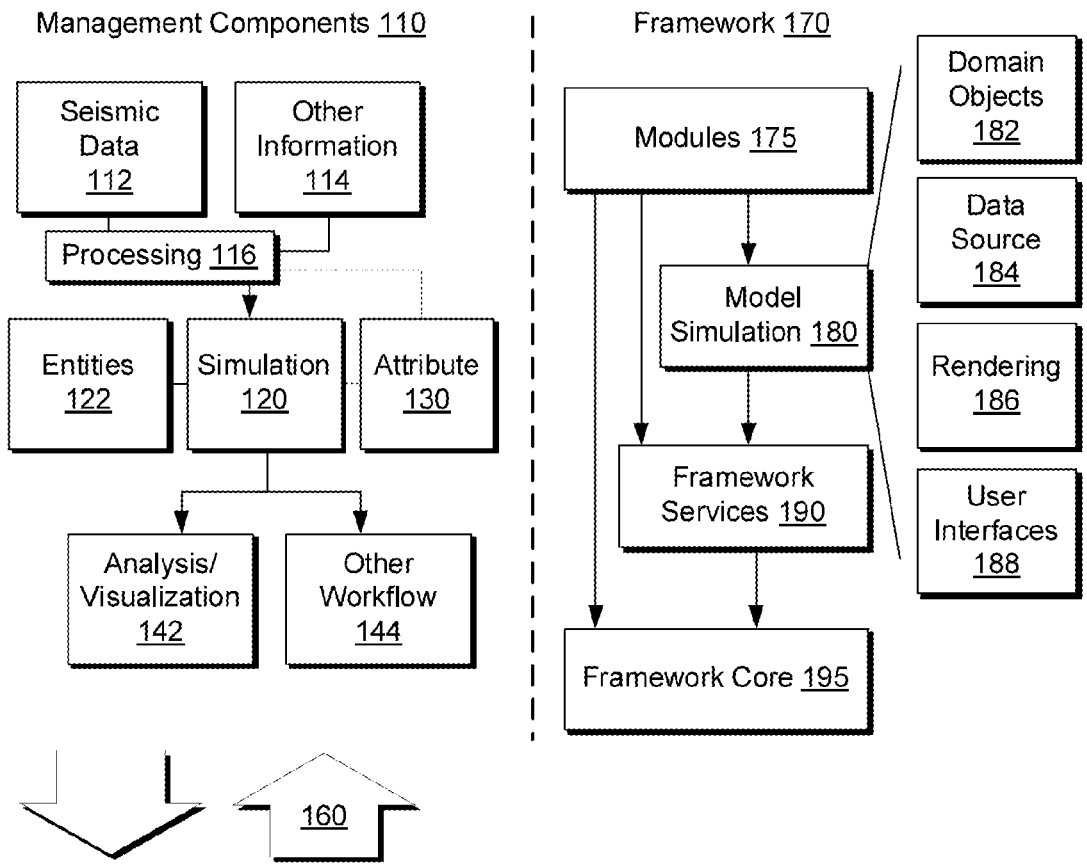
FIG. 1 illustrates an example system that includes various components for modeling a geologic environment and various equipment associated with the geologic environment.
Figure 1:
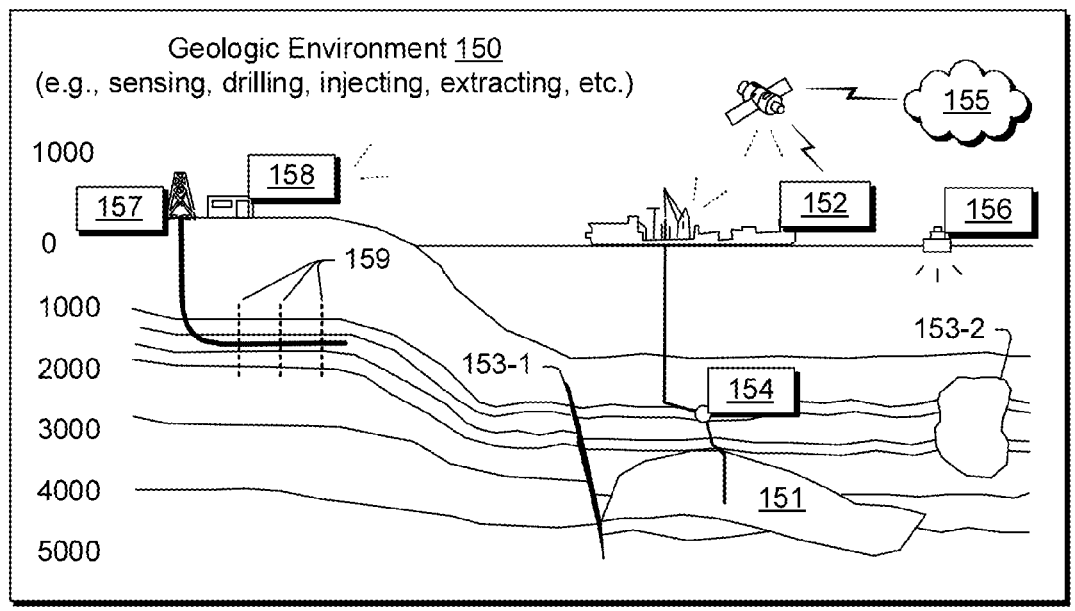

This description is not to be taken in a limiting sense, but rather is made merely for the purpose of describing the general principles of the implementations. The scope of the described implementations should be ascertained with reference to the issued claims.

In various instances, an analysis may include creating velocity models, for example, for Pre-Stack Depth Migration (PSDM) of data and/or other tasks. As an example, creation of a velocity model may include implementation of joint inversion (JI) of seismic, gravity (e.g., where gravity may include any type of scalar and/or vectorial gravity measurements and derived quantities such as: gravity field measurements, gradient measurements, Bouguer anomaly, etc.), and electromagnetic data (e.g., magnetotelluric (MT) and/or controlled-source electromagnetic (CSEM), where Controlled-Source Electromagnetic may include one or more types of geophysical exploration methods based on electromagnetic induction in the earth, measured and/or computed in frequency or time domains).

An estimated seismic velocity model can assist with depth imaging through migration; noting that inaccuracies in a seismic velocity model can cause, for example, lateral and vertical mispositioning of reflectors in depth. Mispositioning of structure can impact exploration of hydrocarbons, for example, by increasing risk of drilling dry wells, by mis-identifying oil and gas-bearing structures, etc.

A particular type of JI may be referred to as simultaneous joint inversion (SJI). SJI may be used for estimating multiple properties of the subsurface, for example, where they may be correlated through an imposed law. As an example, an imposed law may be referred to as a "link" or, for example, "link equations", "link relations", "link relationships", etc. To achieve a good estimate of the subsurface properties, a link may be constructed to establish physically meaningful relationship between subsurface properties.

As an example, a workflow that integrates multiple physical measurements can produce output(s) that may assist with building an earth model. For example, consider a model that includes representations of structures, which may include one or more reservoirs. As an example, a method may include integration of seismic and/or nonseismic data. As an example, SJI may be implemented in a manner that can allow for integration of different geophysical datasets at the inversion level. For example, an SJI approach may include collecting seismic and non-seismic information into an objective function to be inverted. Such an approach may act to: reduce uncertainty in the interpretation result through integrating independent geophysical measurements into a consistent earth-property model; mitigate weaknesses of each single domain dataset through the strengths of the other dataset(s); and improve imaging capabilities.

An SJI approach may prove useful in subsalt, subbasalt, and subthrust areas, where seismic imaging can face issues, for example, as deep illumination may be limited. In such cases, SJI may be used in a framework of a depth imaging workflow that can provide extended capabilities for resolving complex velocity fields, for example, under conditions of poor signal-to-noise ratio.

As an example, a method can include estimating and/or using a link between the properties to be estimated. In such an example, the link may be capable of relating more than two properties. As an example, a method may implement an artificial neural network (ANN)-based approach, optionally where one or more ANNs are implemented in circuitry. As an example, a method may implement a polynomial-based approach. As an example, a method may implement one or more approaches.

As an example, a SJI approach may include simultaneous inversion for velocity and/or density. As an example, a SJI approach may include simultaneous inversion for velocity and one or more other parameters (e.g., geophysical properties). As an example, a SJI approach may include simultaneous inversion for density and one or more other parameters (e.g., geophysical properties). As an example, a SJI approach may include simultaneous inversion for at least two parameters (e.g., geophysical properties such as one or more of velocity, density, etc.).

As an example, a velocity model derived at least in part via SJI may be applied for purposes of imaging. As an example, a velocity model derived at least in part via SJI may be applied for purposes of migration.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, seismic data may be processed using a framework such as the OMEGA® framework (Schlumberger Limited, Houston, Tex.). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluricdata, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as a fault 153-1, a geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
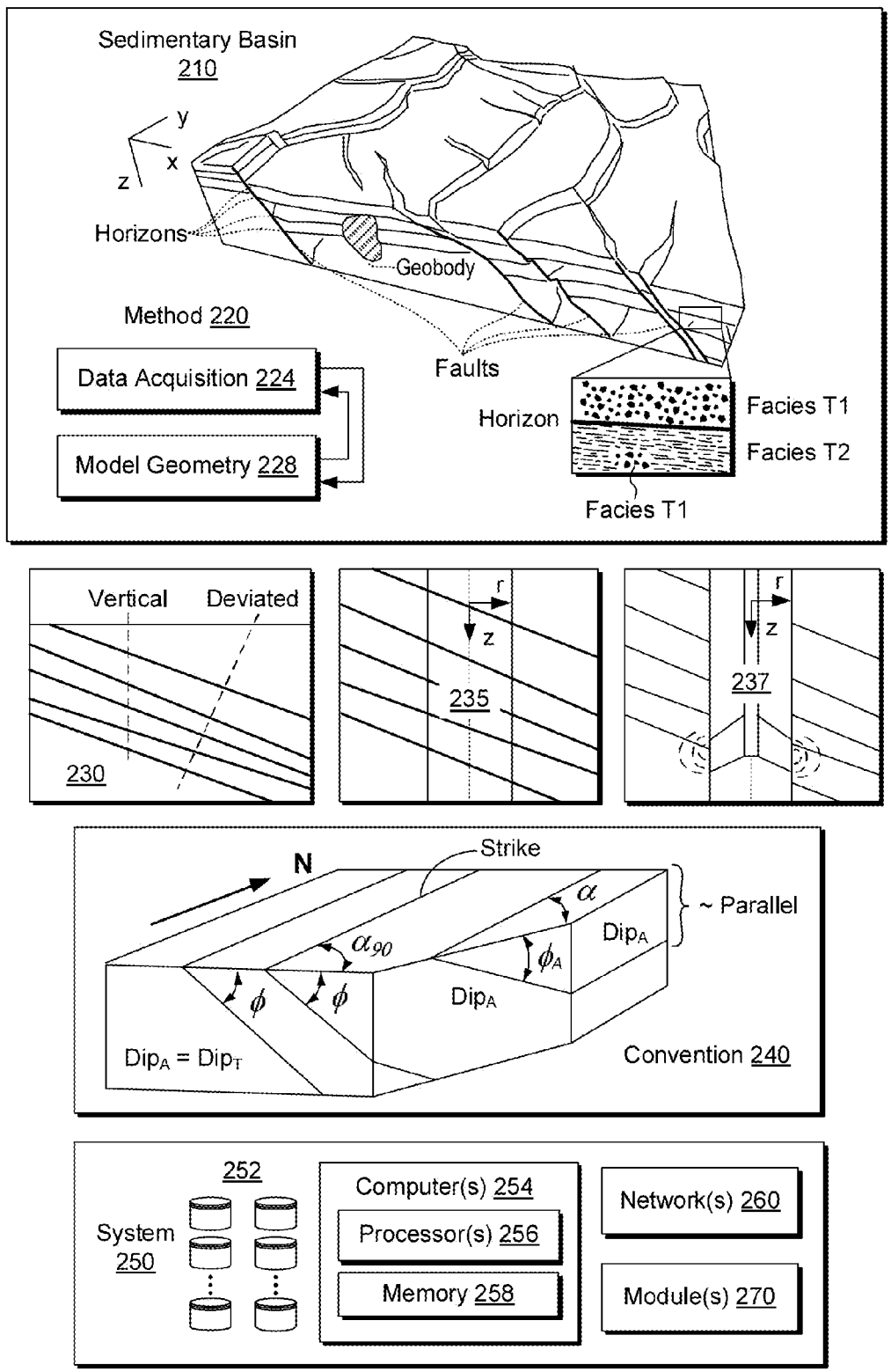
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore FORMATION MICROIMAGER™ (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles □ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., DipT in the convention 240 of FIG. 2). True dip is the dip of a plane measured directly perpendicular to strike (see, e.g., line directed northwardly and labeled "strike" and angle □□□) and also the maximum possible value of dip magnitude. Another term is "apparent dip" (see, e.g., DipA in the convention 240 of FIG. 2). Apparent dip may be the dip of a plane as measured in any other direction except in the direction of true dip (see, e.g., □A as DipA for angle □); however, it is possible that the apparent dip is equal to the true dip (see, e.g., □ as DipA=DipT for angle □□□ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with □ as DipA=DipT for angle □90 with respect to the strike). As indicated, dip observed in a cross-section in any other direction is apparent dip (see, e.g., surfaces labeled DipA). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., DipR). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 3:
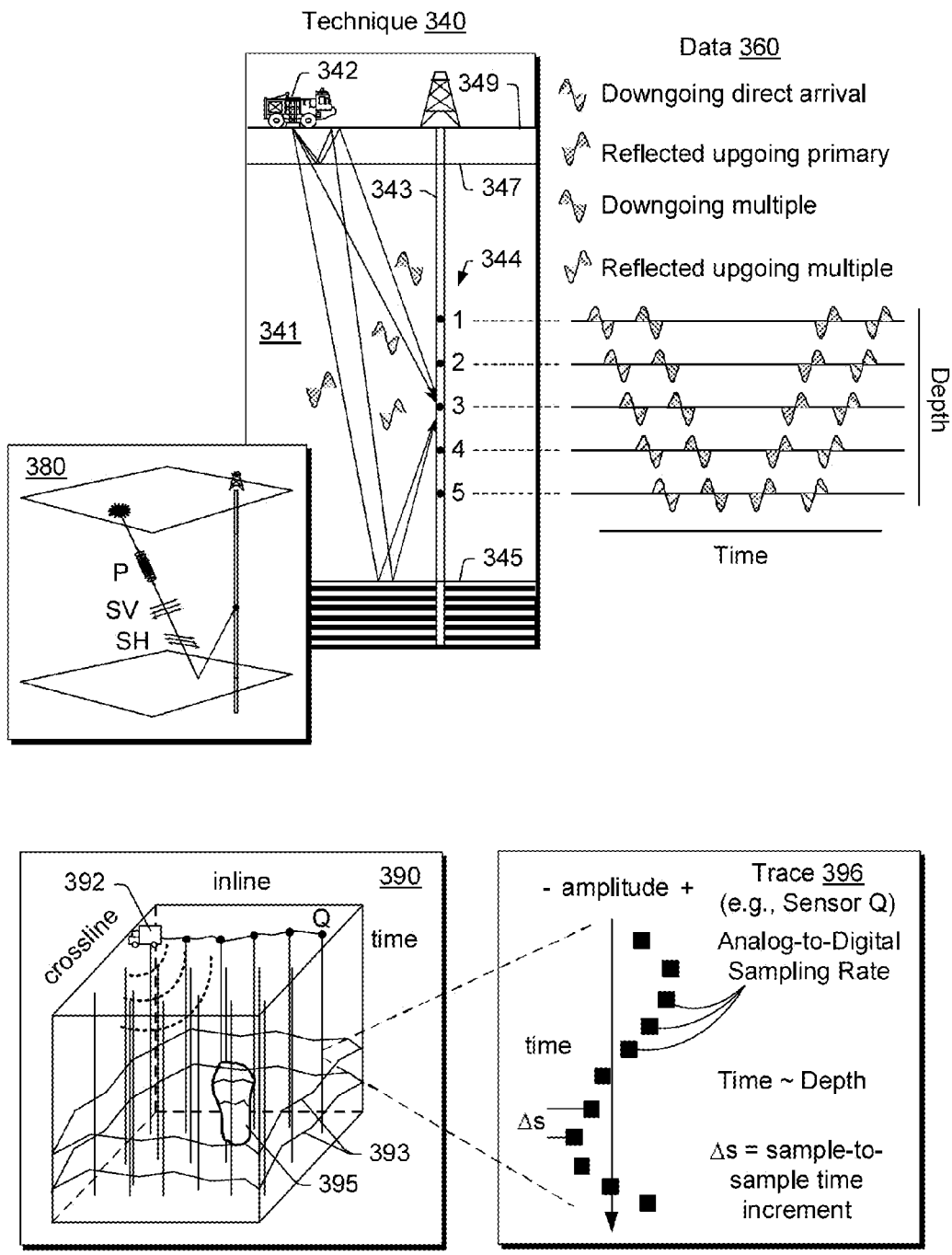
FIG. 3 illustrates an example of a technique that may acquire data.

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment (e.g., model coordinates associated with a model of a geologic environment, etc.), one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\square$, $\square$ and $\square$. The Thomsen parameter $\square$ describes depth mismatch between logs (e.g., actual depth) and seismic depth. As to the Thomsen parameter $\square$, it describes a difference between vertical and horizontal compressional waves (e.g., P or P-wave or quasi compressional wave qP or qP-wave). As to the Thomsen parameter $\square$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\square$ and $\square$ may be estimated from wave data while estimation of the Thomsen parameter $\square$ may involve access to additional information.

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 4:
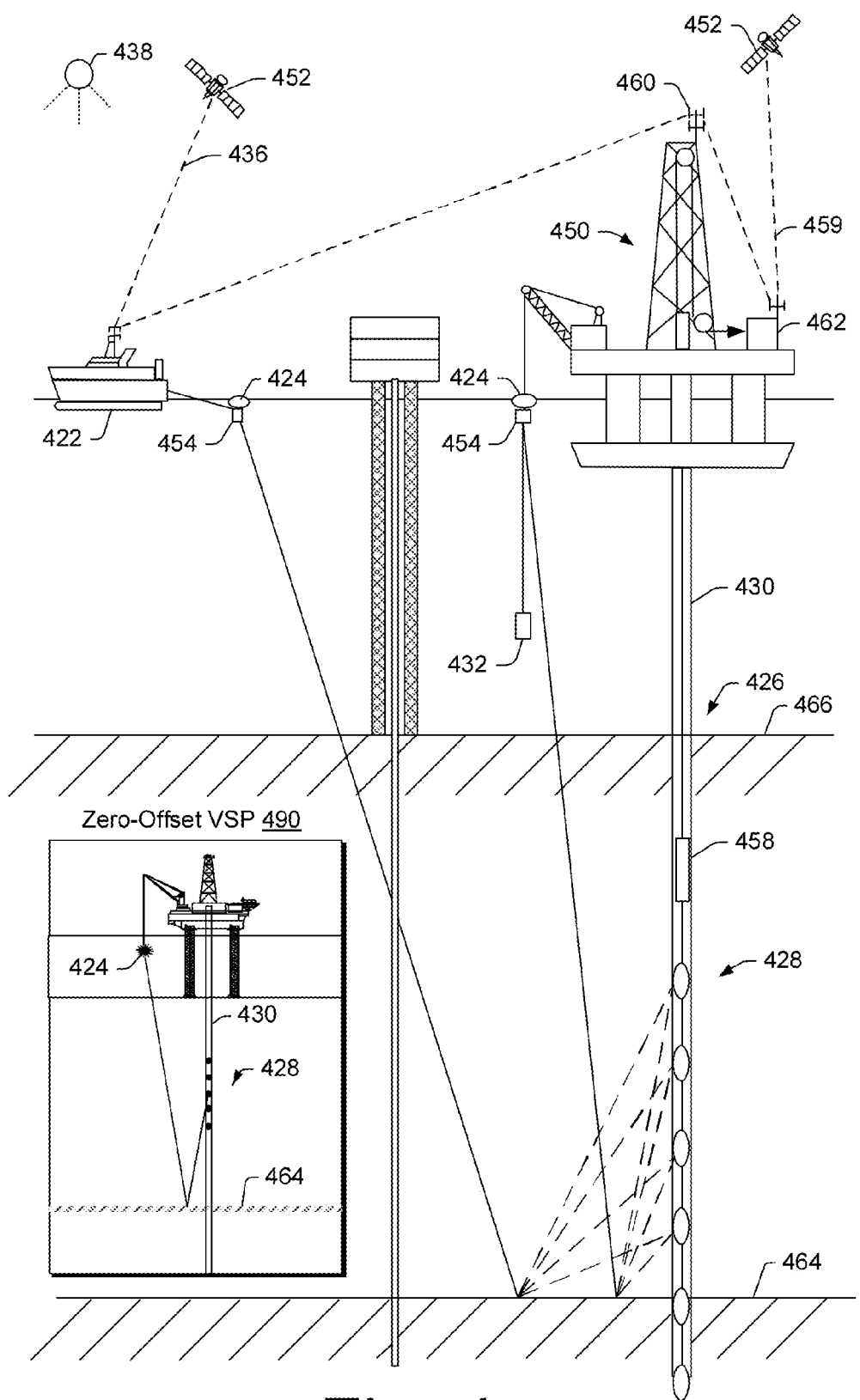
FIG. 4 illustrates an example of a system.

FIG. 4 shows an example of a system 420 in which one or more vessels 422 may be employed to enable seismic profiling, e.g., three-dimensional vertical seismic profiling (VSP) or rig/offset vertical seismic profiling (VSP). In the example of FIG. 4, the system 420 is illustrated as including a rig 450, the vessel 422, and one or more acoustic receivers 428 (e.g., a receiver array). As an example, a vessel may include a source 424 (e.g., or source array) and/or the rig 450 may include a source 424 (e.g., or source array).

As an example, the vessel 422 may travel a path or paths where locations may be recorded through the use of navigation system signals 436. As an example, such signals may be associated with a satellite-based system that includes one or more satellites 452 and 438. As an example, the satellite 438 may be part of a global positioning system (GPS), which may be implemented to record position, speed, direction, and other parameters of the vessel 422. As an example, one or more satellites, communication equipment, etc. may be configured to provide for VSAT communications, VHF communications, UHF communications, etc.

In the example of FIG. 4, the acoustic receivers 428 may be part of a data acquisition system 426, for example, that may be deployed in borehole 430 via one or more of a variety of delivery systems, such as wireline delivery systems, slickline delivery systems, and other suitable delivery systems. As an example, the acoustic receivers 428 may be communicatively coupled with processing equipment 458, which may be positioned at a downhole location. By way of example, processing equipment 458 may include a telemetry system for transmitting data from acoustic receivers 428 to additional processing equipment 462 located at the surface, e.g., on the rig 450 and/or vessels 422. As an example, information acquired may optionally be transmitted (see, e.g., signals 459).

Depending on the specifics of a given data communication system, examples of surface processing equipment 462 may include a radio repeater 460 and/or one or more of a variety of other and/or additional signal transfer components and signal processing components. The radio repeater 460 along with other components of processing equipment 462 may be used to communicate signals, e.g., UHF and/or VHF signals, between vessels (e.g., the vessel 422 and one or more other vessels) and the rig 450, for example, to enable further communication with downhole data acquisition system 426.

As an example, the acoustic receivers 428 may be coupled to the surface processing equipment 462 via one or more wire connections; noting that additionally or alternatively wireless and/or optical connections may be employed.

As an example, the surface processing equipment 462 may include a synchronization unit, for example, to assist with coordination of emissions from one or more sources (e.g., optionally dithered (delayed) source arrays). As an example, coordination may extend to one or more receivers (e.g., consider the acoustic receivers 428 located in borehole 430). As an example, a synchronization unit may use coordinated universal time, optionally employed in cooperation with a global positioning system (e.g., to obtain UTC data from GPS receivers of a GPS system).

FIG. 4 illustrates examples of equipment for performing seismic profiling that can employ simultaneous or near-simultaneous acquisition of seismic data. By way of example, the seismic profiling may include three-dimensional vertical seismic profiling (VSP) but other applications may utilize rig/offset vertical seismic profiling or seismic profiling employing walkaway lines. As an example, an offset source may be provided by the source 424 located on the rig 450, on the vessel 422, and/or on another vessel or structure (e.g., stationary and/or movable from one location to another location).

As an example, a system may employ one or more of various arrangements of a source or sources on a vessel(s) and/or a rig(s). As shown in the example of FIG. 4, the acoustic receivers 428 of downhole acquisition system 426 are configured to receive the source signals, at least some of which are reflected off a reflection boundary 464 located beneath a sea bottom 436. The acoustic receivers 428 may generate data streams that are relayed uphole to a suitable processing system (e.g., the processing system 462).

While the acoustic receivers 428 may generate data streams, a navigation system may determine a real-time speed, position, and direction of the vessel 422 and also estimate initial shot times accomplished via signal generators 454 of the appropriate source 424 (e.g., or source array). A source controller may be part of the surface processing equipment 462 (e.g., located on the rig 450, on the vessel 422, or at other suitable location) and may be configured with circuitry that can control firing of acoustic source generated signals so that the timing of an additional shot time (e.g., optionally a shot time via a slave vessel) may be based on an initial shot time (e.g., a shot time via a master vessel) plus a dither value.

As an example, a synchronization unit of, for example, the surface processing equipment 462, may coordinate firing of dithered acoustic signals with recording of acoustic signals by the downhole acquisition system 426. A processor system may be configured to separate a data stream of the initial shot and a data stream of the additional shot via a coherency filter. As an example, an approach may employ simultaneous acquisition and/or may not perform separation of the data streams. In such cases, the dither may be effectively zero.

After an initial shot time at T=0 (T0) is determined, subsequent firings of acoustic source arrays may be offset by a dither. The dithers may be positive or negative and sometimes created as pre-defined random delays. Use of dithers facilitates the separation of simultaneous or near-simultaneous data sets to simplify the data processing. The ability to have acoustic source arrays fire in simultaneous or near-simultaneous patterns reduces the overall amount of time used for three-dimensional vertical seismic profiling source acquisition. This, in turn, may reduce rig time. As a result, the overall cost of the seismic operation may be reduced, rendering the data intensive process much more accessible.

If acoustic source arrays used in the seismic data acquisition are widely separated, the difference in move-outs across the acoustic receiver array of the wave fields generated by the acoustic sources can be sufficient to obtain a relatively clean data image via processing the data. However, even when acoustic sources are substantially co-located in time, data acquired a method involving dithering of the firing times of the individual sources may be processed to a formation image. For example, consider taking advantage of the incoherence of the data generated by one acoustic source when seen in the reference time of another acoustic source.

Also shown in FIG. 4 is an inset example of a zero-offset vertical seismic profile (VSP) scenario 490. In such an example, an acquisition geometry may be limited to an ability to position equipment that is physically coupled to the rig 450. As shown, for given the acquisition geometry, there may be no substantial offset between the source 424 and bore 430. In such an example, a zero-offset VSP may be acquired where seismic waves travel substantially vertically down to a reflector (e.g., the layer 464) and up to the receiver 428, which may be a receiver array. Where one or more vessels are employed (e.g., the vessel 422), one or more other types of surveys may be performed. As an example, a three-dimensional VSP may be performed using a vessel.

As an example, one or more attribute modules may be provided for processing seismic data. As an example, attributes may include geometrical attributes (e.g., dip angle, azimuth, continuity, seismic trace, etc.). Such attributes may be part of a structural attributes library (see, e.g., the attribute component 130 of FIG. 1). Structural attributes may assist with edge detection, local orientation and dip of seismic reflectors, continuity of seismic events (e.g., parallel to estimated bedding orientation), etc. As an example, an edge may be defined as a discontinuity in horizontal amplitude continuity within seismic data and correspond to a fault, a fracture, etc. Geometrical attributes may be spatial attributes and rely on multiple traces.

Figure 5:
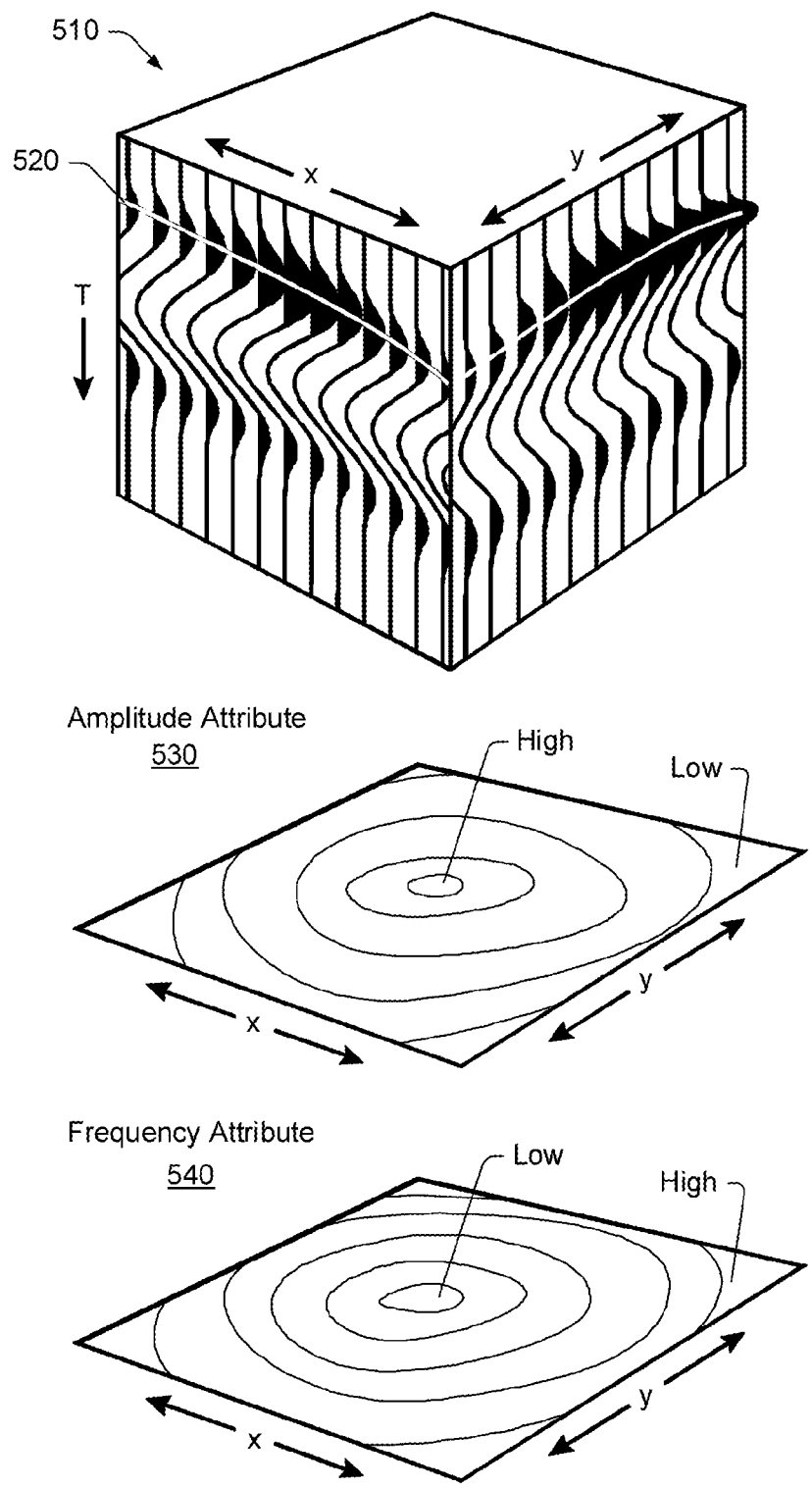
FIG. 5 illustrates examples of analyses.

FIG. 5 shows an example of seismic data 510 organized in the form of a three-dimensional cube that includes an identified time slice 520, for example, based on an analysis of peak amplitude. The time slice 520 may be considered to be a time surface. For the time slice 520, amplitude of each trace may be mapped as an amplitude attribute 530, for example, in two-dimensions (e.g., an amplitude attribute surface). In the example of FIG. 5, higher amplitudes are illustrated as being near the center of the amplitude attribute 530. As another example, the time slice 520 may be analyzed with respect to frequency to generate a frequency attribute 540. In the example of FIG. 5, the frequency attribute 540, as shown in two-dimensions, includes lower frequencies near the center and higher frequencies away from the center.

As an example, an attribute may be an iso-frequency attribute. For example, an iso-frequency attribute may include performing spectral decomposition on seismic data to generate an autocorrelation function followed by cross-correlation using a cosine wave (e.g., cosine correlation transform) and the autocorrelation function. Such a process can output an iso-frequency attribute as a correlation coefficient that measures the correlation between a known cosine wave signature of a particular frequency and the autocorrelation of the seismic data. Such an attribute process may be applied to a seismic volume and, for example, output an iso-frequency attribute cube (e.g., with values scaled between −1 and +1, representing correlation). An iso-frequency attribute may help reveal variations in lithology that may, for example, indicate stratigraphic traps for hydrocarbons.

As an example, techniques such as bandpass filtering of multi-frequency seismic data may be performed to generate data for various frequency ranges. For example, consider a technique that inputs seismic data with a frequency range of about 0 Hz to about 125 Hz, performs spectral decomposition and then bandpass filtering to generate seismic data in ranges from about 10 Hz to about 20 Hz, from about 20 Hz to about 30 Hz, etc.

As an example, consider 2D seismic data provided as amplitude versus time/depth and position. In such an example, an iso-frequency component attribute may be applied locally to the 2D seismic data using a selected frequency and cycle length where the frequency and the cycle length determine a "correlation window length" (e.g., in units of time) where the "correlation window" is applied locally. As to the selected frequency, the value may be selected, for example, depending on the average frequency content of the seismic data under consideration. The iso-frequency component attribute may perform autocorrelation locally on the 2D seismic data (e.g., using the correlation window length) to generate local autocorrelation functions with respect to time/depth and position and then perform cross-correlation for the selected frequency, for example, using a wave function (e.g., a cosine function) applied locally to generate local values for cross-correlation coefficients.

As an example, an iso-frequency component attribute may be applied to seismic data. The iso-frequency component attribute may represent a cross-correlation function of autocorrelation of seismic data and a kernel function. As an example, a kernel function may be a wave function such as a cosine function. Where a cosine function is provided, the cross-correlation may be referred to as the "correlation cosine transform" or "cosine-correlation transform" (CCT) technique. The CCT technique may result in a "frequency" value as a measure of a contribution of a frequency (e.g., optionally defined by a user). An intermediate result of a method that includes application of a cross-correlation technique may include data showing a cross-correlation coefficient of similarity between autocorrelations of seismic data and a kernel function.

As to a seismic decomposition technique, consider as an example a spectral decomposition performed locally that includes generating an autocorrelation function of seismic data on a time window. In such an example, the autocorrelation function tends to be insensitive to phase content of the seismic data, thus aligning the seismic energy at zero lag. A subsequent process can include performing a cross-correlation between a wave function such as a cosine wave function (correlation-cosine transform "CCT", e.g., with a defined number of cycles) and the generated autocorrelation function where the cross-correlation determines numeric similarity of the autocorrelation function and the wave function.

As an example, a cross-correlation algorithm may include an equation such as:

$$\phi_{GH}(\tau) = \frac{\sum_{k=-N}^{N} G(k)H(k+\tau)}{\left[\sum_{k=-N}^{N}\left[G^2(k)\sum_{k-N}^{N} H^2(k)\right]\right]^{0.5}}$$

In the above equation, G(k) and H(k) are signals being correlated, for example, they may be windowed seismic data to generate an autocorrelation function or a cosine function and a generated autocorrelation function.

Output of a CCT technique may provide a correlation coefficient that measures the correlation between a known cosine wave signature of a specific frequency and the autocorrelation seismic data. An iso-frequency seismic attribute three-dimensional cube may be scaled, for example, between −1 to 1 where 0 indicates an uncorrelated function, where 1 indicates identical signals and where −1 indicates identical signals but inverted.

As to parameters, a cosine frequency parameter and a number of cycles parameter may be provided. Such parameters may define a correlation window length for extraction of the iso-frequency seismic attribute. For example, a correlation window length may depend on a relative frequency of a cosine function and a frequency content of seismic data. While a cosine function is mentioned (e.g., or cosine wave function), one or more other types of functions may be used, for example, one or more other types of wave functions. In a cross-correlation process, a function may be a kernel function.

As to windowed seismic data, a short window tends to avoid focusing of correlation energy, for example, to facilitate identification of anomalies. As to a long window, it may facilitate identification of local geologic effects (e.g., and not tuning effects).

As an example, a module may provide an option to perform spectral normalization, for example, a spectral whitening that may act to remove a signature of a seismic wavelet (e.g., as associated with a seismic energy source).

As an example, an iso-frequency seismic attribute may be applied to seismic data, for example, to reveal subtle variations in lithology (e.g., which may indicate stratigraphic traps for hydrocarbons, etc.).

Figure 6:
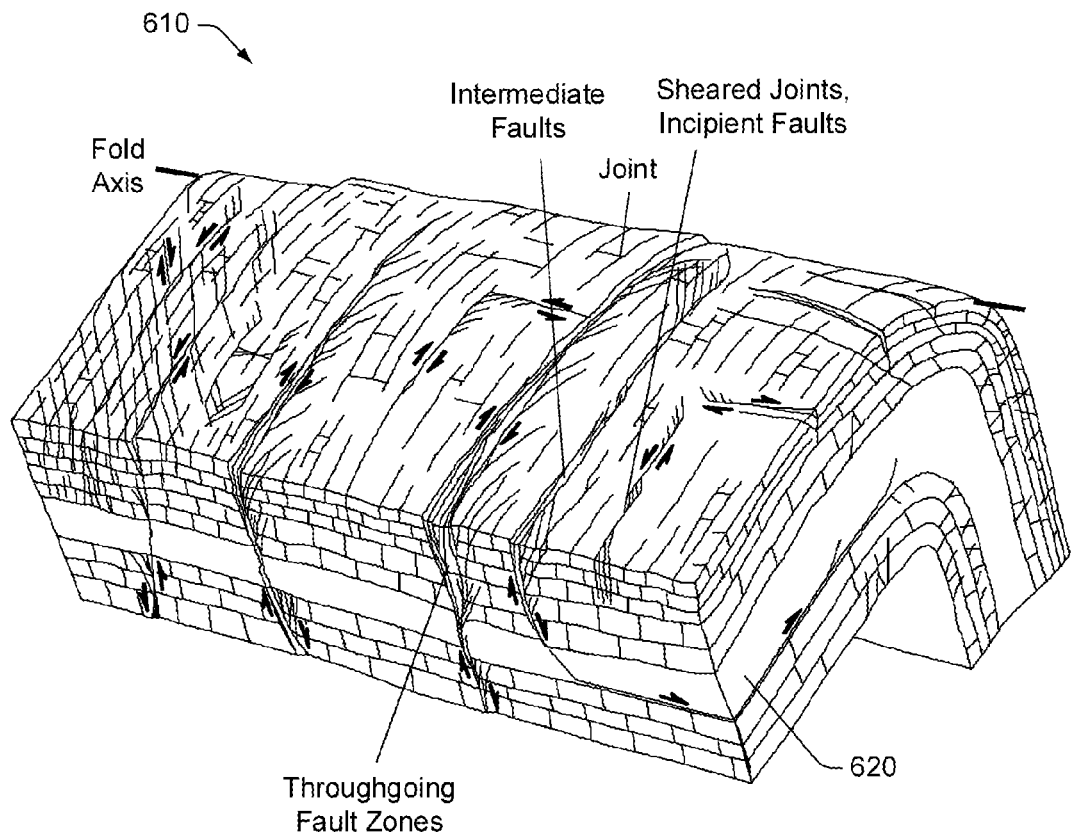
FIG. 6 illustrates an example of a geologic environment.

FIG. 6 shows an example of a geologic environment 610 that includes folds, faults and fractures along an anticline 620. In folded rocks, faults and fractures may be oriented, for example, parallel or perpendicular to a fold axis. Fractures may form in response to stress, joints may form by means of tensile stresses and faults may form by means of shear stresses. Deformation over time may cause fractures to extend and, for example, change direction of motion along fracture planes. Faults and fractures may be stratabound and, for example, confined to a single layer or they may be or become throughgoing where they may cross sedimentary sequences and span one or more formations within a geologic environment. Connectivity may range from isolated individual fractures to widely spaced fracture swarms or corridors, which may be interconnected fracture networks. As to exploration and development, horizontal wells may be drilled parallel to a fold axis, for example, to increase chance of intersecting fractures.

As an example, a method can enhance estimation of complex geology through measurement integration. Such a method may include receiving different types of measurements (e.g., seismic together with gravity and/or magnetic and/or electromagnetic measurements). Such a method may provide for output of information that can facilitate analysis of probability of exploration success.

As an example, simultaneous joint inversion (SJI) can be implemented for estimating multiple properties of the subsurface that may be correlated through an imposed law. Such a "law" may be referred to as a "link" and/or "link equations" and/or "link relations" and/or "link relationships". As an example, an imposed law may be relationships, which may be for a plurality of properties. As an example, a method can include estimating relationships. To achieve an estimate of the subsurface properties, a link can be realistic and reflect relationships between properties in the subsurface.

As an example, a method can include estimating the statistical joint distribution (SJD) of subsurface properties and use the SJD as a link in a statistical joint inversion (SJI). The estimated joint distribution can relate to a number of properties (e.g., optionally more than two). A procedure used for estimating a link can implement one or more techniques such as clustering algorithms (e.g., Self Organizing Maps (SOMs), K-Means, etc.) and/or Artificial Neural Networks (ANNs) for approximation of a statistical distribution. A method can include estimating realistic link relations and optionally automatically adapt to possible relation and number of properties. Various examples are illustrated herein, for example, using synthetic datasets.

As an example, a method may substitute an ANN with a computational unit that uses a two-property polynomial relation. Various trial examples illustrate such approaches and allow for comparisons between the results obtained with the ANN and with the polynomial link unit.

As an example, a method can include constructing a realistic link and using it in SJI. As an example, a constructed link can mimic a statistical distribution of subsurface properties.

As an example, a method can include implementing an algorithm for estimating and exploiting correlations between multiple properties of the subsurface. As an example, such an algorithm may use a polynomial fitting of the cross-property pattern or may estimate the a-priori joint probability density function (PDF) of the properties by training a radial-basis function (RBF) artificial neural network (ANN).

Figure 7:
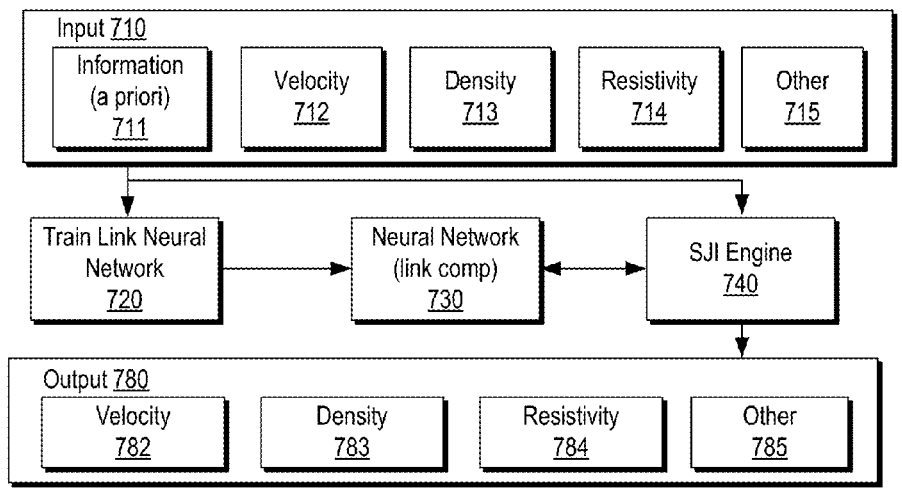
FIG. 7 illustrates an example of a method and an example of an engine.
Figure 7:
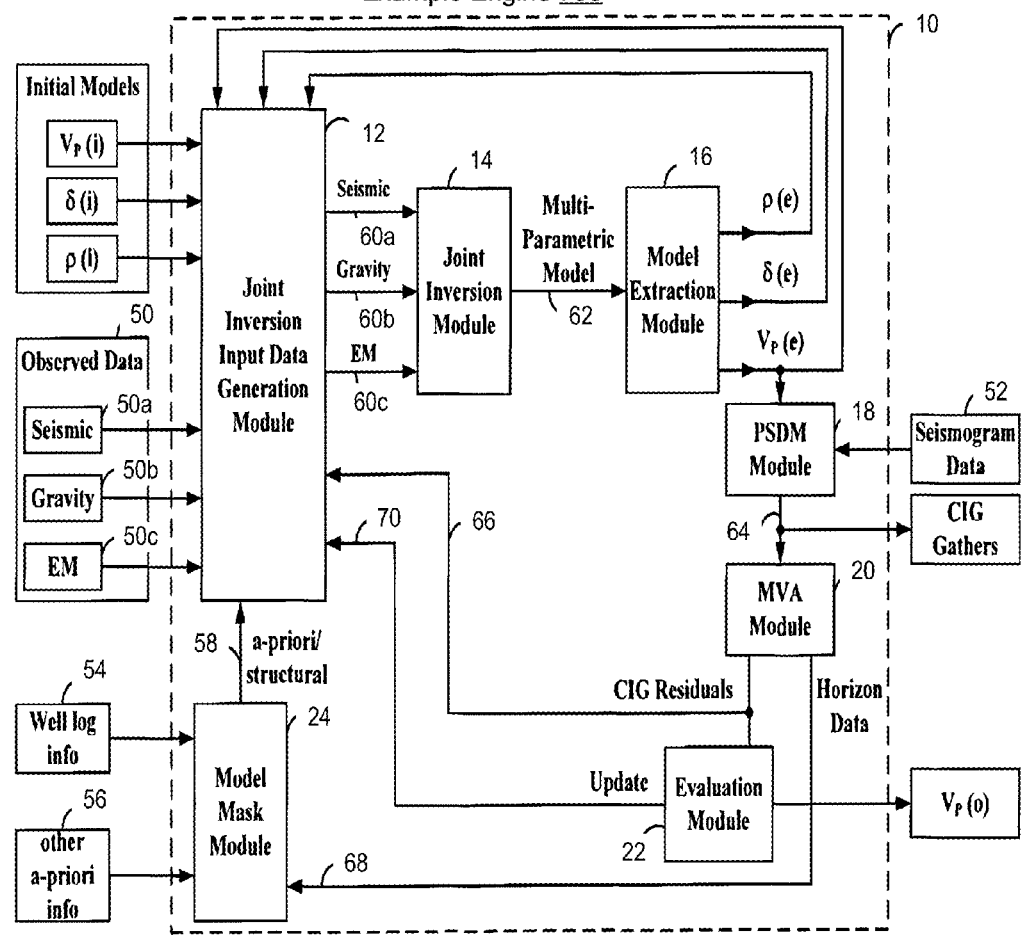

FIG. 7 shows an example of a method 700 that includes an input block 710 for inputting information, a train block 720 for training a link ANN, an ANN block 730 for computing, an SJI engine block 740 for implementing one or more SJI techniques and an output block 780 for outputting information (e.g., results). As shown, inputs may include a priori information 711, velocity information 712, density information 713, resistivity information and/or other information 715. As an example, outputs may include velocity information 782, density information 783, resistivity information 784 and/or other information 785. Such a method may be implemented as circuitry, code, etc. For example, one or more machine-readable storage media (not carrier waves) can include processor-executable instructions that can instruct a computing system to perform one or more actions associated with the method 700 of FIG. 7. As an example, consider a module, a plug-in, add-on, framework, etc., which may be used in one or more workflows to perform analysis of data and optionally other tasks (e.g., via a computing system, field equipment, network equipment, etc.).

FIG. 7 also shows an example of an engine 790, which may be an engine as described in U.S. Pat. No. 7,805,250, which is incorporated herein by reference; noting that U.S. Pat. No. 8,363,509 and U.S. patent application Ser. No. 13/252,362 (US Patent Application Publication No. 20130085731 A1) are incorporated by reference herein. As shown, the engine 790 can receive observed data 50, seismogram data 52, well log information 54, other a priori information 56, and initial velocity, density and resistivity models and generate common image gathers (CIG) 64 and output velocity model. Observed data 50 may include seismic data 50a, gravity data 50b and electromagnetic (EM) data 50c that may be measured at one or more geographical areas, such as on-shore or off-shore, and at, below or above the Earth's surface (e.g. including airborne measurements). Seismic data 50a may include first arrival times (referred to herein as "first breaks," or "FB"). Gravity data 50b may include any type of gravity field and gravity field gradients measurements, such as Bouguer anomaly data. EM data 50c may include MT data and/or CSEM data.

Seismogram data 52 may include a record of seismic waveforms as a function of time, of which seismic data 50a may be a subset. Well log information 54 may include data generated from sample well logs taken in or near the geographical area in which the observed data 50 were collected. Other a priori information 56 may include one or more types of a priori information that may help a user select homogeneous regions of the velocity, density and resistivity models. For example, other a priori information may include geophysical measurements or geophysical knowledge about the velocity, density and resistivity models that may suggest subdivisions (or grouping) of the model units.

The engine 790 can include joint inversion input data generation module 12, joint inversion module 14, model extraction module 16, PSDM module 18, migration velocity analysis ("MVA") module 20, evaluation module 22 and model mask module 24. As an example, the joint inversion input data generation module 12 can calculate joint inversion input data 60, which may include seismic joint inversion input data 60a, gravity joint inversion input data 60b and EM joint inversion input data 60c. Under the control of update control signal 70, joint inversion input data generation module 12 can calculate joint inversion input data 60 based either on the initial velocity, density and resistivity models or the extracted velocity, density and resistivity models.

As an example, for an iteration, update control signal 70 can instruct the joint inversion input data generation module 12 to calculate joint inversion input data 60 based on initial models. The joint inversion module 14 can receive the joint inversion input data 60 and generate a multi-parametric model 62. The model extraction module 16 can extract velocity, density and resistivity models from multi-parametric model 62. The PSDM module 18 use the extracted velocity model to generate CIG gathers 64, and the MVA module 20 can calculate the CIG residuals 66 and horizon data 68 based on the CIG gathers 64.

The evaluation module 22 can determine if the CIG residuals 66 meet predetermined quality objectives. If the predetermined quality objectives are satisfied, the evaluation module 22 can output the current extracted velocity model as the output velocity model. Otherwise, the evaluation module 22 can generate an update control signal 70 that instructs the joint inversion input data generation module 12 to calculate updated joint inversion input data 60 based on extracted models. As an example, in a joint inversion process, the model mask module 24 may be used to specify joint inversion constraints.

As an example, a seismic joint inversion input data generation module can include a forward calculation processor, a residuals calculation processor, a velocity inversion module, a forward calculation parameters selector, an inversion constraints selector, an inversion parameters selector, and an evaluation module. As an example, a seismic joint inversion input data generation module may be configured to receive observed FB data and/or CIG residuals, velocity models, update control signal(s) and a-priori/structural information, and to generate seismic joint inversion input data. Such seismic joint inversion input data may include FB residuals data, velocity forward calculation parameters, selected velocity inversion constraints, selected velocity inversion parameters and CIG residuals.

In the example method 700 of FIG. 7, the ANN block 730 includes an ANN that is capable of approximating the a-priori probability density function (PDF) of the point wise relationship between the subsurface properties. The structure of an example of an ANN is represented in FIG. 8.

Figure 8:
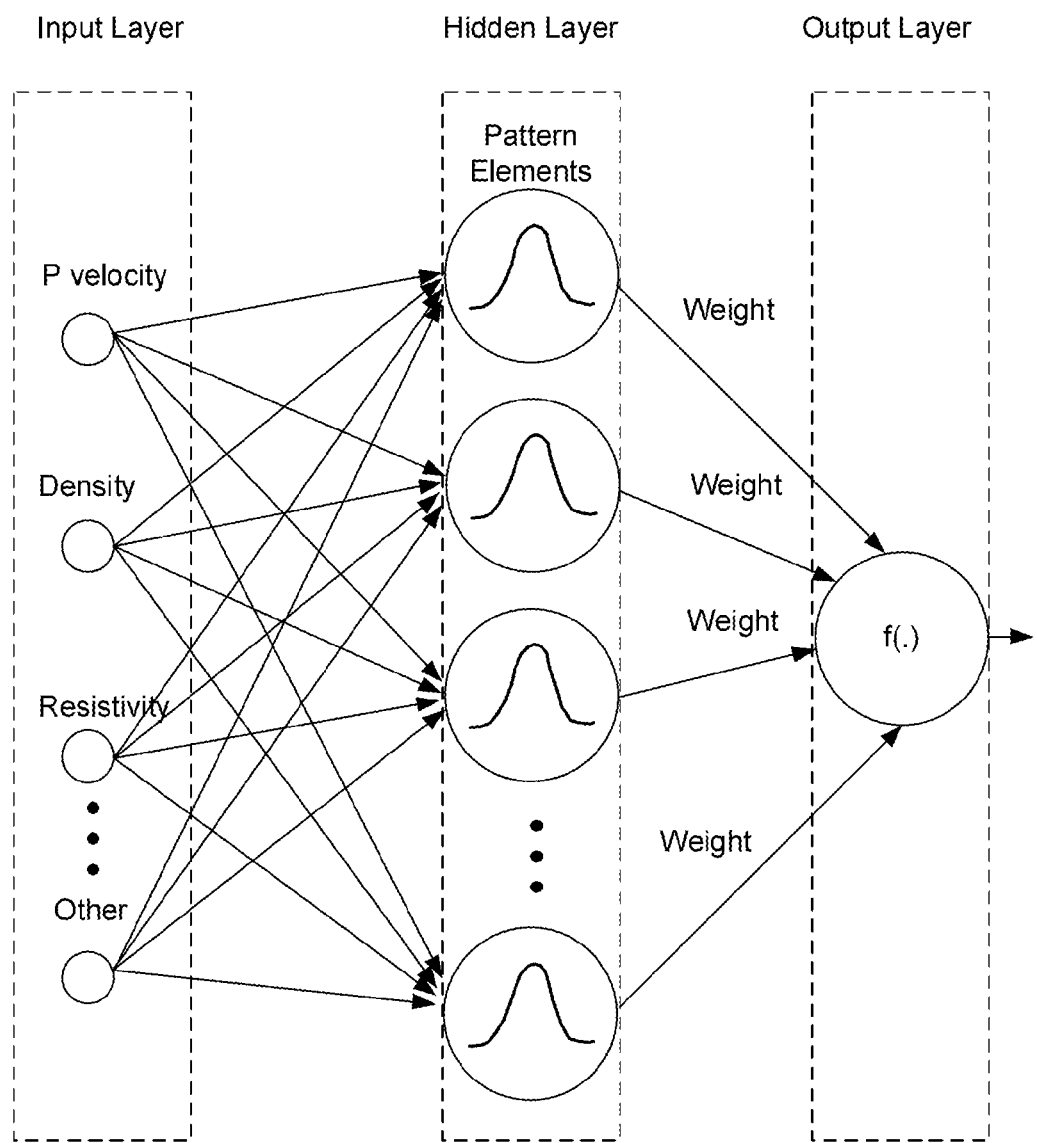
FIG. 8 illustrates an example of an artificial neural network as may be included in the block 730 of FIG. 7.

FIG. 8 shows the structure of a radial basis function neural network (RBFNN); consider various aspects of a general regression neural networks (GRNN) (see, e.g., D. F. Specht, "A General Regression Neural Network," IEEE Transactions on Neural Networks, vol. 2, no. 6, pp. 568-576, 1991, which is incorporated by reference herein). The terms neuron and processing element (PE) may be interchangeable. As an example, an input layer is composed by simple distribution neurons, which forward geophysical property values to the hidden layer. These geophysical properties can include, but are not limited to, one or more of P-velocity, S-velocity, density and resistivity.

As shown, the hidden layer includes neurons with Gaussian-like transfer functions, akin to those of a GRNN, with the difference that instead of having a constant, tunable standard deviation, they are governed by a tunable covariance matrix. In RBFNN terminology, these neurons may be referred to as pattern elements. The transfer function of the i-th pattern element is $$y_i = e^{\frac{1}{2\eta}(m_j-\mu_i)^T C_i^{-1}(m_j-\mu_i)} \qquad 1$$

where $m_j=[m_{1j}\ m_{2j}\ \ldots\ m_{Nj}]^T$ is a vector of N elements composed by the different N geophysical properties involved in the SJI and evaluated at the spatial position j; $\mu_i$ and $C_i$ are respectively a mean vector of M elements and a covariance matrix with dimensions N×N; $\eta$ is a scaling factor for the whole covariance, common to pattern elements. It allows controlling the spatial extension of the influence of each pattern element, as it will be clear in the following.

The neuron in the output layer can perform the following operation $$q_j = f(\cdot) = \sum_{i=1}^{K} w_i y_i \qquad 2$$

where $y_i$ are the outputs of the hidden layer as written in equation 1, $w_i$ are scalar weights and α K is the total number of PEs in the hidden layer. The output is defined as $q_j$ for easier reference to it in the following mathematical formulations.

Training an ANN means to establish proper values for the parameters of the hidden layer, which are $\mu_i$, $C_i$, K and $\eta$, and of the output PE, which are $w_i$. Once trained, the ANN is an approximation of the joint PDF of a single tuple of properties extracted from the different input models (P-velocity, density, resistivity, etc.) at a specific spatial position j.

As an example, functions are not necessarily strictly radial, because, for example, they may have an ellipsoidal section which is governed by the associated covariance matrix.

Taking now into account a set of M different spatial positions where the link is evaluated, the joint PDF conditioned to the link, of the N properties at the M spatial positions may be formulated as $$f_{m_1,m_2,\ldots,m_N|L}(m_1,m_2,\ldots,m_N) = \Pi_{j=1}^{M} q_j \qquad 3$$

where it may be assumed that the random variables at different spatial positions are to be independent. The spatial dependency between them is already taken into account by the regularization or covariance terms of the PDFs of the single domains.

For simplifying the following notation, one may rewrite equation 3 as $$f_{m|L}(m) = \prod_{j=1}^{M} q_j \qquad 4$$

where m is the block joint model vector composed by the N model vectors of the N domains involved in the SJI. As an example, the block 730 may implement equation 4.

With a PDF expressed by equation 4 a method may include building the a-posteriori PDF of the inverse problem, for example, as:

$$f_{m|d}(m\mid d) = \frac{f_{d|m}(d\mid m) f_m(m)}{f_d(d)} \qquad 5$$

where $$f_{d|m}(d\mid m) = \prod_{n=1}^{N} f_{d_n|m_n}(d_n\mid m_n) \qquad 6$$

is the PDF of the joint data vector conditioned to the joint model vector. The denominator in equation 5 is:

$$f_d(d) = \prod_{n=1}^{N} f_{d_n}(d_n) \qquad 7$$

is the PDF of the joint data vector. The second term in the numerator of equation 5 can include a priori knowledge on the models and can be expressed as $$f_m(m) = f_{m|L}(m)\prod_{n=1}^{N} f_{m_n|m_{pri,n}}(m_n\mid m_{pri,n}) \qquad 8$$

where the first term is as in equation 4. The second term is the product of the PDFs of the models of the different domains, conditioned to the respective a priori models.

As an example, a general solution to the SJI problem is expressed by equation 5. On the other hand, it may not necessarily be possible to obtain the solution expressed in equation 5 and as such, for example, the inverse problem may be solved by searching for the Maximum A-Posteriori (MAP) solution, which can involve finding m so that it maximizes equation 5 (e.g., either globally or locally). Furthermore, the term expressed in equation 7 is often a uniform distribution or a very smooth distribution, covering a region larger than the region where the maxima of equation 5 are located. In such cases, the denominator of equation 5 can be ignored in the maximization algorithm, which reduces to the maximization of the sole numerator of equation 5.

Often, the $f_{d_n|m_n}$ terms in equation 6 and the $f_{m_n,m_{pri,n}}$ in equation 8 are multivariate Gaussian PDFs. In these cases, and for the MAP approach, instead of maximizing equation 5 it is convenient to minimize the opposite of the natural logarithm of equation 5. With this technique it can be possible to obtain the so-called objective function or cost function of the inverse problem and the MAP solution may be achieved searching for the minimum of this objective function. In such cases, the structure of the block 730 in FIG. 7 may be modified to provide computations relative to the objective function of the link (e.g., and not relative to its PDF). The mathematical computation to be performed in the case of the objective function can be found substituting equation 1 into equation 2 and taking the opposite of the natural logarithm. The resulting expression is $$t_j = -\log\left(\sum_{i=1}^{K} w_i e^{-\frac{1}{2\eta}(m_j-\mu_i)^T C_i^{-1}(m_j-\mu_i)}\right) \qquad 9$$

The minimization of the objective function of the inverse problem may be carried out through deterministic minimization algorithms, which also can include the computation of the gradient of the objective function. The gradient of $t_j$ in equation 9 with respect to the model vector is $$\nabla t_j = \frac{1}{\eta q_j} \sum_{i=1}^{K} w_i y_i C_i^{-1}(m_j - \mu_i) \qquad 10$$

Figure 9:
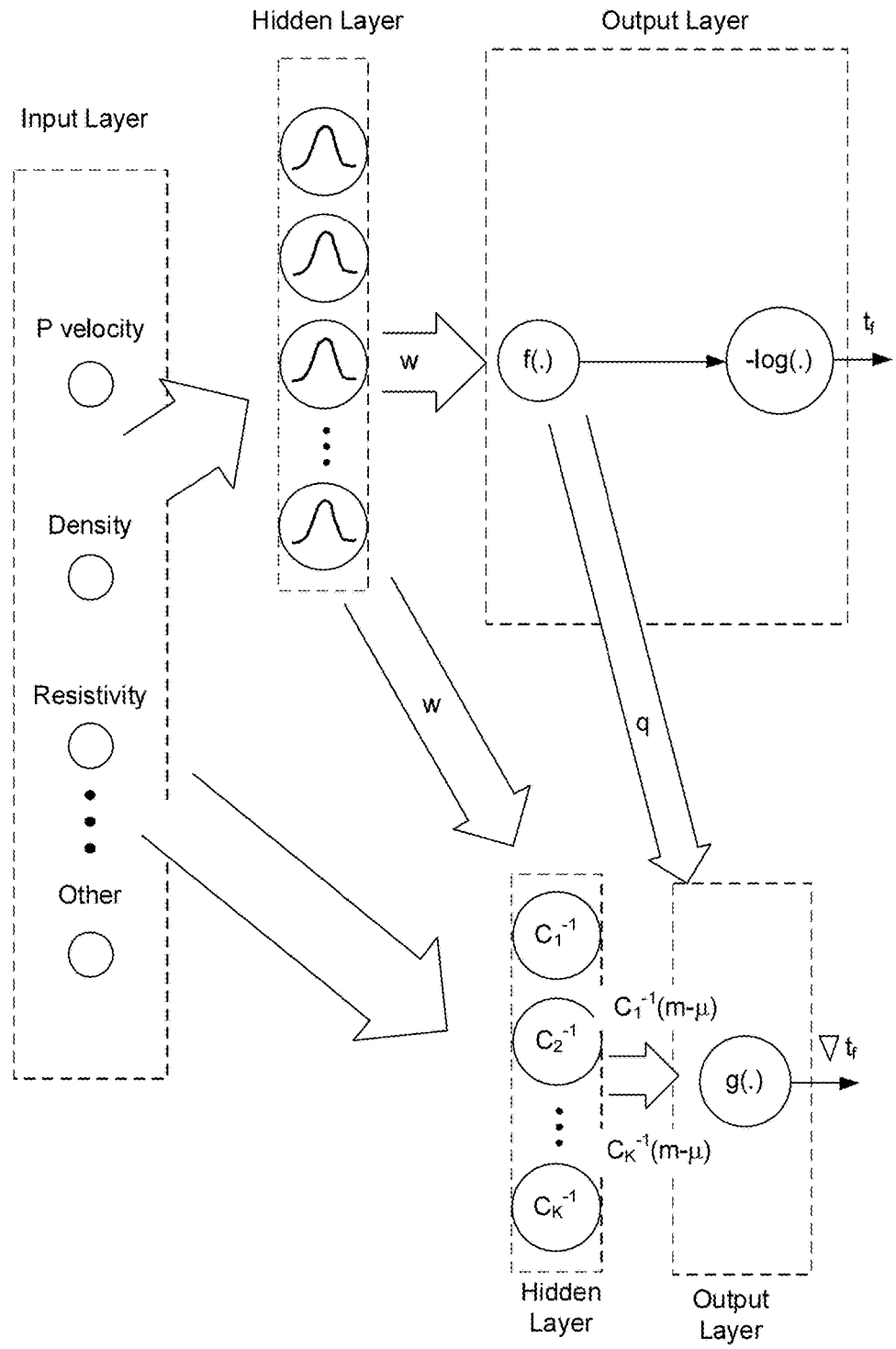
FIG. 9 illustrates an example of a neural network that may simultaneously compute a value and a gradient of an objective function of a link.

The computations expressed in equations 9 and 10 may be performed simultaneously modifying the structure of the neural network in FIG. 8 as shown in FIG. 9.

The modified neural network combines two neural networks. The ANN in the top part of the figure is at least approximately that of FIG. 8 with the addition of an output PE that performs the logarithm operation. The ANN in the bottom implements the computation in equation 10 efficiently reusing the computations performed by the hidden layer of the top ANN. The transfer function of the output PE of the bottom ANN is $$g(\cdot) = \frac{1}{\eta q_j} \sum_{i=1}^{K} w_i y_i C_i^{-1}(m_j - \mu_i) = \nabla t_j \qquad 11$$

Training the Artificial Neural Network

Figure 10:
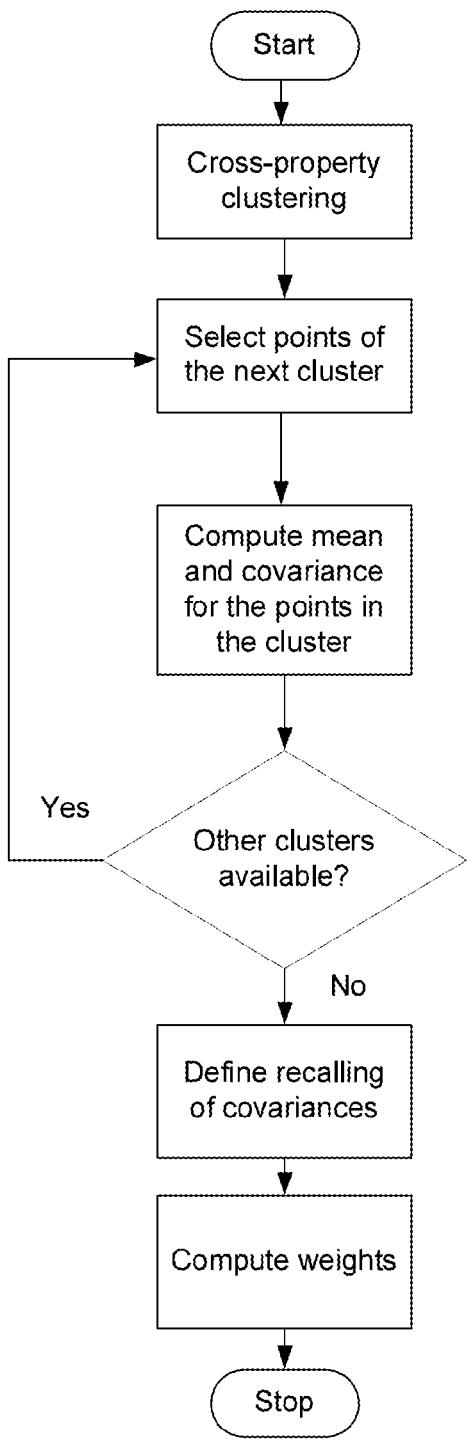
FIG. 10 illustrates an example of a flowchart of a training algorithm for an ANN.

As mentioned, an ANN is to be trained before use. Training of an ANN is performed by the block 720 of the method 700 of FIG. 7. FIG. 10 shows an example algorithm for the training of an ANN. The first operation to perform is the clustering of the N-dimensional space spanned by the N properties to jointly invert. Depending on the a priori information available, this operation can be carried-out in one or more different ways.

If some measurements of the properties in the same spatial positions are available (e.g. through well-logs or through Monte-Carlo simulation with petrophysical relationships) it may be possible to use clustering algorithms like K-means or start an unsupervised learning algorithm on a Self Organizing Map (SOM). As an example, one or more vector quantization techniques may be used. There are also several methods for choosing the total number of clusters K. A cluster may be specified to include a sufficient number of points for allowing a reliable estimation of its mean and of its covariance matrix.

After the clustering step there is a loop over clusters, for estimating their mean vector and their covariance matrix.

If $x_n$ is one of the vector formed by the different properties measured at the same spatial positions, the mean vector of the i-th cluster is computed as $$\mu_i = \frac{1}{N_i} \sum_{n=1}^{N_i} x_n \qquad 12$$

where $N_i$ is the total number of samples belonging to the i-th cluster. The unbiased estimate of the covariance matrix of the i-th cluster is done with $$C_i = \frac{1}{N_i - 1} \sum_{n=1}^{N_i} (x_n - \mu_i)(x_n - \mu_i)^T \qquad 13$$

Due to a limited number of dimensions, the inverse of the covariance matrix for each cluster may be computed and can be stored for subsequent parameterization of the ANN in the block 730 of FIG. 7.

In absence of a set of $x_i$ vectors, geologic a-priori knowledge of the region under investigation may be used to manually define the number of clusters K, their means and their covariances.

After cluster means and inverse covariance matrices have been estimated, it can then be possible to tune the η parameter so that it minimizes the oscillations of the PDF of the link between clusters. This step can be performed by a trial and error approach or through an iterative algorithm, analogously to how the standard deviation parameter is estimated in a GRNN.

As an example, a method can include computing weights $w_i$, for example, using a probabilistic approach. For example, a method can include building a multivariate function which is proportional to a true PDF of the link (e.g., sufficient for inversion purposes). A PDF of a link can be built interpolating the histogram that can be obtained from the distribution of the properties among clusters. As an example, an interpolating base function can include a Gaussian shape (see, e.g., GRNN approaches). In mathematical terms, consider as an example:

$$q_j = \alpha \sum_{i=1}^{K} p_i e^{-\frac{1}{2\eta}(m_j - \mu_i)^T C_i^{-1}(m_j - \mu_i)} \qquad 14$$

where $p_i$ is the empirical probability (or empirical frequency) of being into the i-th cluster, and α is a proportionality constant. For a population of samples for the link estimation, a method may include computing $p_i$ as $$p_i = \frac{N_i}{N_{tot}} \qquad 15$$

where $N_i$ is the number of samples belonging to the i-th cluster, while $N_{tot}$ is the total number of samples used for estimating the link. More deep geophysical knowledge may provide for computation of such probabilities using a particular statistical distribution. If, on the other hand, with manual setting of cluster centroids on a cross-property plot, such probabilities may be estimated according to:

$$p_i = \frac{1}{N_c} \qquad 16$$

with $N_c$ the total number of clusters. In this case, there may be a uniform distribution for the clusters. Another possibility for estimating these probabilities can be to divide the space covered by the total link cloud into separate cells (e.g. Voronoi cells) and to compute:

$$p_i = \frac{V_i}{V_{tot}} \qquad 17$$

with $V_i$ the volume covered by the i-th cell and $V_{tot}$ the total volume covered by the link cloud. From a simple comparison between equation 14 and equation 2 it is evident that:

$$w_i = \alpha p_i \qquad 18$$

As an example, a suitable choice for the α proportionality constant is a value that makes the maximum of $q_j$ slightly less than one. Such an approach may be useful for situations where a method includes using the formulation in equation 9, because it brings the minimum of the objective function close to (but greater than) zero and this knowledge can be used to optimize the performance of the minimization algorithm.

As an example, once an ANN is trained, it may be implemented in a SJI technique, for example, such as that of the block 740 of FIG. 7.

As an example, an algorithm may be implemented as one or more of software programs and electronic hardware. As an example, due to modularity, one or more ANNs may be implemented via circuitry. Such an approach may expedite processing and optionally allow for real-time solutions (e.g., real-time output).

As an example, the training algorithm described is efficient because it is sufficient to make one single scan over a set of clusters to determine the parameters of the ANN. For this reason, it may be implemented in a real-time scenario (e.g., a system, a method, etc.).

Synthetic Example (E.g., with Correlations Taken from a Real Dataset)

Figure 11:
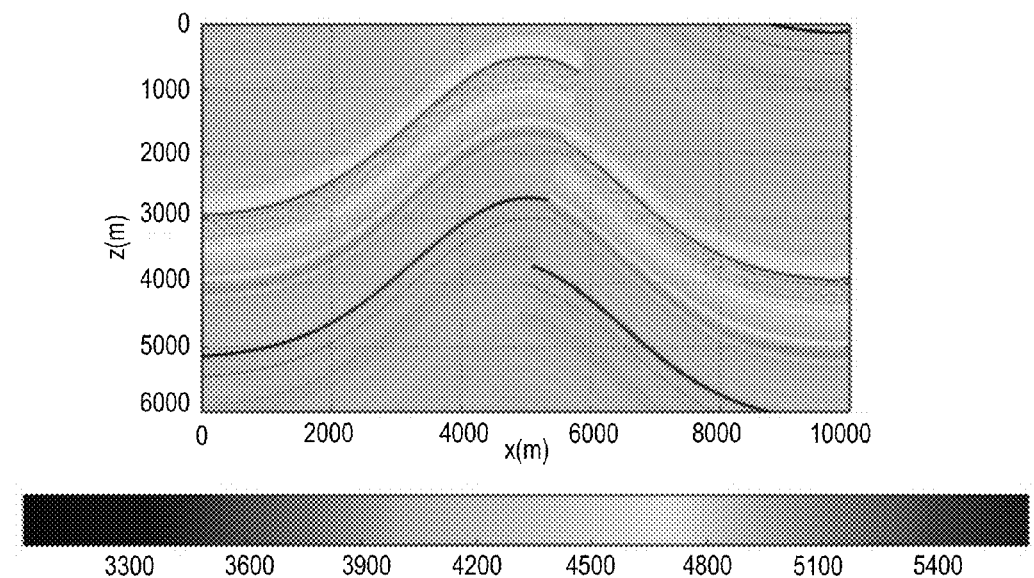
FIG. 11 illustrates an example of synthetic velocity model for a cross-section at y=2500 m and a plan section at z=1000 m where velocities are in m/s.
Figure 11:
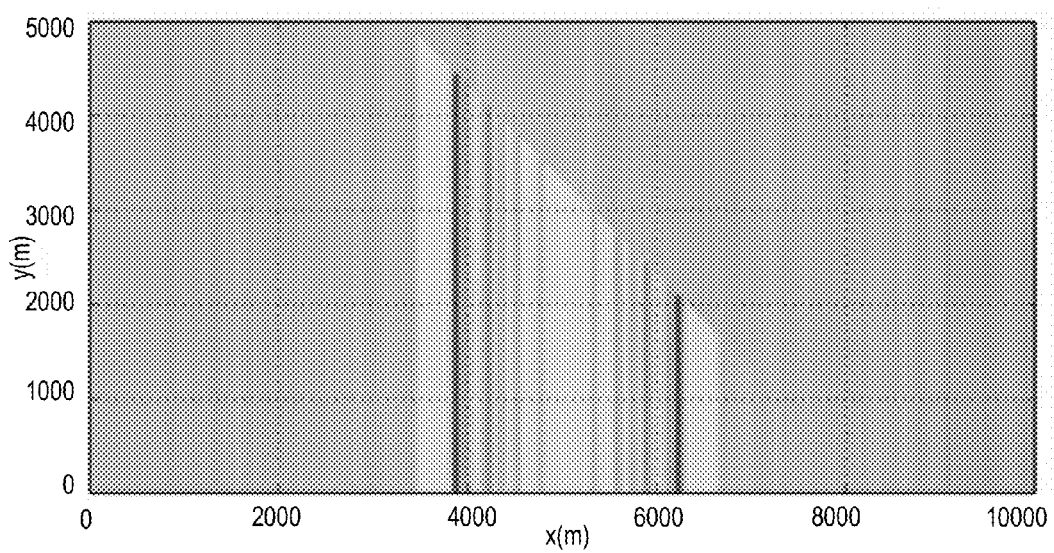
Figure 12:
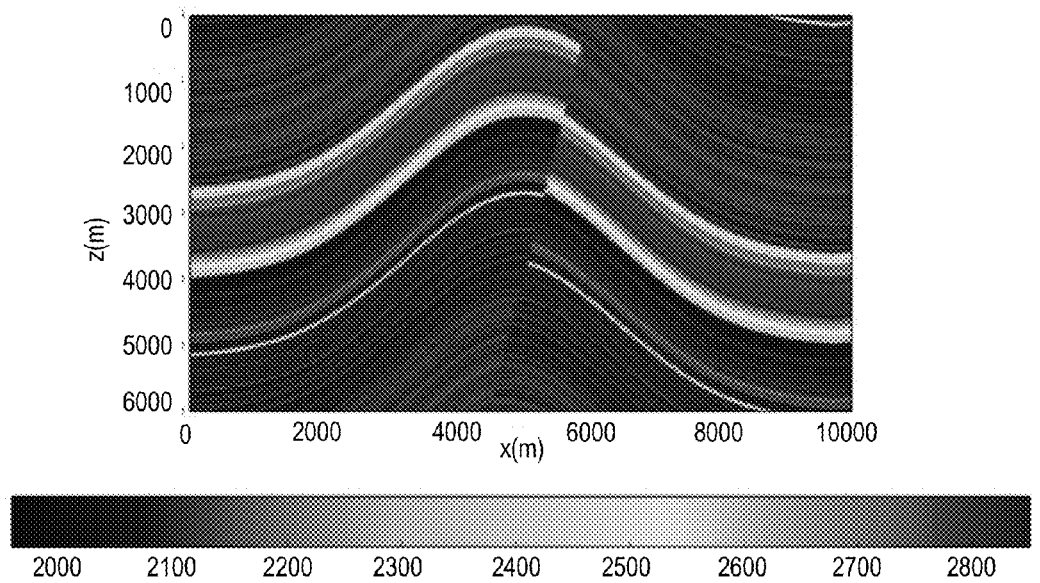
FIG. 12 illustrates an example of a synthetic density model for a cross-section at y=2500 m and a plan section at z=1000 m where densities are in kg/m3.
Figure 12:
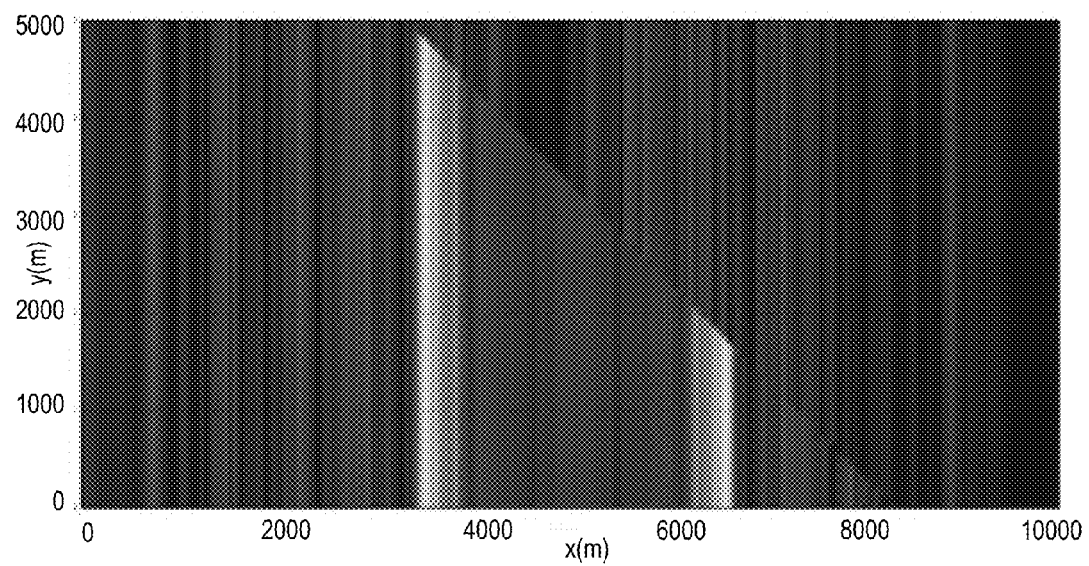

A synthetic working example is presented as built for testing various algorithms. The built synthetic models were built using real well-log recordings of P-velocity and density. Taking the recording from the well-log, processing was implemented to upscale the property along the x direction with a Gaussian shape and with no shape in the y direction. To have a model with 3D geometries, a fault inclined by 105 degrees in the x-z plane was generated, where z is depth, and by 135 degrees in the x-y plane. Both synthetic velocity and density models extend for 10 km in x, 5 km in y and 6 km in z. They are composed by homogeneous prismatic cells, with dx, dy and dz dimensions of 50 m, 50 m and 18.86 m. Cross and plan sections of these synthetic models are shown in FIG. 11 and FIG. 12.

Figure 13:
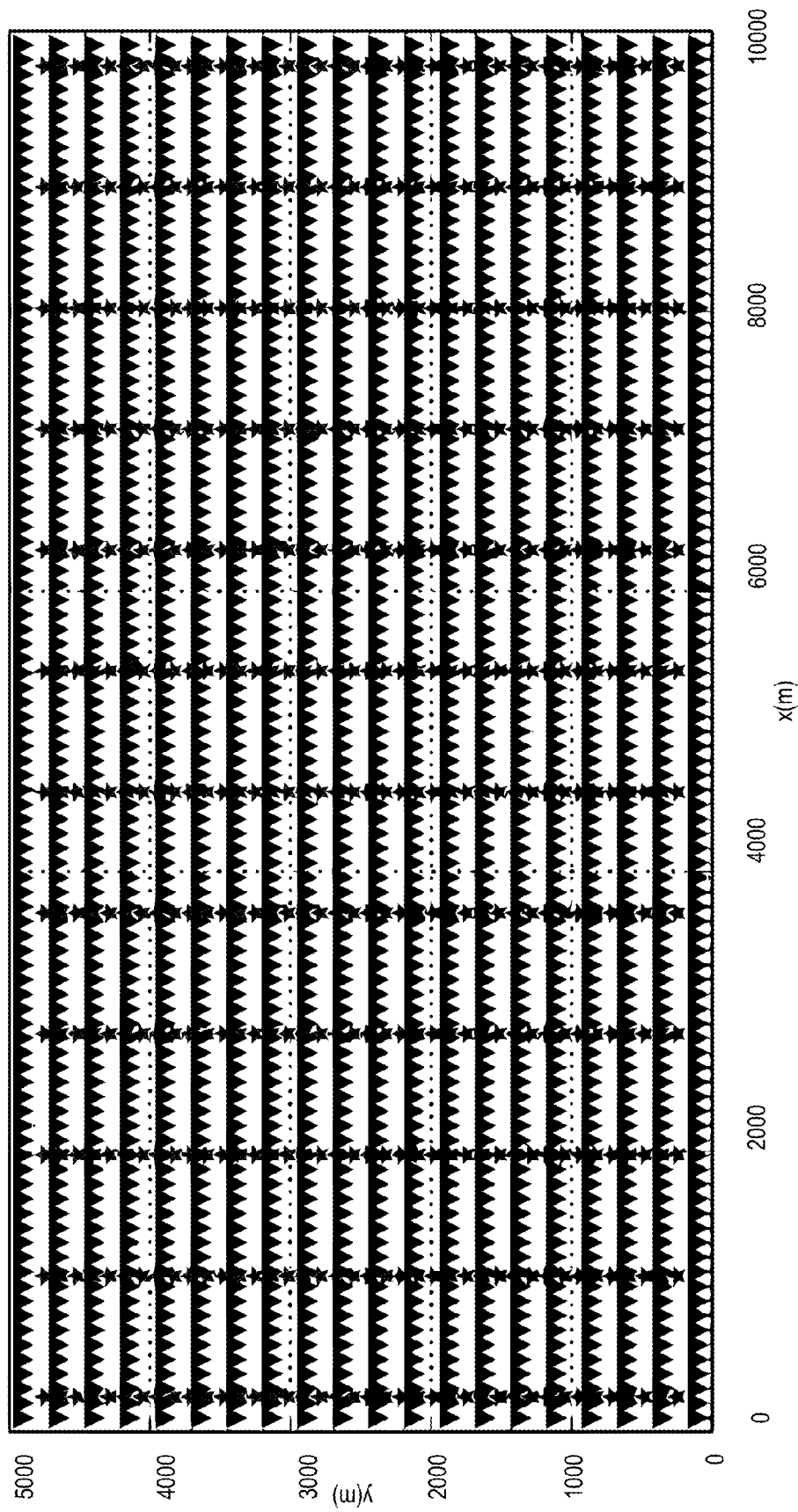
FIG. 13 illustrates an example of acquisition geometry for the seismic simulation where red stars represent the sources and black triangles represent the receivers.

The acquisition geometry for the seismic simulation is shown in FIG. 13. Receiver lines, represented by black triangles, are spaced by 253 m, with a receiver interval of 104 m, for a total of 1900 receivers. Source lines, represented by red stars, are spaced by 864 m with a source interval of 346 m, for a total of 480 sources. In such an example, the 1900 receivers are active while shooting.

Figure 14:
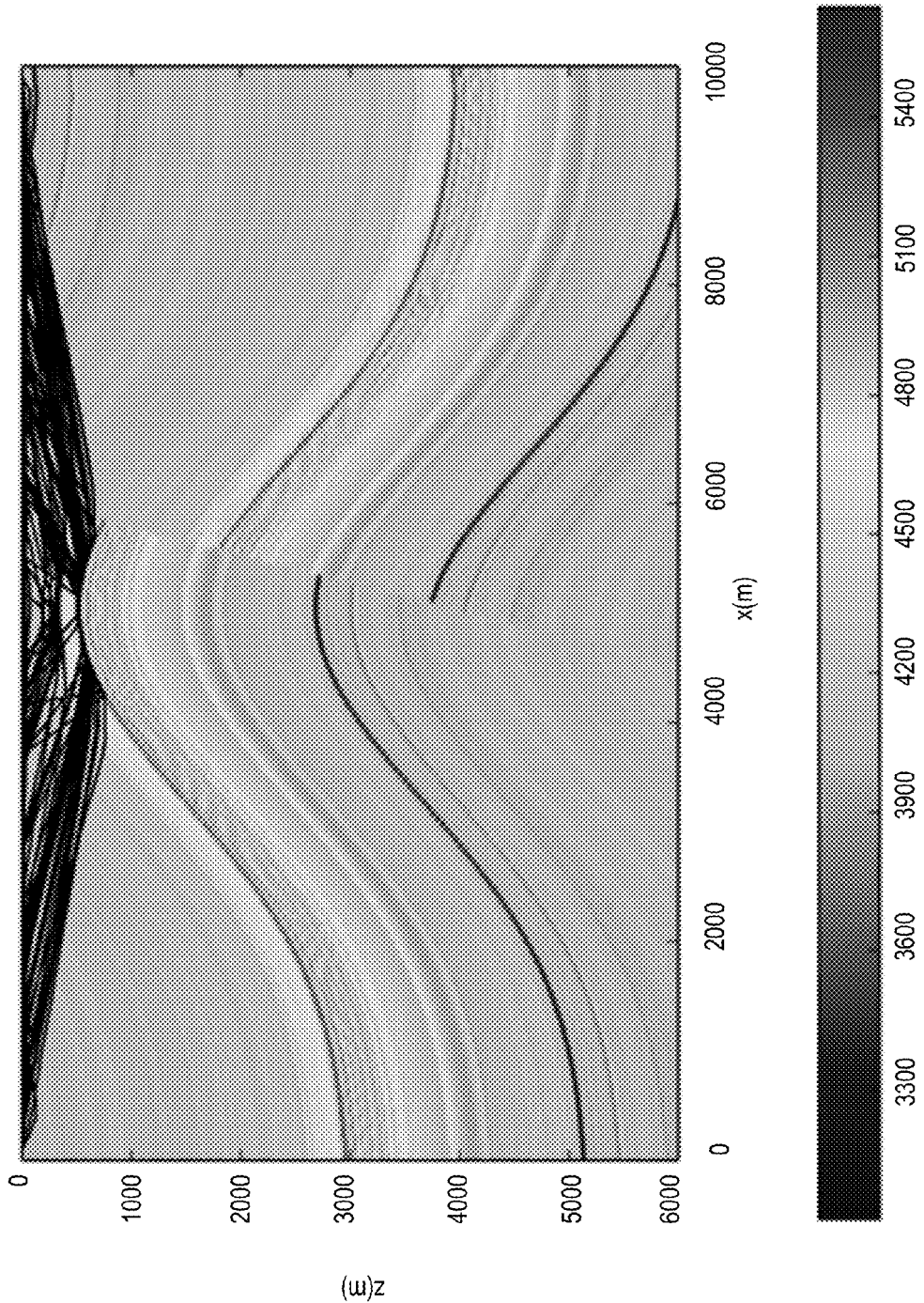
FIG. 14 illustrates an example of refracted rays on top of a synthetic velocity model (projection on the plane y=2500 m)

FIG. 14 shows some rays on the synthetic model. These rays have been projected on the plane y=2500 m, for facilitating visualization. Refracted data are sensitive approximate to the near-surface, up to a depth of about 1000 m. It is also evident that an issue with first arrival data is caused by the presence of a velocity inversion in the subsurface (e.g., rays unable to penetrate deeper than the thin high velocity layer as shown).

Figure 15:
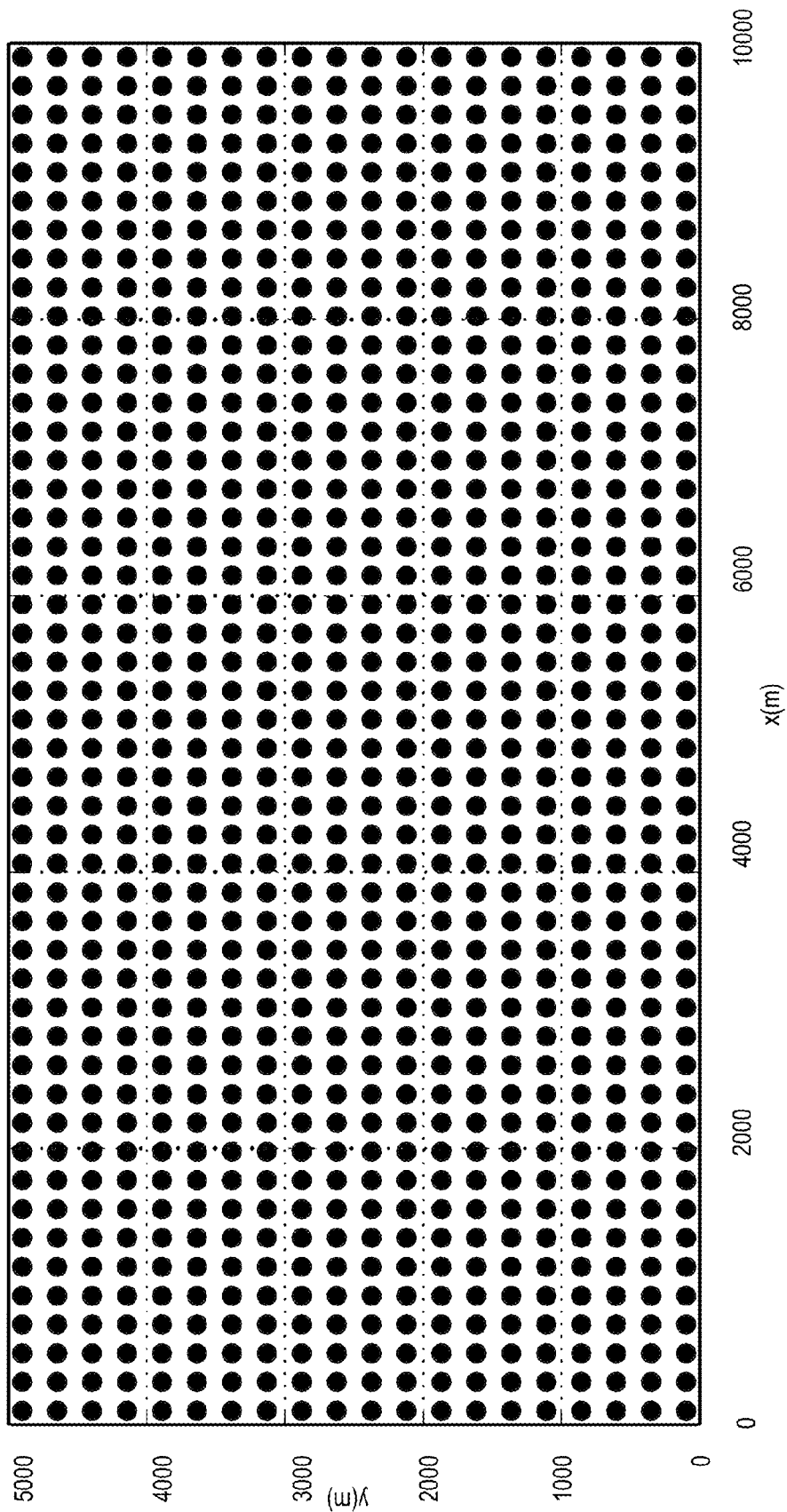
FIG. 15 illustrates an example of acquisition geometry for a gravity simulation.

FIG. 15 shows the acquisition geometry for the gravity simulation. There are 48 recording along x, spaced by 209 m, and 20 recording lines along y spaced by 253 m, for a total of 960 recordings.

Figure 16:
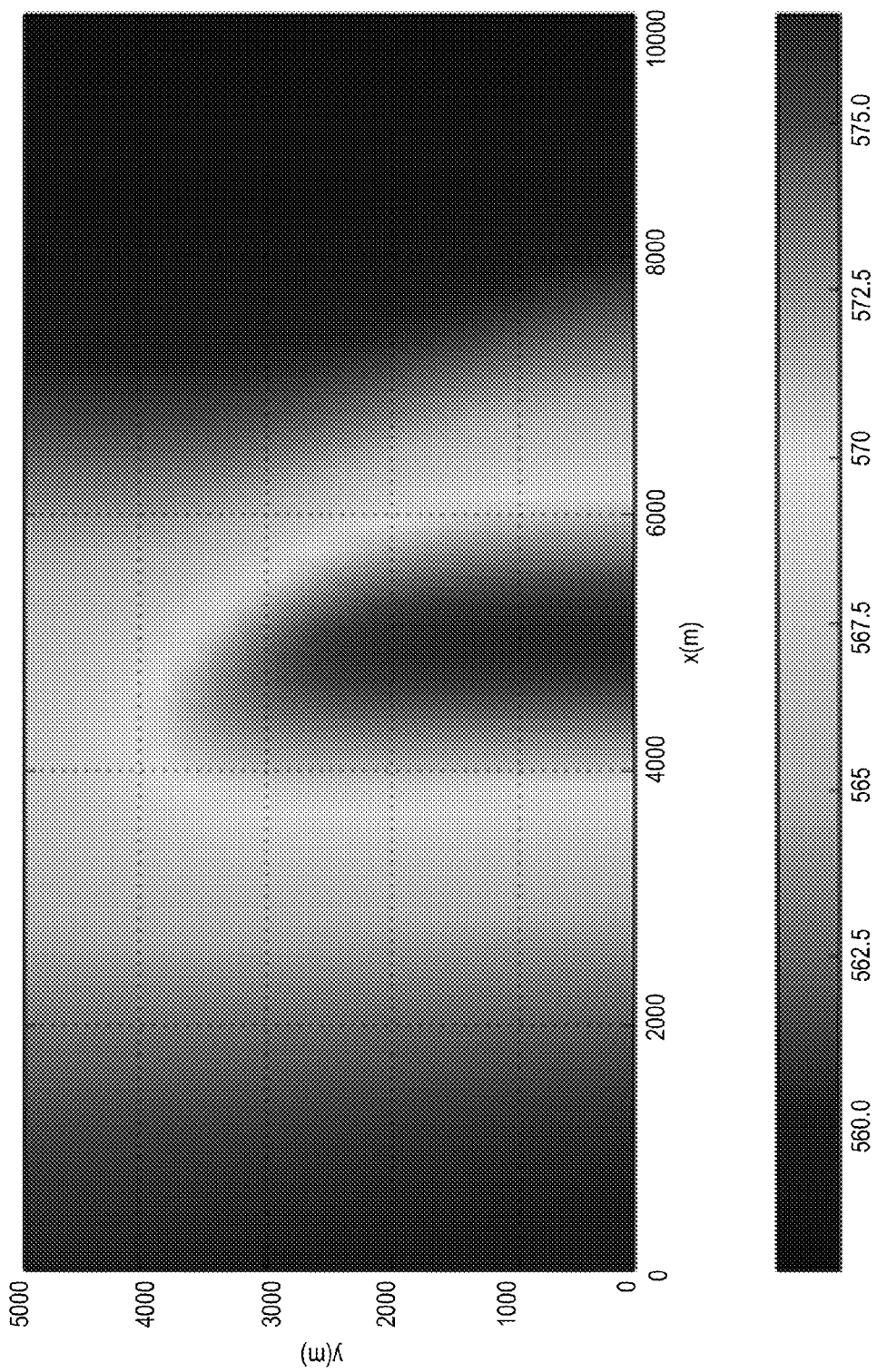
FIG. 16 illustrates an example of simulated gravity data.

FIG. 16 is a map view of the simulated gravity data. These are not Bouguer anomaly data. They represent the complete response of the model in FIG. 12. For this synthetic test, operating with Bouguer anomaly data, inverting for density contrasts with respect to a background model, starting with a model filled with zeroes will be completely equivalent to inverting the absolute density, starting from the same background model and using the data shown in FIG. 16. The inversion was performed in the second way, as it will be clearer in the following.

In various trial examples, there are not added random noise to gravity and seismic data. To assess robustness against noise, tests may be repeated in presence of different noise levels.

Figure 17:
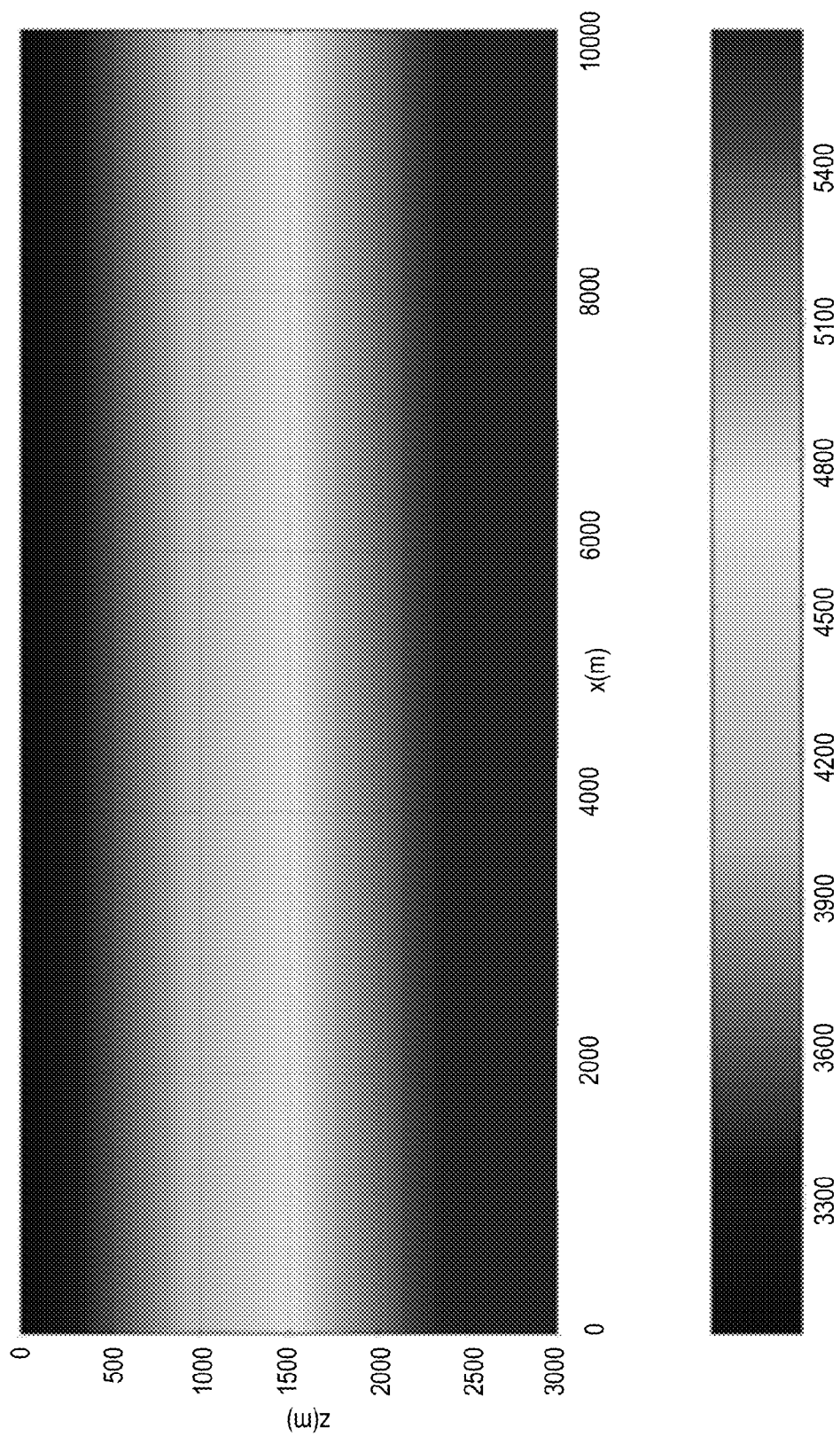
FIG. 17 illustrates an example of a starting velocity model as a vertical gradient from 3028 to 6347 m/s, on a first 3000 m of depth.

FIG. 17 shows a cross-section at y=2500 m of the starting velocity model used for the refraction tomography inversion. It is composed by a vertical gradient of velocities that cover the first 3000 m of depth. In such an example, going further in depth may be optional, particularly because, as shown in FIG. 14, the maximum depth of penetration of the rays is limited. In a real case the maximum extent for the starting model can be established from considerations on the average geology of the region and on the maximum offset present into the data. The sampling intervals chosen for the velocity model are 100 m in x and y and 50 m in z: it is a reasonable choice used in real refraction tomography situations. Furthermore, notice that the sampling interval for this inversion mesh is higher than that used for the simulation. Also this choice reflects the real case, where the inversion mesh is not practically able to resolve detailed, fine physical structures of the real world.

Figure 18:
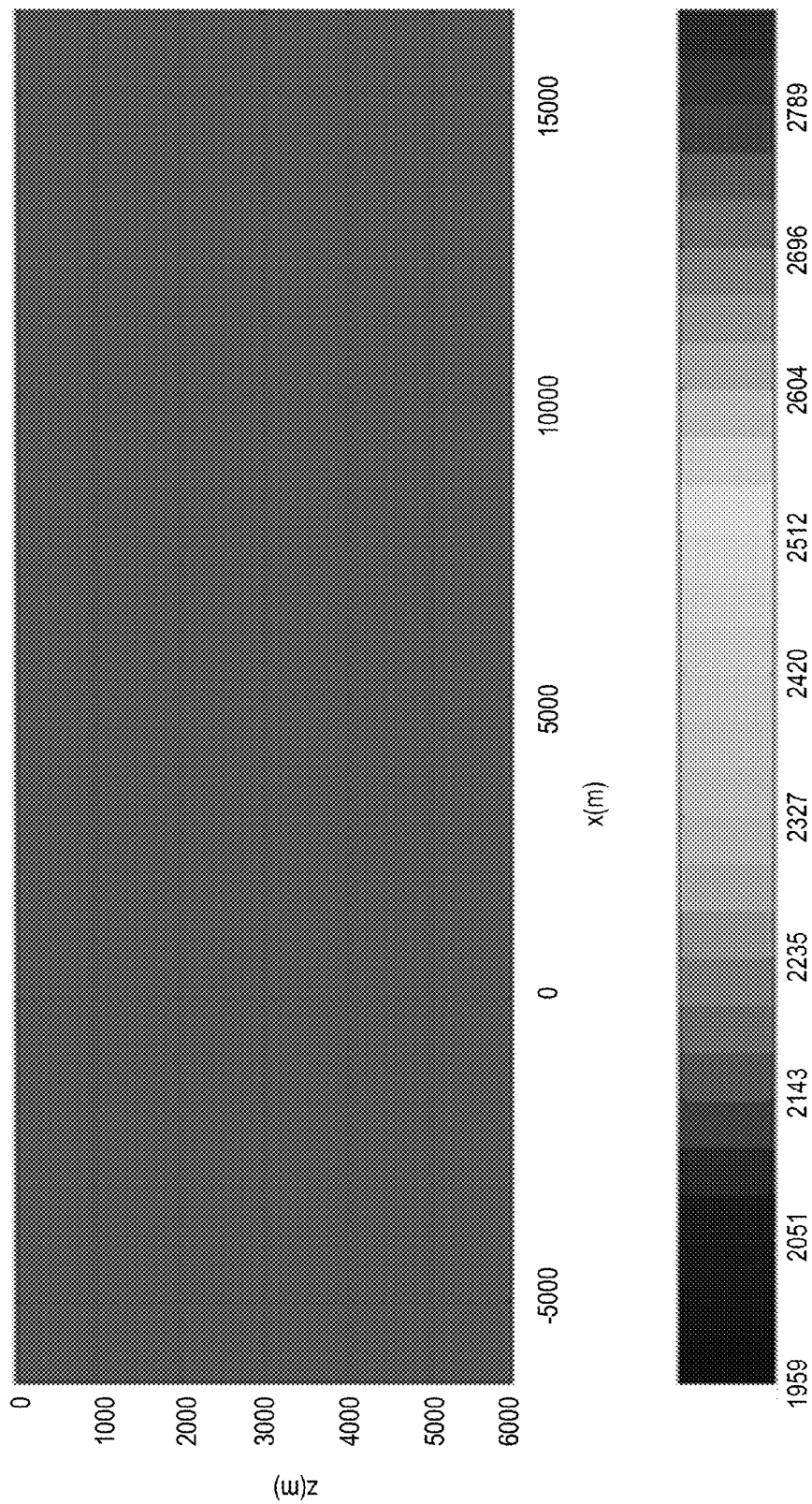
FIG. 18 illustrates an example of a cross-section at y=2500 m of a starting density model.

FIG. 18 shows a cross-section at y=2500 m of the starting density model. Here the mesh is not regularly gridded. The sampling interval in x has a value of 200 m in the core area between 0 and 10 km and then increases up to 500 m at the end of the outer padding region. The same situation holds for the y direction. The sampling interval in z is set constant to 100 m. The whole model is filled with a density of 2160 kg/m3. Also this setting tries to mimic a real situation, where some padding may be used for the inversion of gravity data, to avoid border effects in the core area. Furthermore, the sampling interval chosen for the density is not the same as that chosen for the velocity. This choice reflects the different resolution power of the tomography with respect to the gravity inversion.

Figure 19:
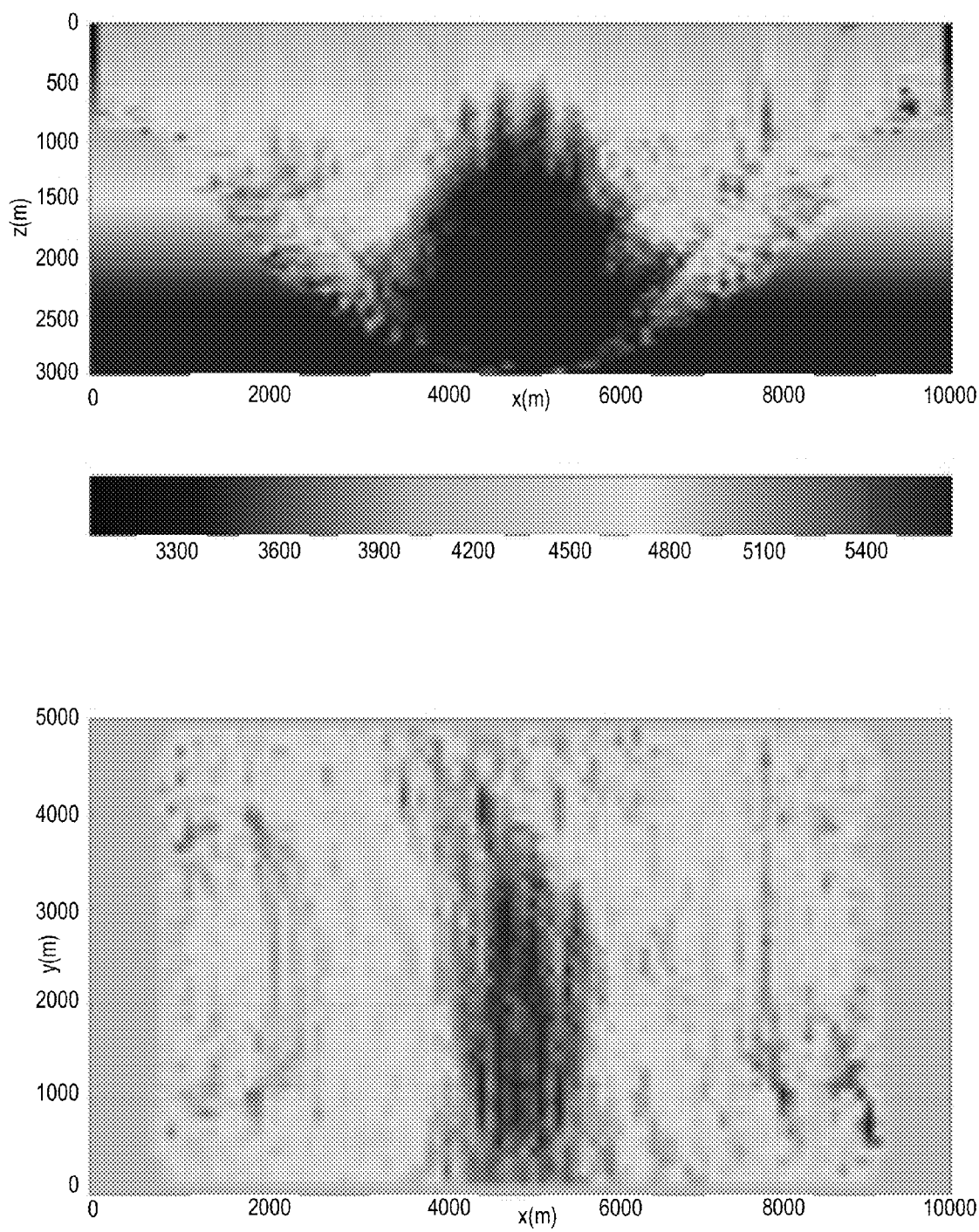
FIG. 19 illustrates an example of a cross-section at y=2500 m and plan view at z=1000 m of an output model of a single-domain tomography.

Performing one run of single-domain tomography, with a starting model as shown in FIG. 17, produces the result shown in FIG. 19. The near surface velocities are recovered quite well. Although the shape of the fault cannot be seen in the vertical cross-section, it is visible on the plan view.

Figure 20:
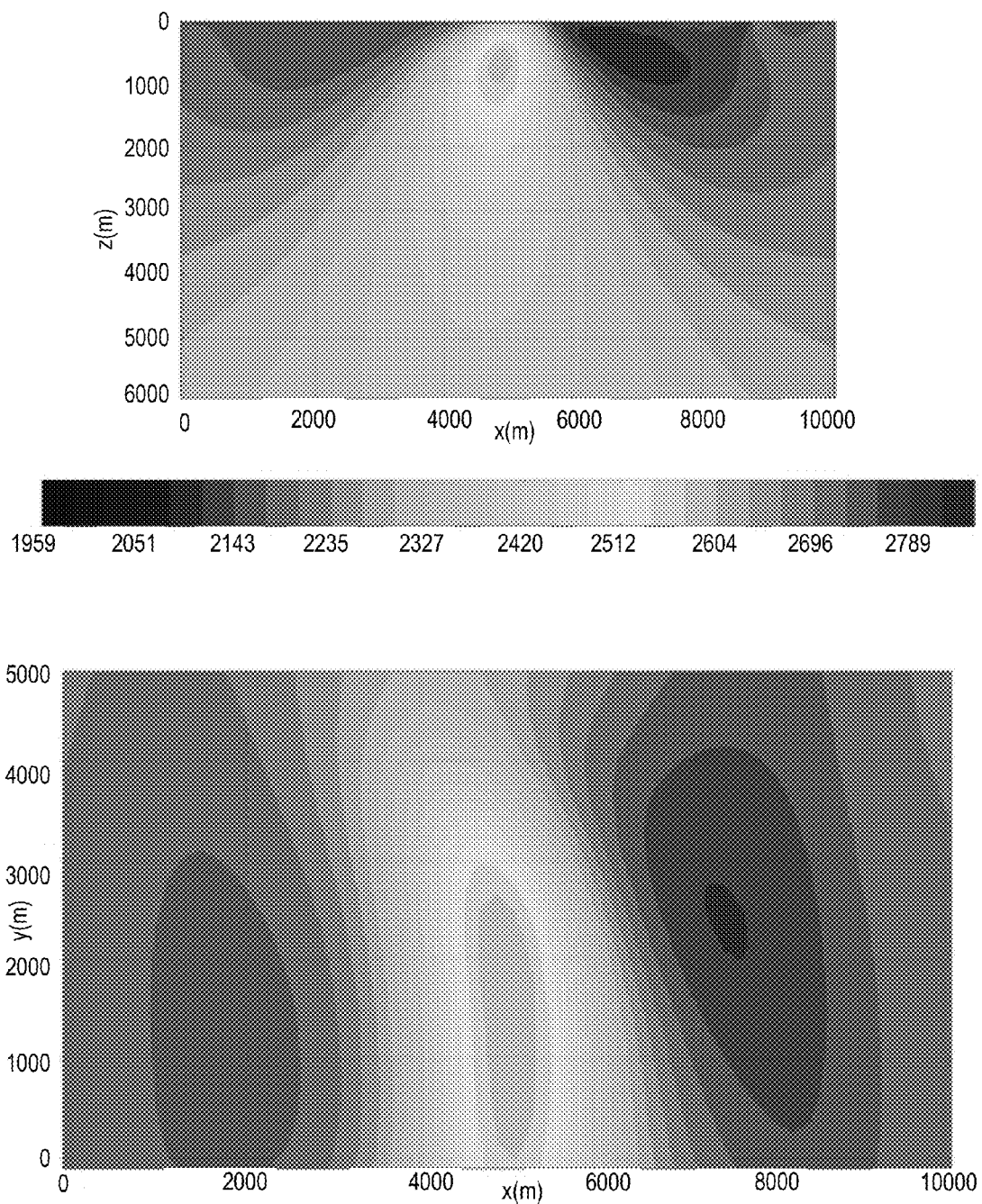
FIG. 20 illustrates an example of a cross-section at y=2500 m and a plan view at z=1000 m of an output model of a single-domain gravity inversion.

FIG. 20 shows the result of one run of a single-domain gravity inversion. Also here, looking at the plan view, one may recognize the presence of the fault (not visible in the vertical cross-section). Even if gravity has more sensitivity to deep targets with respect to refraction tomography, this sensitivity rapidly decays with a trend similar to the decay of the gravity field, which is inversely proportional to the square of the distance. The progressive loss of sensitivity is reflected by a loss of resolution in the vertical cross section as long as one may be moving towards deeper and deeper targets. In this example, the result is that the gravity inversion is not able alone to accurately resolve the bottom of the Gaussian-shaped structure built in the synthetic model.

After separate inversions, a trial was performed to try to simultaneously invert refraction and gravity data, using an adaptive link approach.

Figure 21:
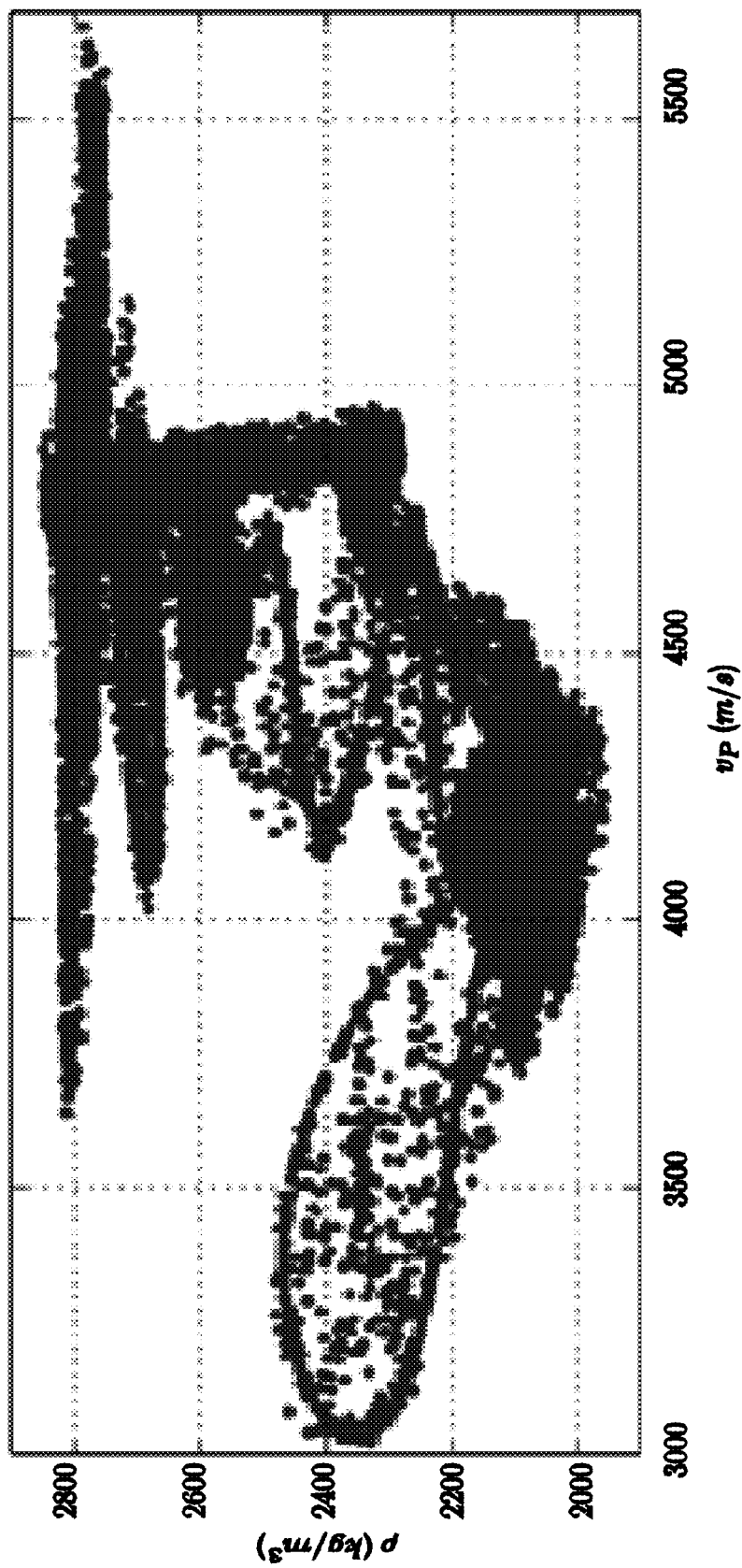
FIG. 21 illustrates an example of a cross-plot vP vs ρ where samples have been decimated by a factor five for visualization purposes.
Figure 22:
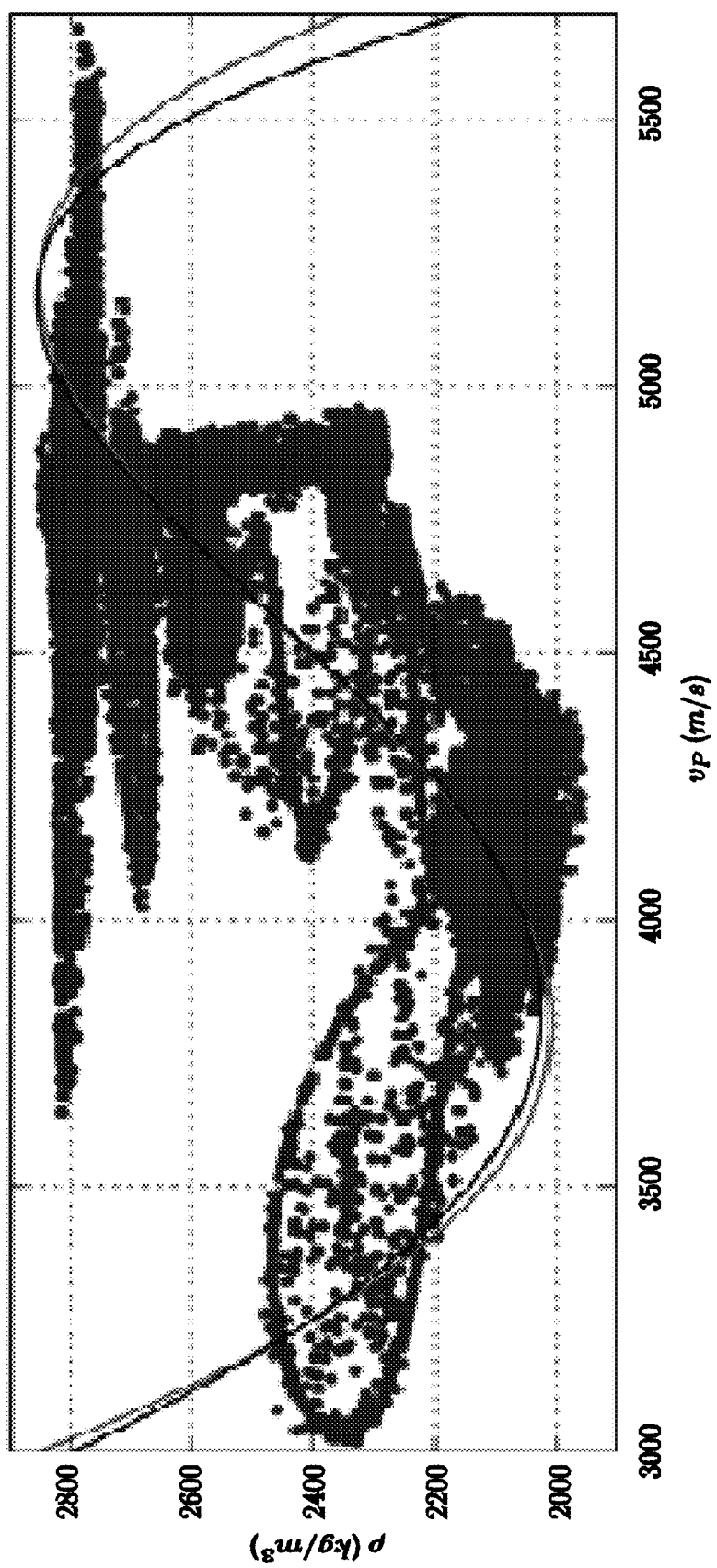
FIG. 22 illustrates an example of a cross-plot of vP vs ρ with polynomial fit where a red curve is a 4th order polynomial, while a black curve is a 5th order polynomial.

FIG. 21 shows a cross-plot of P-velocity and density: it is evident the complexity of the distribution of points. Any curve fitting model that relates density to velocity through a function would fail in this situation. As an example, FIG. 22 shows tentative of polynomial fit with polynomials of fourth and fifth order (e.g., inaccuracies are evident).

For clustering the cross-property distribution between P-velocity and density a trial used a SOM. A method included choosing the number of neuron according to the rule of thumb:

$$K = \sqrt{\frac{N_{tot}}{2}} \qquad (19)$$

Figure 23:
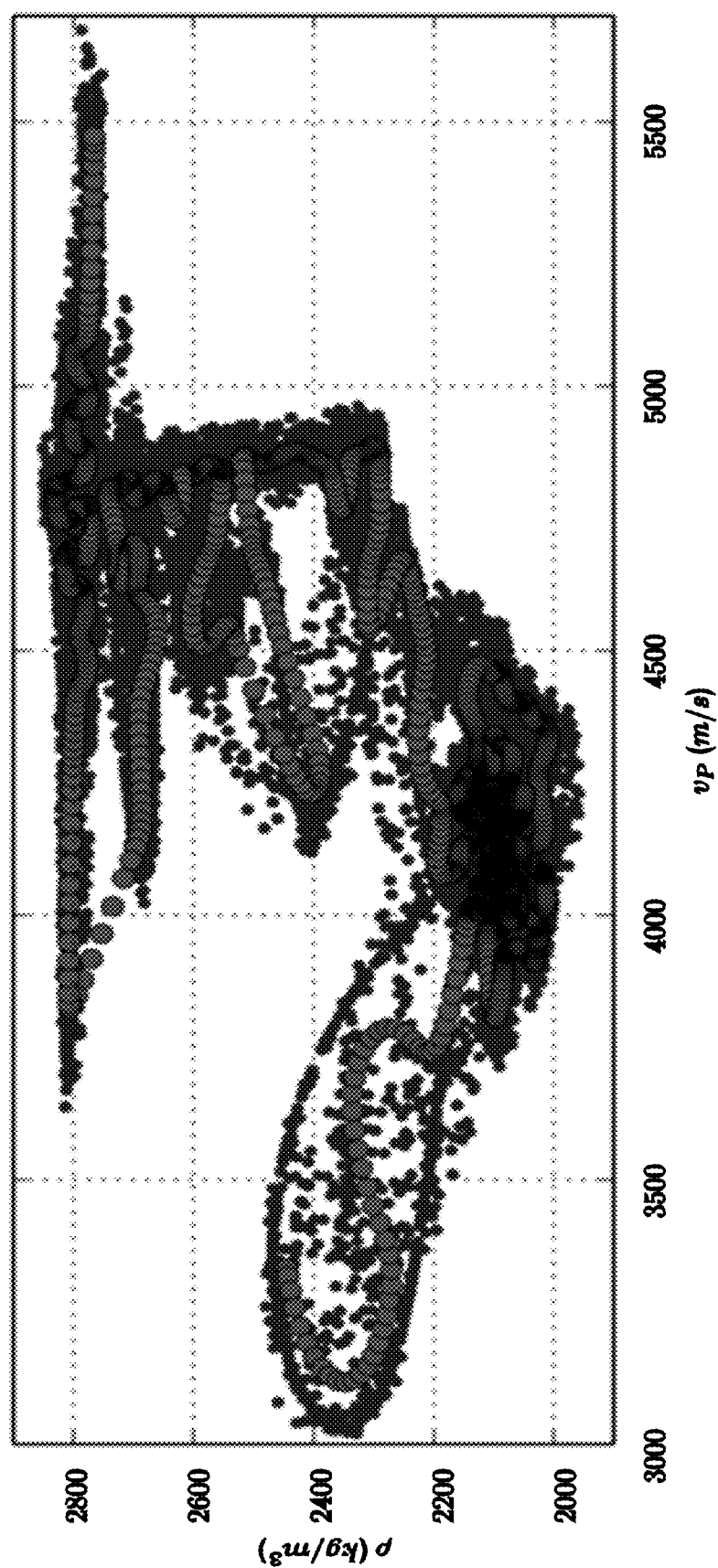
FIG. 23 illustrates an example of a trained self-organizing map (SOM) with 1784 neurons.
Figure 24:
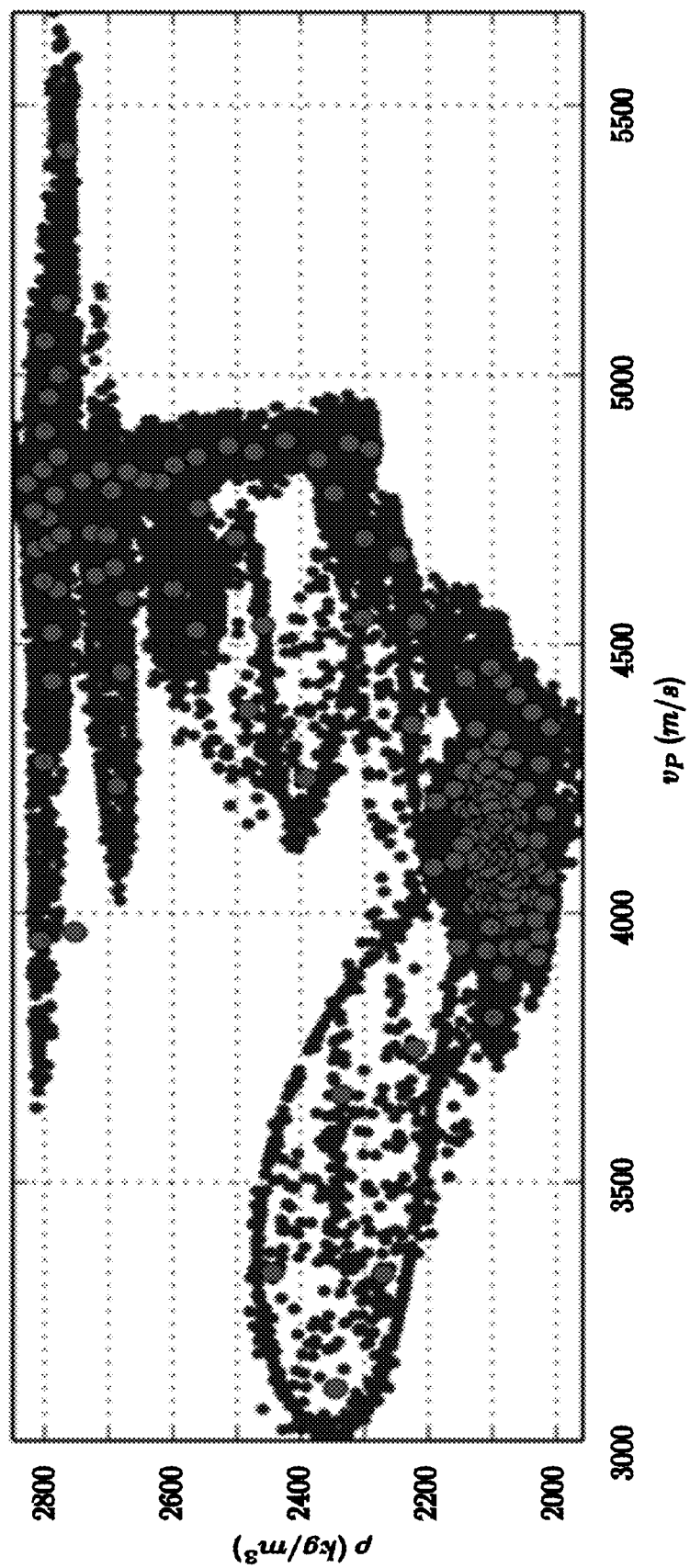
FIG. 24 illustrates an example of a trained SOM with 1/10 of the total number of neurons (e.g., 179 neurons)

For the training of the SOM, the method used the points coming from the synthetic models. The trained SOM is shown in FIG. 23. One may see how the SOM is able to recognize the pattern of the data. Here a SOM may be used for performing a vector quantization of the data, which may be performed with a number of neurons. As an example, the higher the number of neurons, the higher is the computational cost of the ANN in FIG. 9. Heuristically, a method may choose to subsample the neurons of the SOM by a factor of 10, obtaining the distribution shown in FIG. 24.

This configuration is sufficient for clustering the cross-property distribution. An individual neuron defines a cluster. A cross-property point (i.e. a point in the cross-plot) belongs to the cluster managed by the closest neuron which, in SOM terminology, is named as the Best Matching Unit (BMU).

After clustering the data, a method can compute the ANN parameters through a single scan over the clusters. By cross-plotting the coordinates of the mean vectors and those of the SOM nodes, one may notice that the positions of the neurons of the SOM are by themselves a good estimate of the mean of the corresponding cluster.

Figure 25:
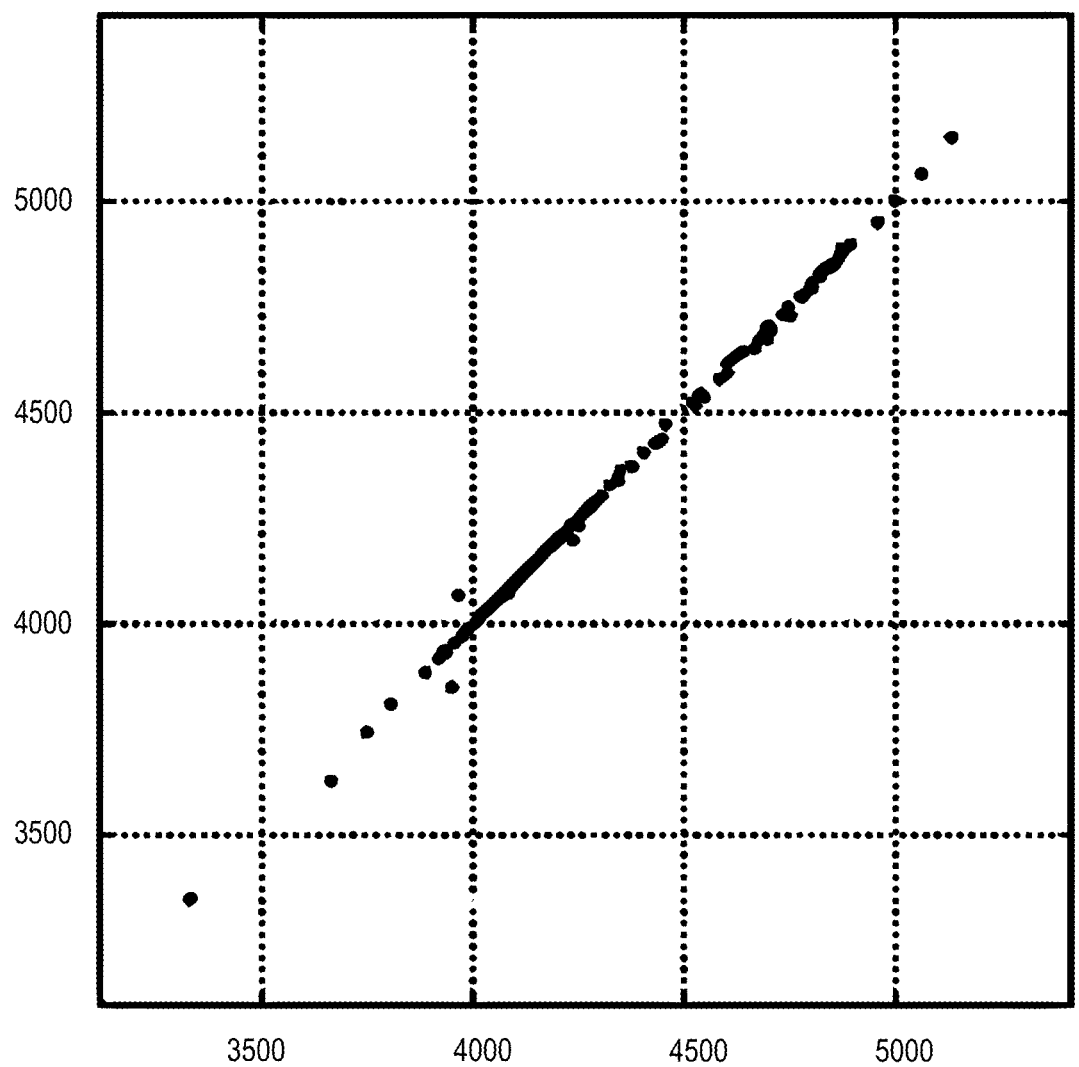
FIG. 25 illustrates an example of a cross plot of the P-velocity from the SOM neuron versus the one from the mean of the corresponding cluster.
Figure 26:
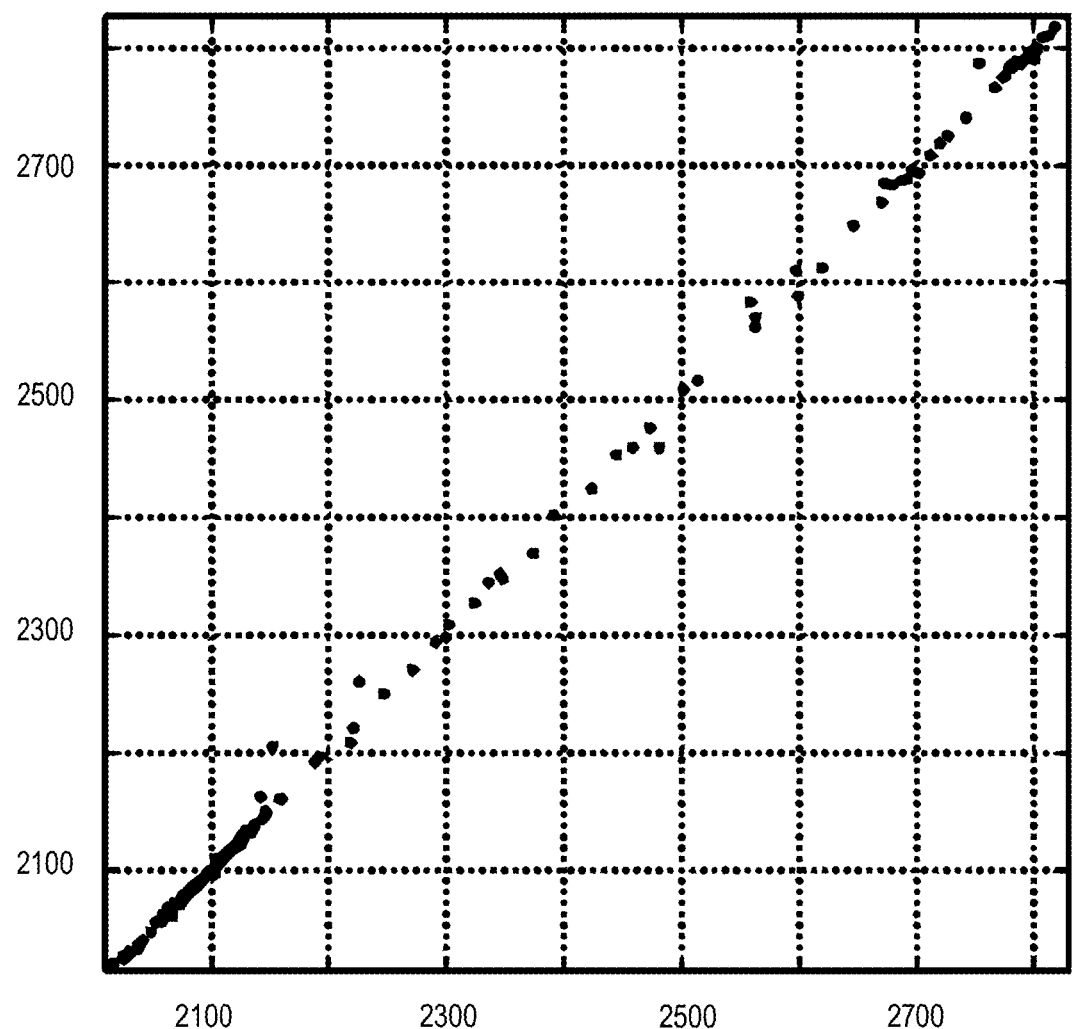
FIG. 26 illustrates an example of a cross plot of the density from the SOM neuron versus the one from the mean of the corresponding cluster.

FIG. 25 and FIG. 26 show the cross-plot of the coordinates of SOM nodes versus those obtained through the maximum likelihood estimation cluster means through equation 12. From these figures one may conclude that a method may possibly use directly coordinates of SOM nodes as an estimate of cluster means. Actually, using SOM nodes coordinates directly may be more robust against outliers. For this example, the computation of the mean is via equation 12.

Figure 27:
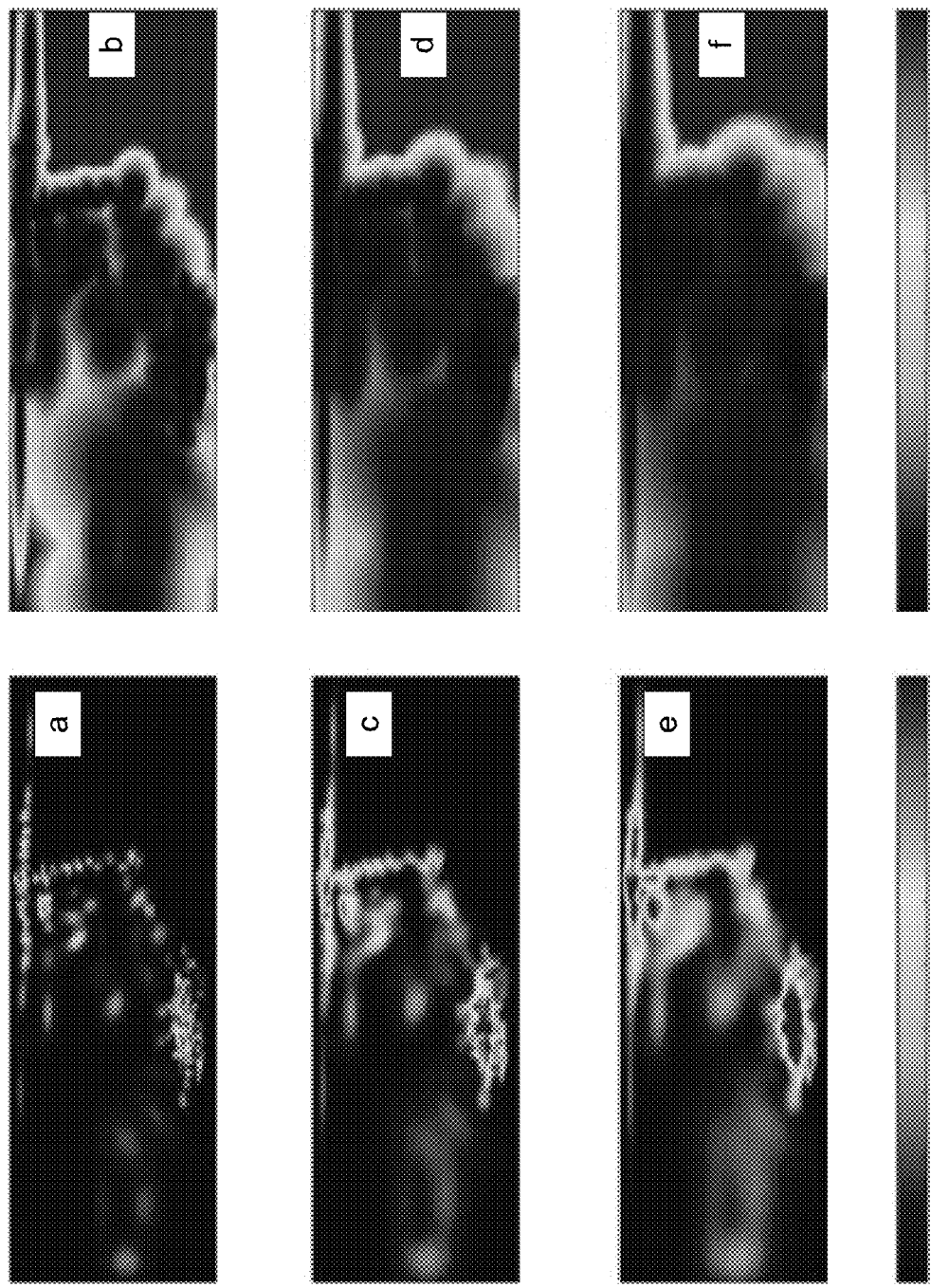
FIG. 27 illustrates examples of link probability density functions (PDFs) (left) and objective functions (right) estimated with different values of η (e.g., η=1 (a,b); η=2 (c,d); η=3 (e,f))

FIG. 27 shows the estimated PDFs (on the left) and the corresponding objective function (on the right) for different values of the η covariance scaling factor. The α parameter of equation 14 has been chosen each time for having a minimum of the objective function close to zero (i.e. it is close to the inverse of the maximum of the PDFs on the left). With η=1 the approximated PDF presents a lot of localized and narrow maxima. These translate into multiple narrow local minima into the corresponding objective function. As an example, the choice may fall on the estimates done with η=2 or η=3. Given the trial example, it does not seem reasonable to try to use higher values of η; noting that if higher values of η are desired, this fact could suggest that a higher number of neurons may be used to provide a better result via an ANN. In the example, the estimate was performed with η=2.

Figure 28:
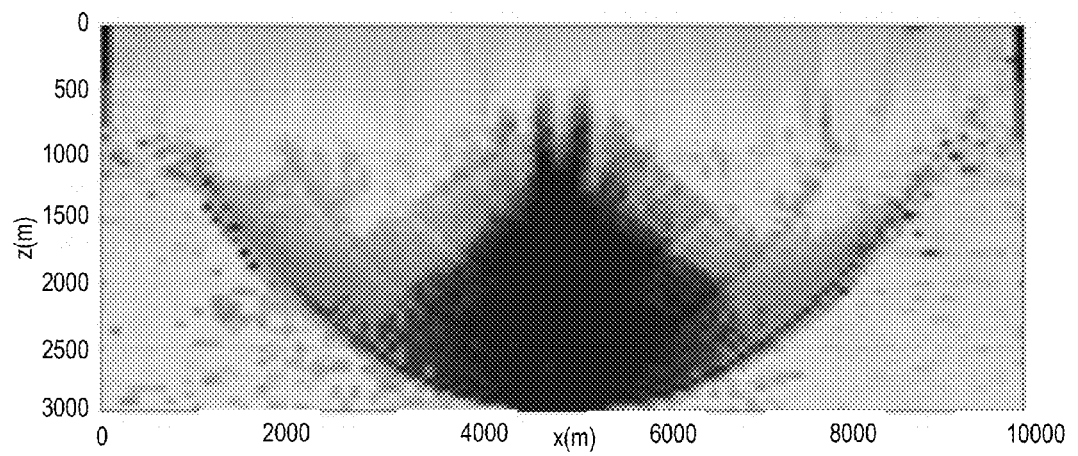
FIG. 28 illustrates examples of a cross-section at y=2500 m and a plan view at z=1000 m of an output velocity model from a simultaneous joint inversion (SJI) run.
Figure 28:
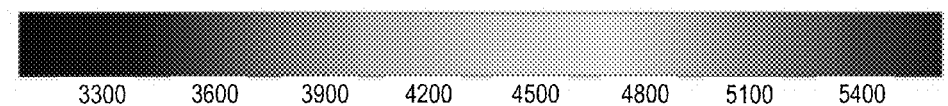
Figure 28:
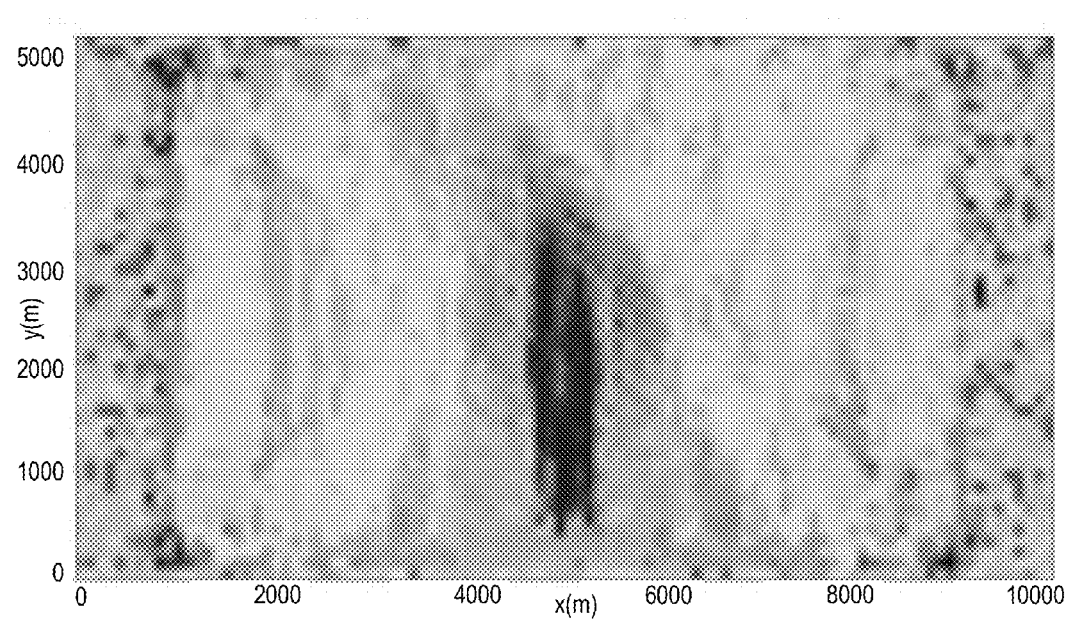
Figure 29:
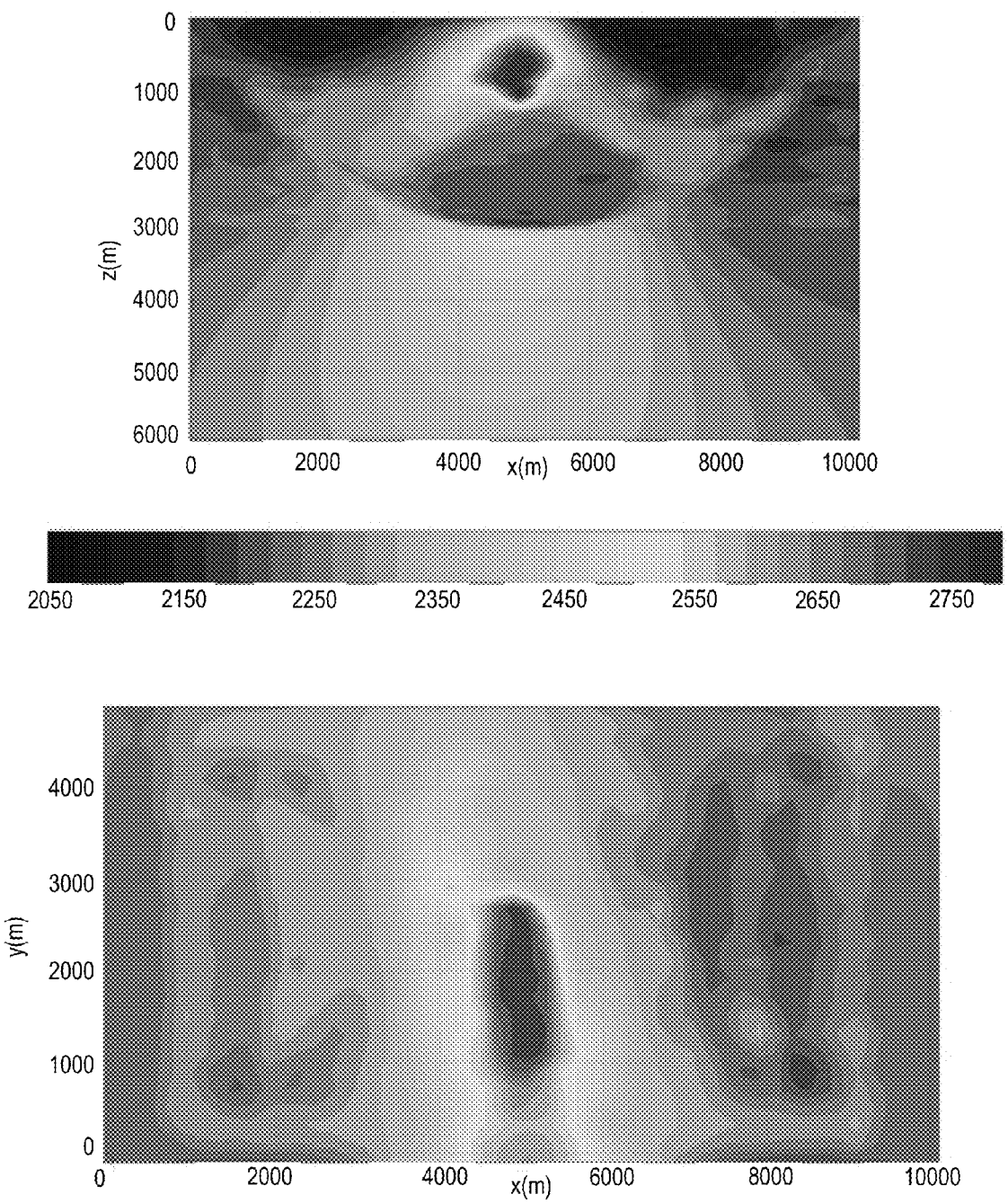
FIG. 29 illustrates examples of a cross-section at y=2500 m and a plan view at z=1000 m of an output density model from a simultaneous joint inversion (SJI) run.

FIG. 28 and FIG. 29 show the models produced by an SJI run with the link provided by the ANN. The velocity model presents a more detailed reconstruction of the fault with respect to the output of the single-domain, as it is evident from the plan view. Furthermore, the estimated velocity values are closer to the true ones in the regions where there is ray coverage.

Also the output density model of FIG. 29 presents enhanced features with respect to the result of the single-domain inversion: the dynamic of the signal is closer to the truth and the Gaussian-like structure and the fault are better defined. Furthermore, SJI has been able to better focus the bottom of this structure, as it is visible in the cross-section.

Figure 30:
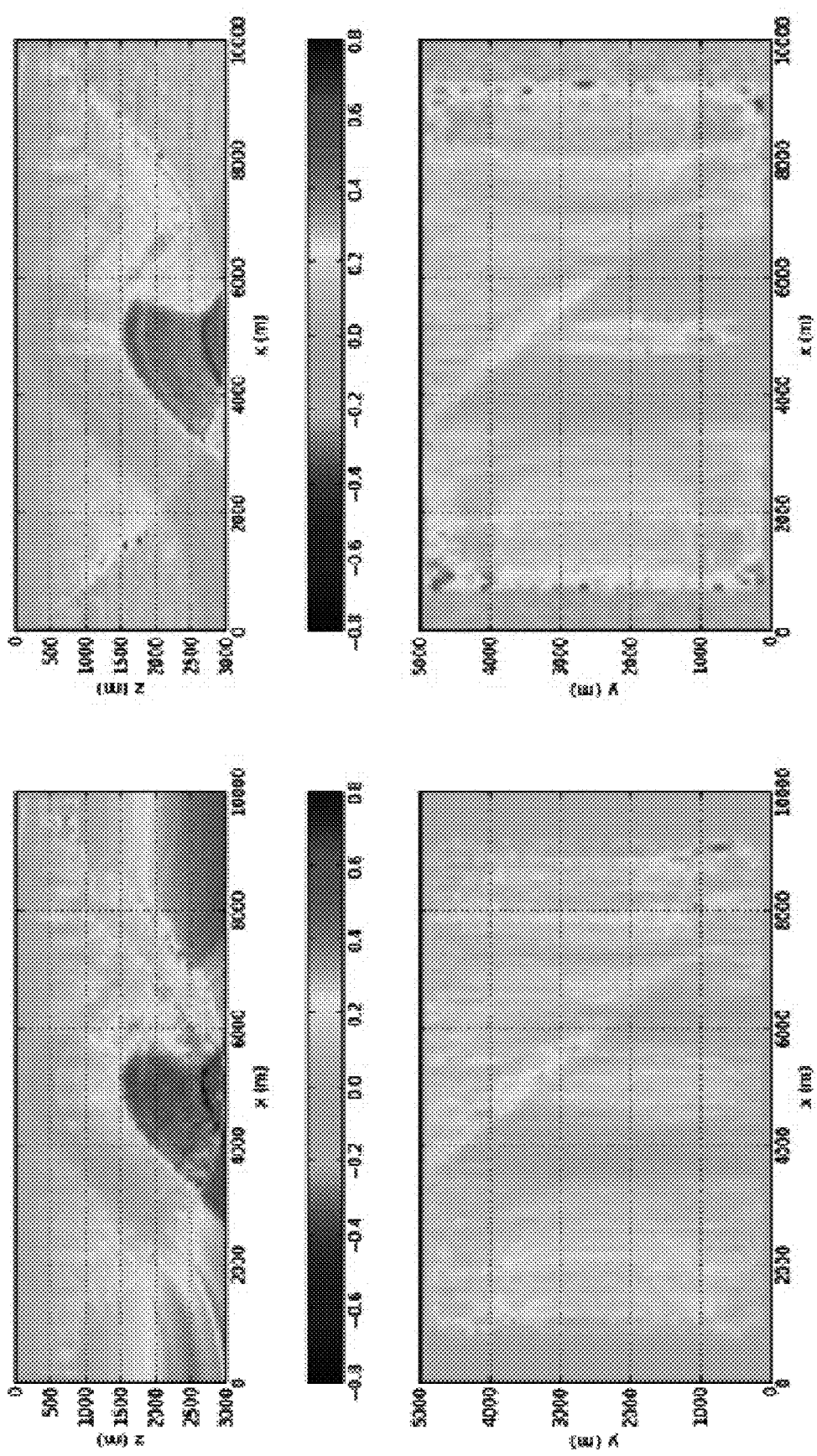
FIG. 30 illustrates examples of relative differences (inverted—true)/true for vP (left: single-domain; right: SJI; where the integral norm of these relative differences is 129.06 for the single-domain result and 85.06 for the SJI result)
Figure 31:
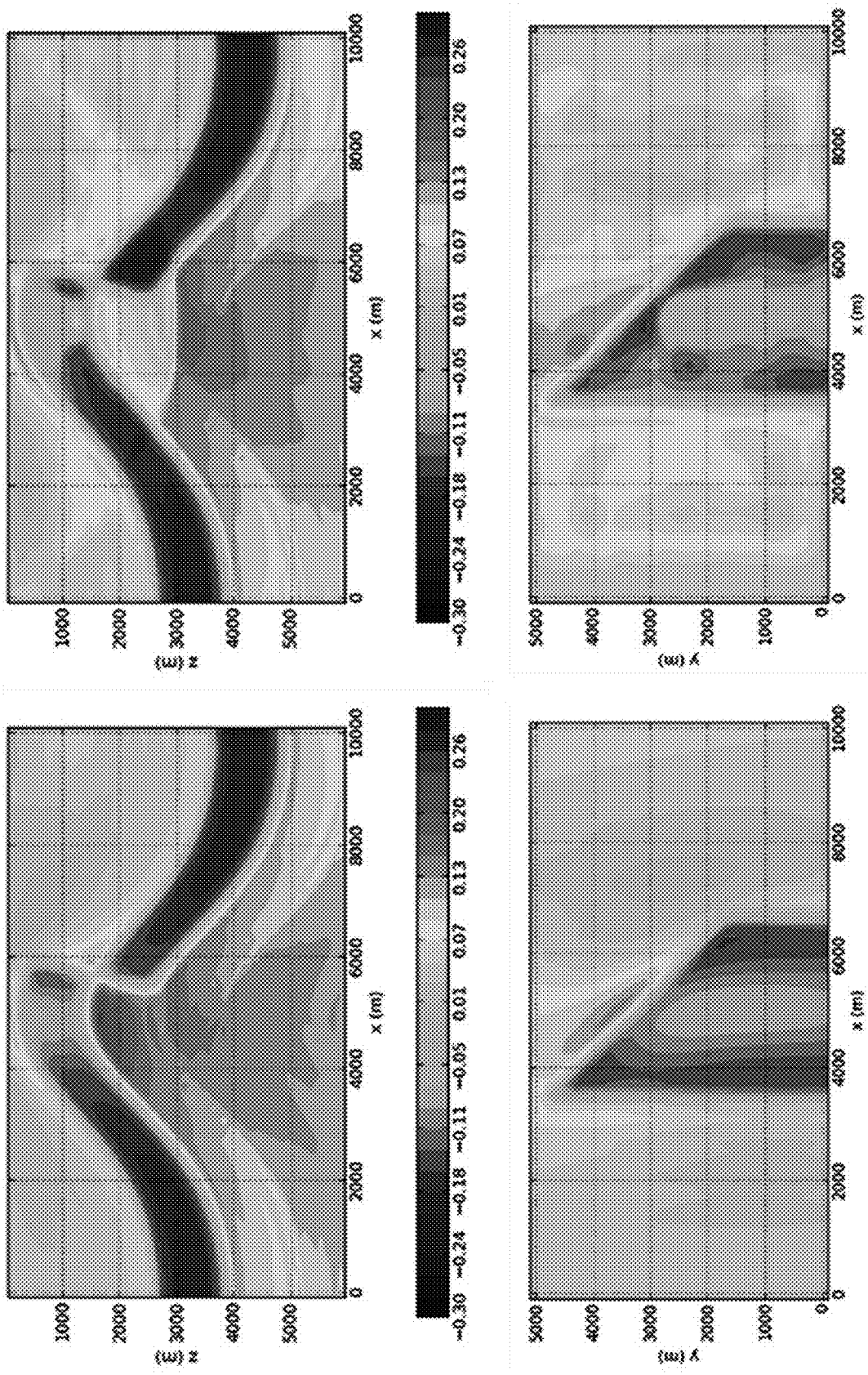
FIG. 31 illustrates examples of relative differences (inverted—true)/true for the density (left: single-domain; right: SJI; where the integral norm of these relative differences is 62.89 for the single-domain result and 62.12 for the SJI result)
Figure 32:
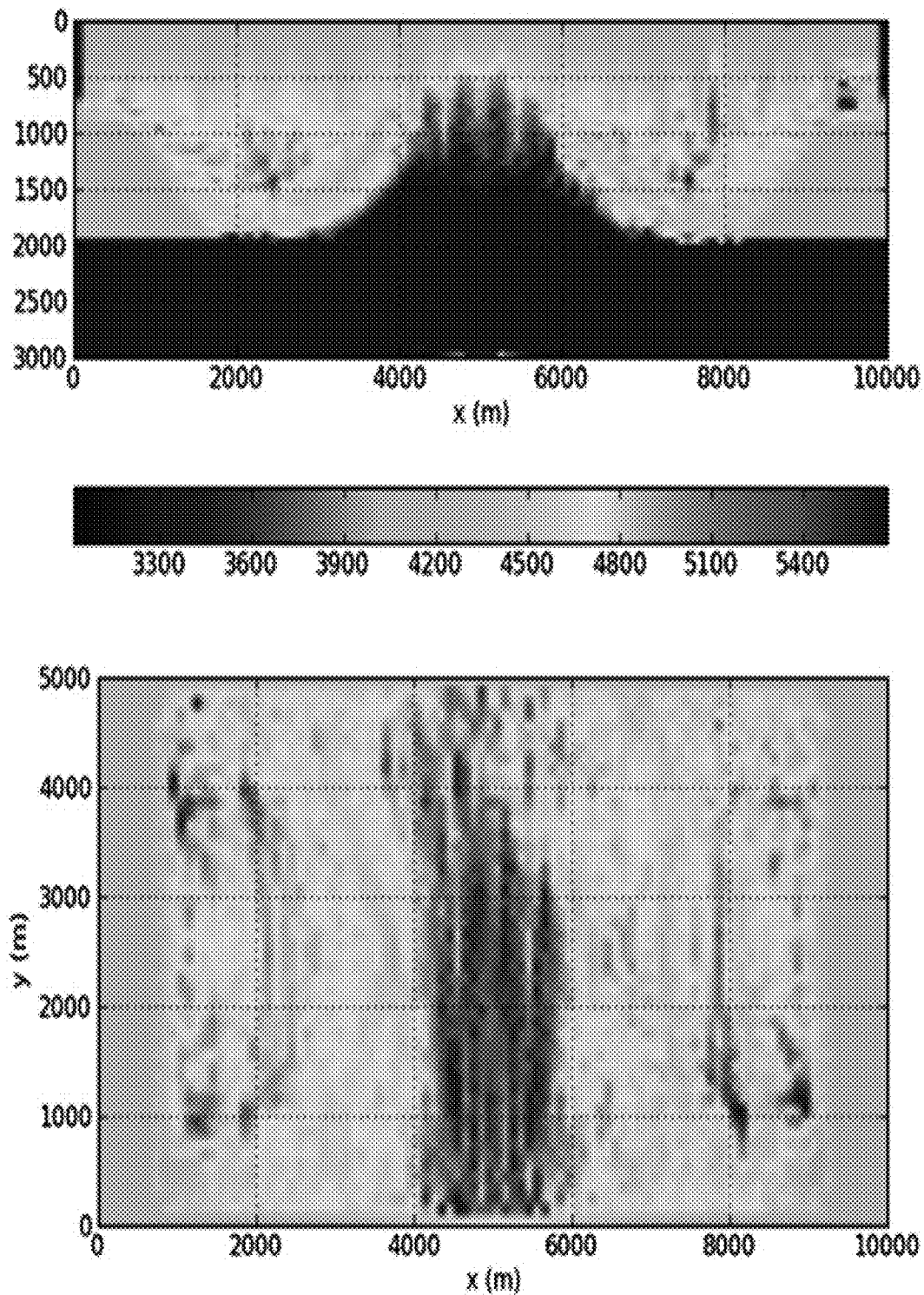
FIG. 32 illustrates examples of cross-section at y=2500 m and a plan view at z=1000 m of an output velocity model from a SJI run with a polynomial link.
Figure 33:
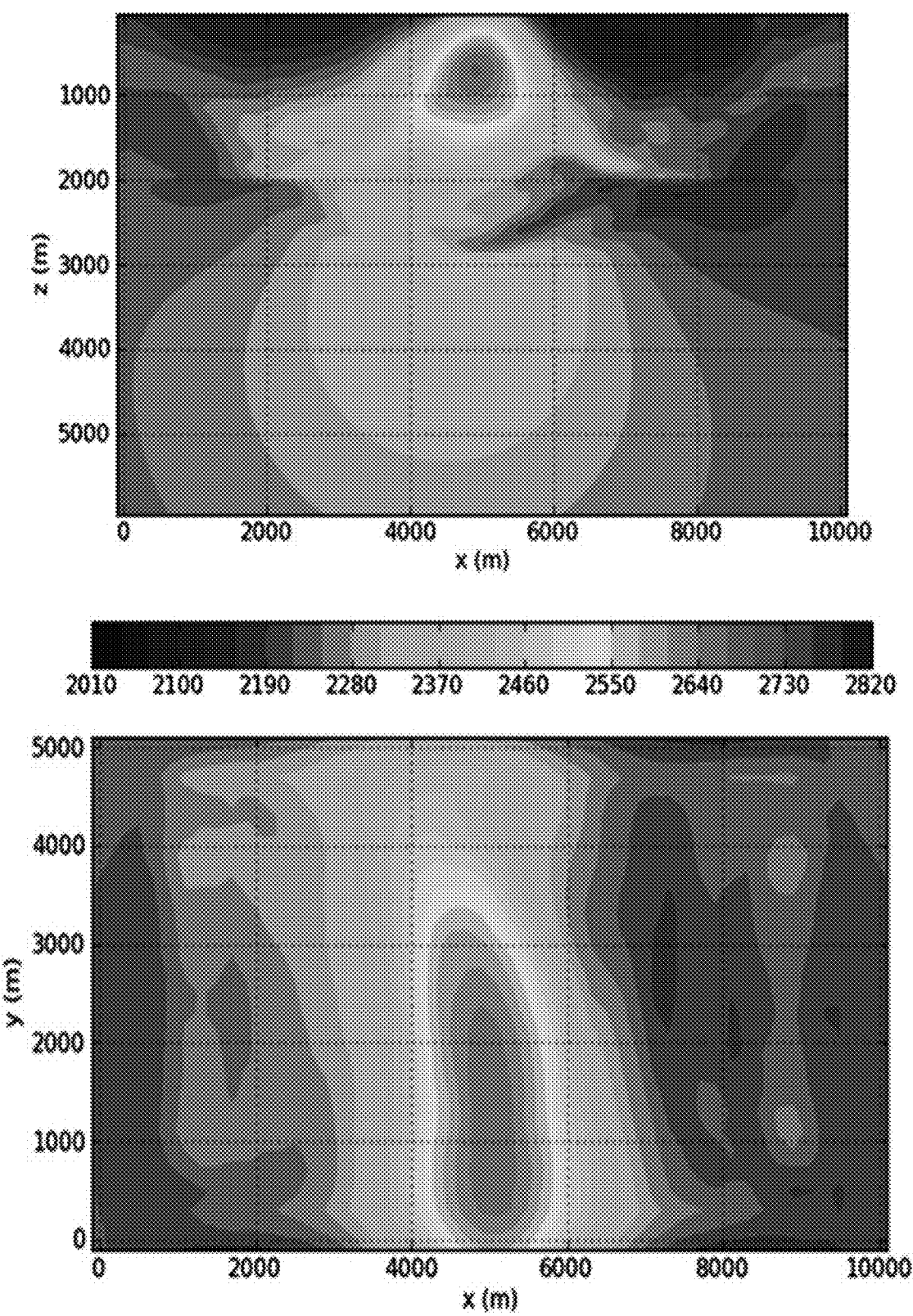
FIG. 33 illustrates examples of cross-section at y=2500 m and a plan view at z=1000 m of an output density model from a SJI run with a polynomial link.
Figure 34:
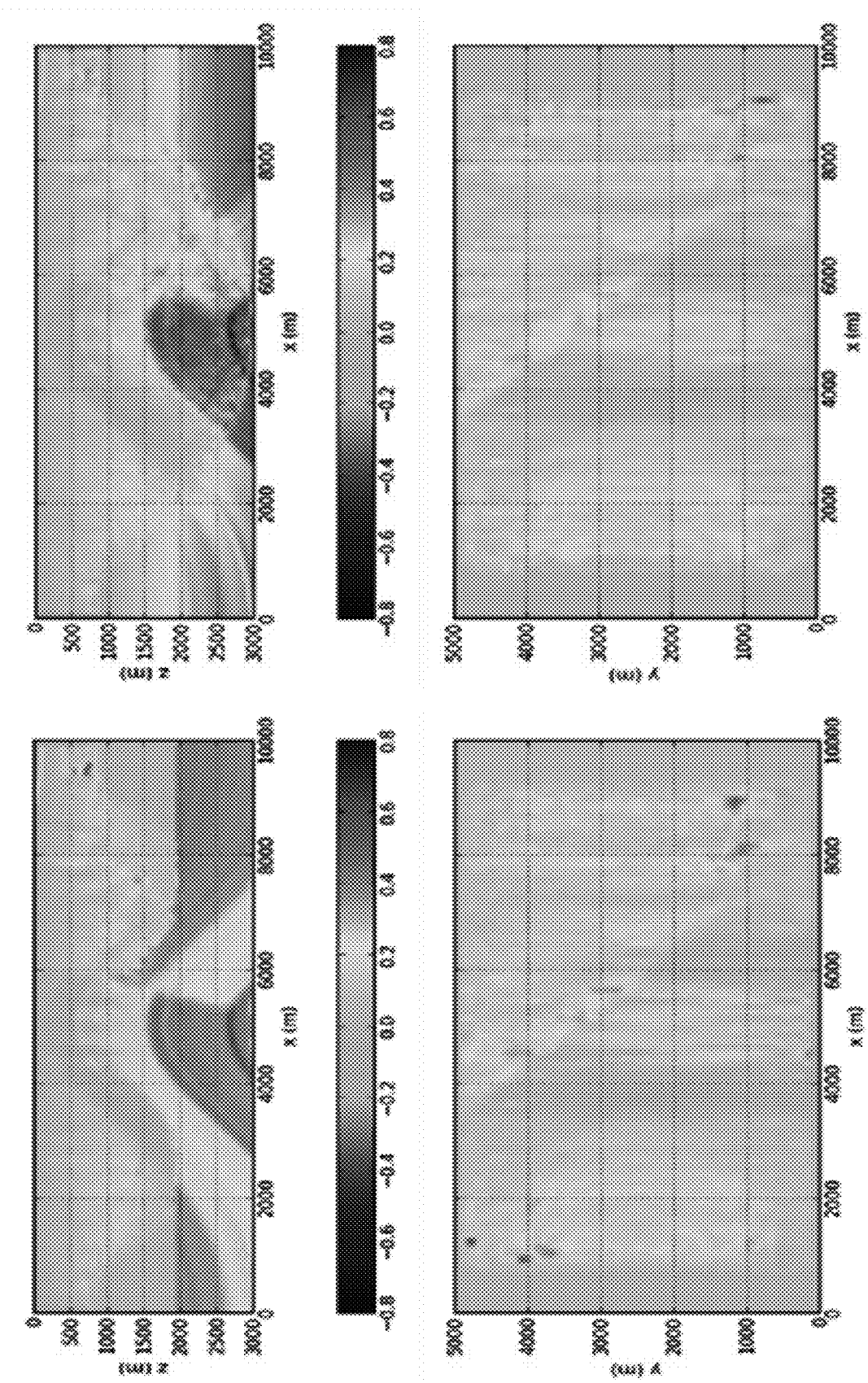
FIG. 34 illustrates examples of relative differences (inverted—true)/true for vP (left: single-domain; right: SJI with polynomial link; where the integral norm of these relative differences is 129.06 for the single-domain result and 120.60 for the SJI result)
Figure 35:
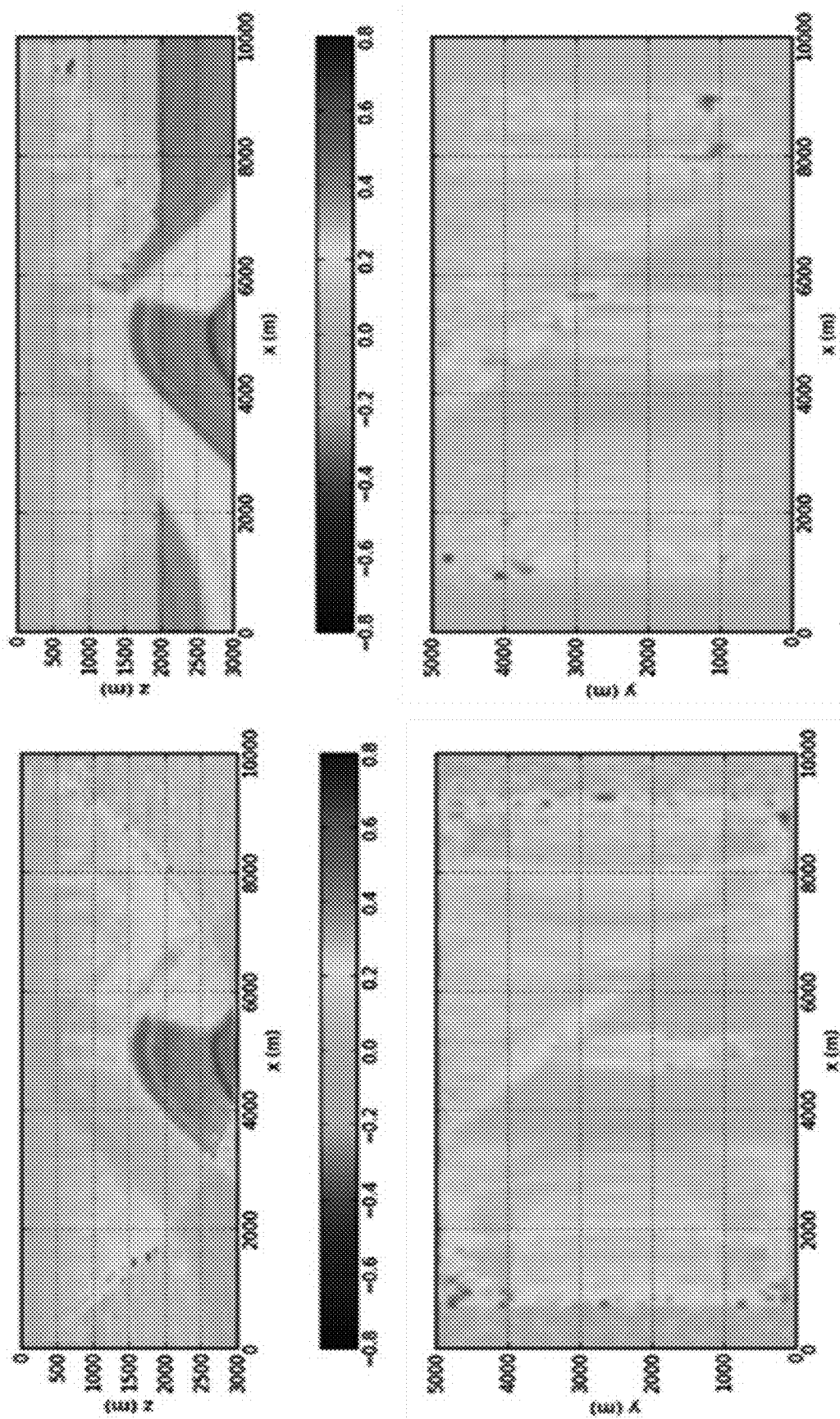
FIG. 35 illustrates examples of relative differences (inverted—true)/true for vP (left: SJI with ANN link; right: SJI with polynomial link)
Figure 36:
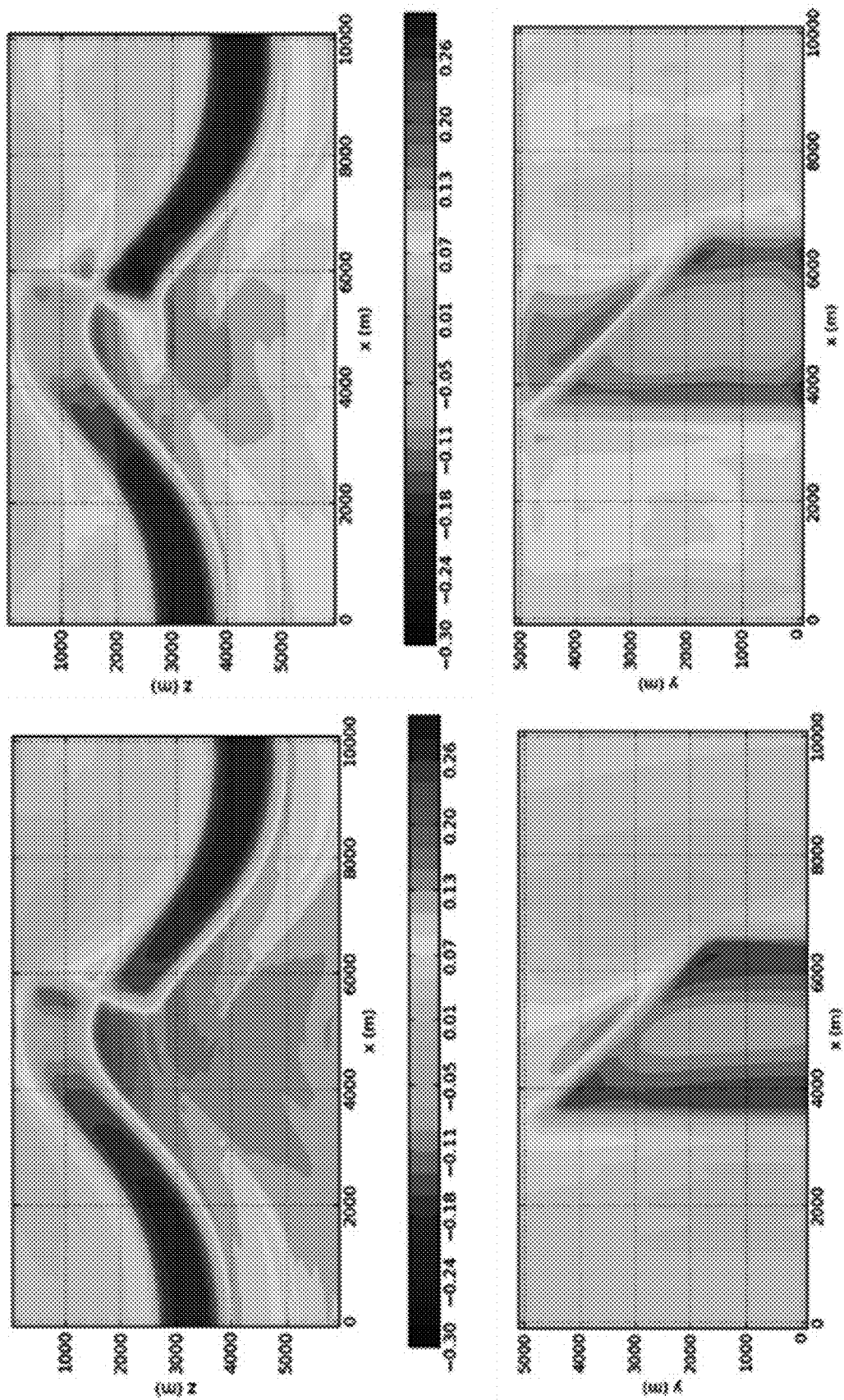
FIG. 36 illustrates examples of relative differences (inverted—true)/true for the density (left: single-domain; right: SJI with polynomial link; where the integral norm of these relative differences is 62.89 for the single-domain result and 60.35 for the SJI result)
Figure 37:
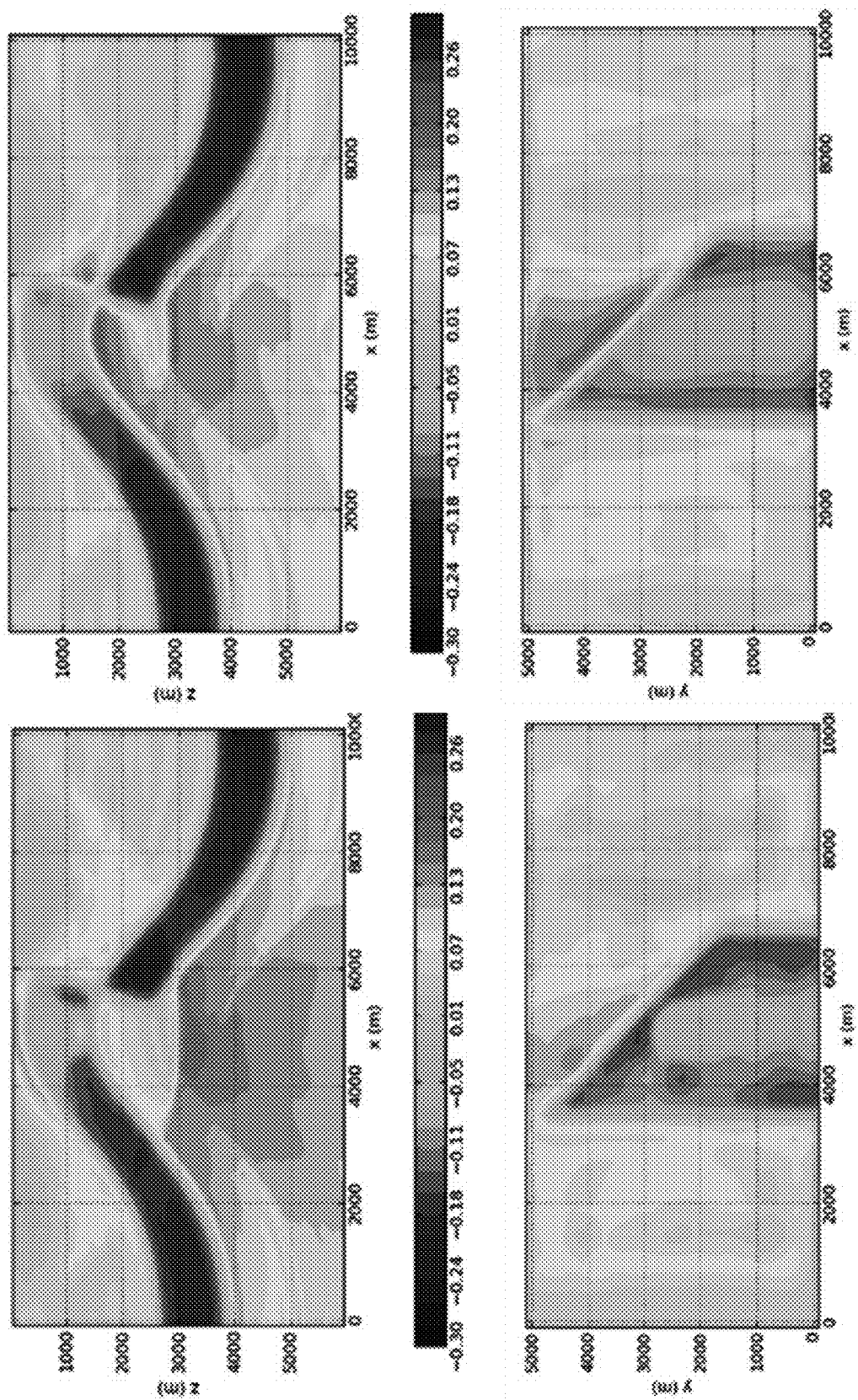
FIG. 37 illustrates examples of relative differences (inverted—true)/true for the density (left: SJI with ANN link; right: SJI with polynomial link)

The improvements obtained with the SJI result can be appreciated by examining the plots of FIG. 30 and FIG. 31.

These figures show the relative difference with respect to synthetic models, computed as (inverted—true)/true for the velocity and the density, both for the single-domain result and for the SJI result. A method may include computing the integral norm of the absolute and relative differences with respect to the true models. With integral norm of the difference, consider the $L_2$ norm of the difference between the models unwrapped to vectors (vectorized models).

For the velocity, an integral absolute norm of 545781.55 m/s was computed for the single domain result and of 355585.42 m/s for the SJI result. The corresponding integral norms for the relative differences are of 129.06 for the single-domain result and of 85.06 for the SJI result.

For the density, an integral absolute norm of 156548.25 kg/m$^3$ was computed for the single domain result and of 155815.12 kg/m$^3$ for the SJI result. The corresponding integral norms for the relative differences are of 62.89 for the single-domain result and of 62.11 for the SJI result.

As an example, the block 730 in FIG. 7 may be substituted by a block that provides the computation for a polynomial link. In such an example, the block 720 can perform the estimation of the polynomial coefficients. The estimation reduces to the solution of a linear system of equations (e.g., ill-conditioned by construction). A robust way of inverting this system is to use truncated singular value decomposition (SVD), which may be performed to estimate the coefficients of the polynomials as for the results shown in FIG. 22. As an example, a polynomial of fourth order may be used for performing the SJI.

Example results are shown in FIG. 32, FIG. 33, FIG. 34, FIG. 35, FIG. 36 and FIG. 37. Specifically, comparisons on the relative differences between the true model and the inverted model are shown. The integral norm of the absolute differences in this case is 510439.47 m/s for the velocity and 153154.76 kg/m$^3$ for the density. The corresponding integral norms of the relative differences are 120.60 for the velocity and 60.35 kg/m3 for the density.

Looking at these parameters, although the velocity obtained with the ANN link is more close to the synthetic one, density differs. On the other hand, carrying out the same computations restricting them to the intersection region between the density and velocity, one can see that the absolute integral norms are 510069.72 m/s for the velocity obtained with the polynomial link (relative integral norm of 120.51) and 355082.47 m/s for the velocity obtained with the ANN link (relative integral norm of 84.93). For the density the corresponding numbers are 124752.24 kg/m$^3$ for the density obtained using the polynomial link (relative integral norm of 51.18) and 124702.80 kg/m$^3$ for the density obtained using the ANN link (relative integral norm of 49.40). In such an example, a conclusion may be that in the intersection region, where the link is active, the ANN is more effective than the polynomial link. The slightly lower parameters obtained with the polynomial link for the density when considering the model are due to the sum of small effects present in regions where the link is not active. This conclusion is apparent from FIG. 37.

Figure 38:
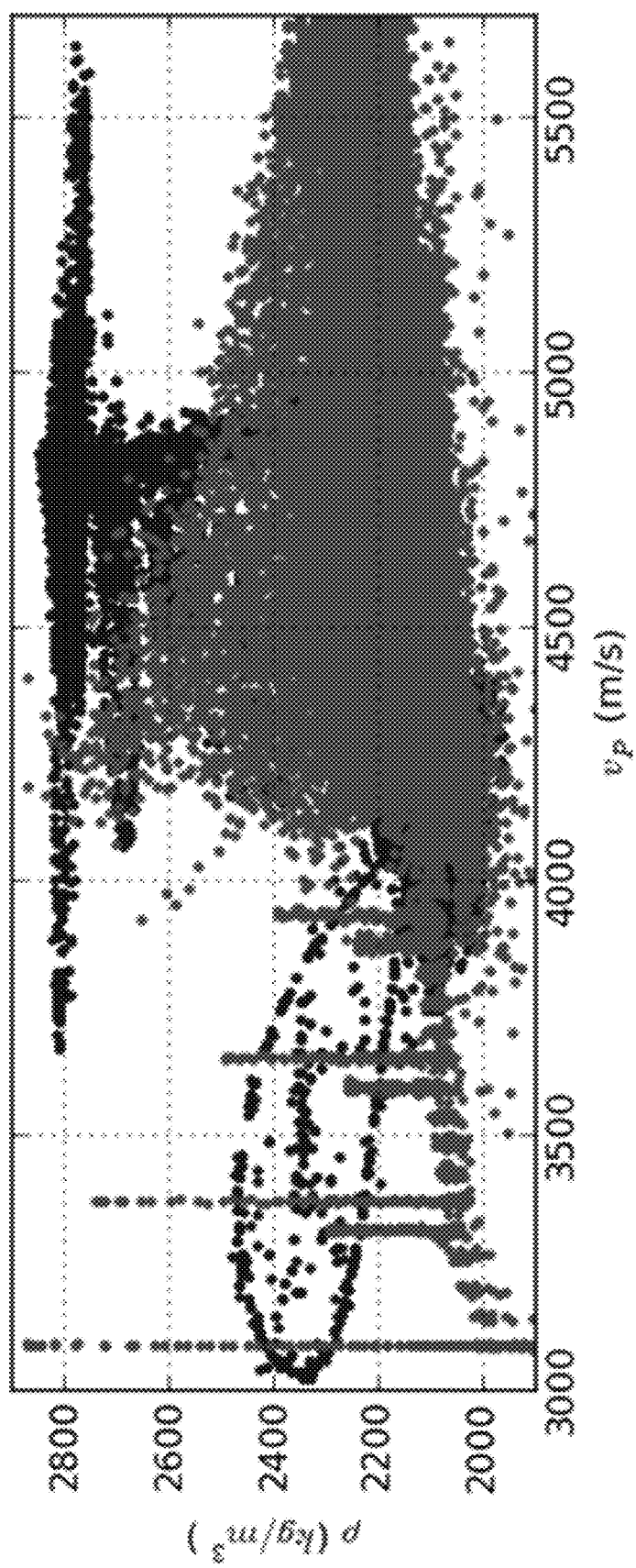
FIG. 38 illustrates an example of a velocity-density cross-plot where blue is the cross-plot of synthetic models and where red is the cross plot of properties estimated with single-domain inversions.
Figure 39:
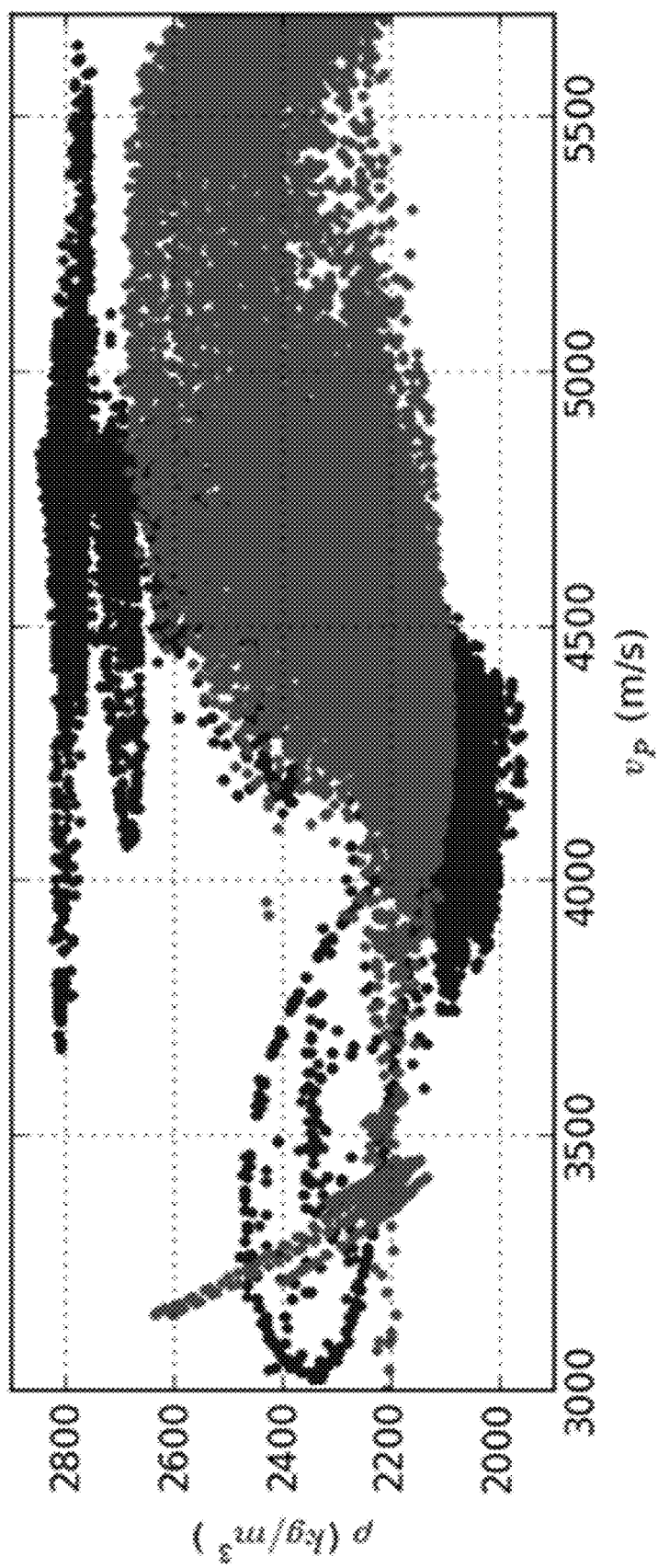
FIG. 39 illustrates an example of a velocity-density cross-plot where blue is the cross-plot of synthetic models and where red is the cross plot of properties estimated with the SJI using the polynomial link.
Figure 40:
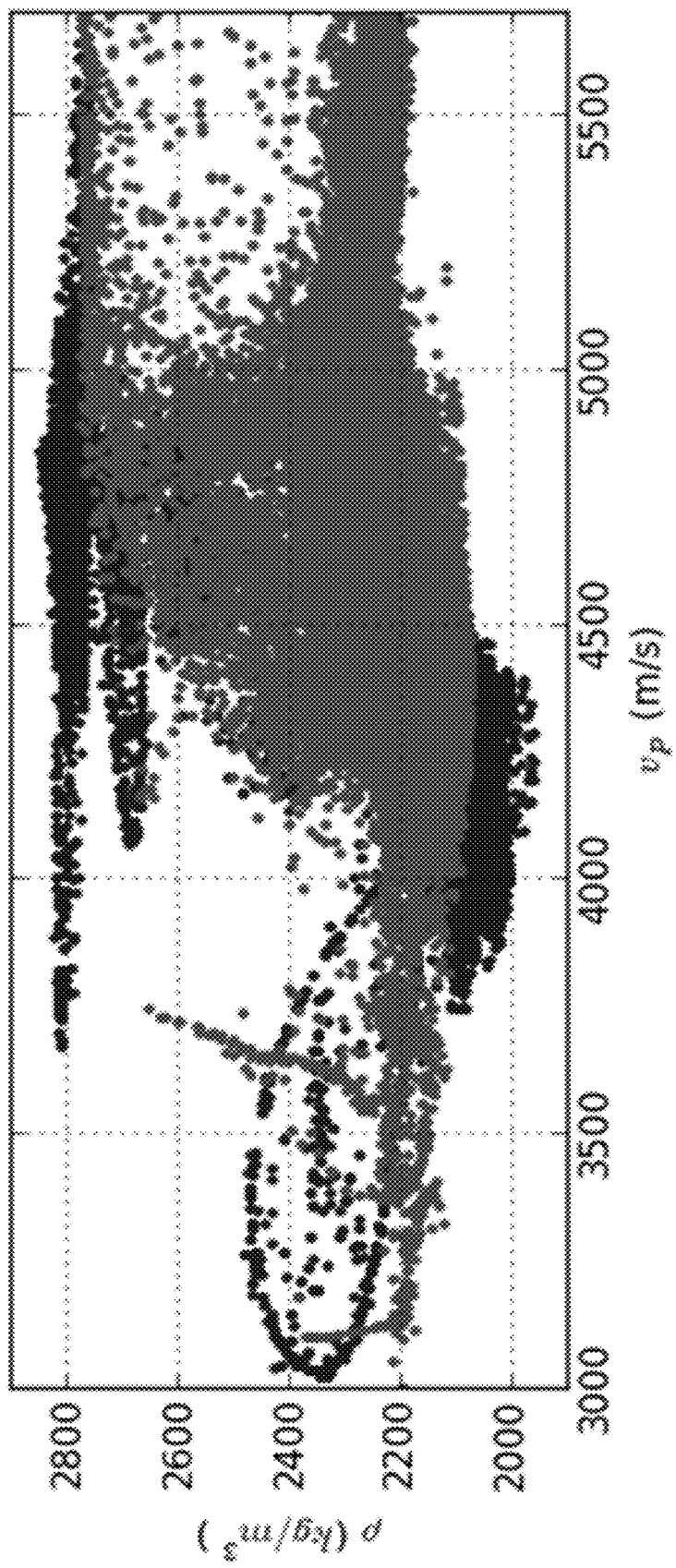
FIG. 40 illustrates an example of a velocity-density cross-plot where blue is the cross-plot of synthetic models and where red is the cross plot of properties estimated with the SJI using the ANN link.

FIG. 38, FIG. 39 and FIG. 40 show cross-plots of the inverted properties in the three cases of single-domain inversions, SJI using the polynomial link and SJI using the ANN link respectively. In these examples, the best fit with the cross-property distribution is achieved by the ANN link. The cross-plot for separate inversion shows relatively poor correlations between the inverted properties. The cross-plot for the polynomial link shows correlation artifacts where the polynomial was not able to fit the distribution, particularly on the left-hand and right hand sides of the cross-plot. Red points follow the shape of the polynomial in these regions (e.g., compare with FIG. 22).

Example Method

As an example, a method can include introducing a-priori knowledge in an SJI. An algorithm is shown to be able to estimate the correlation between two or more properties of the subsurface, for example, through a polynomial fit or through the estimation of the joint PDF of the properties by training a radial-basis function (RBF) ANN.

Example trial results indicated that the ANN may be more flexible and effective when compared to the polynomial link because the ANN can robustly adapt to various types of correlation patterns. The trial results confirm such conclusions showing an application of the technique to a synthetic dataset built using a real cross-property correlation pattern, coming from well-log measurements.

From visual and numerical assessment, the results obtained using the ANN revealed to be closer to the true models with respect to those obtained using the polynomial link. As an example, as an ANN can include one or more hidden layers of RBF neurons, its training algorithm can be relatively straightforward. As discussed, a training algorithm may be based on an unsupervised learning technique, which may be, for example, implemented in an automatic manner.

A method can include receiving data associated with a geologic environment; based on at least a portion of the data, estimating relationships for multiple properties of the geologic environment; and based at least in part on the relationships, performing simultaneous joint inversion for at least one property of the geologic environment. In such an example, the estimating relationships can include one or more of polynomial fitting of a cross-property pattern and training an artificial neural network (ANN).

As an example, a method can include estimating an a priori joint probability density function (PDF) of a plurality of properties. As an example, a method can include estimating an a priori joint probability density function (PDF) of a plurality of properties by training an artificial neural network (ANN). As an example, a method can include estimating an a priori joint probability density function (PDF) of a plurality of properties by training a radial-basis function (RBF) artificial neural network (ANN). As an example, a method can include estimating relationships by imposing a law that applies to at least a portion of multiple properties. As an example, a method can include estimating relationships by linking at least a portion of the multiple properties. As an example, estimating relationships can include establishing at least one link that links at least a portion of multiple properties.

As an example, a method can include estimating relationships at least in part by assigning geophysical property values to a hidden layer. As an example, a hidden layer may be a hidden layer of a network (e.g., a hidden layer of an artificial neural network). As an example, a method can include estimating at least in part information such as relationship information via a hidden layer governed by a tunable covariance matrix.

As an example, a system can include a processor; memory operatively coupled to the processor; and one or more modules that include processor-executable instructions stored in the memory to instruct the system to receive data associated with a geologic environment; based on at least a portion of the data, estimate relationships for multiple properties of the geologic environment; and based at least in part on the relationship, perform simultaneous joint inversion for at least one property of the geologic environment. In such an example, the instructions to instruct the system to perform simultaneous joint inversion for at least one property of the geologic environment can include SJI engine instructions, which may operate at least in part on one or more estimated relationships, linkages, etc. As an example, instructions to instruct a system to estimate relationships for multiple properties of the geologic environment can include artificial neural network instructions. As an example, a system may include artificial neural network circuitry where instructions to instruct the system to estimate relationships for multiple properties of the geologic environment include instructions that instruct the artificial neural network circuitry.

As an example, one or more computer-readable storage media can include computer-executable instructions to instruct a computer to: receive data associated with a geologic environment; based on at least a portion of the data, estimate relationships for multiple properties of the geologic environment; and based at least in part on the relationship, perform simultaneous joint inversion for at least one property of the geologic environment. In such an example, instructions can include instructions to receive seismic data and/or nonseismic data. As an example, one or more computer-readable storage media can include computer-executable instructions to train an artificial neural network, which may optionally be an artificial neural network implemented in circuitry (e.g., as electronic circuits).

As an example, a workflow may be associated with various computer-readable media (CRM) blocks (e.g., non-transitory media that are not carrier waves). Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more modules, for example, such as the one or more modules 270 of the system 250 of FIG. 2.

Figure 41:
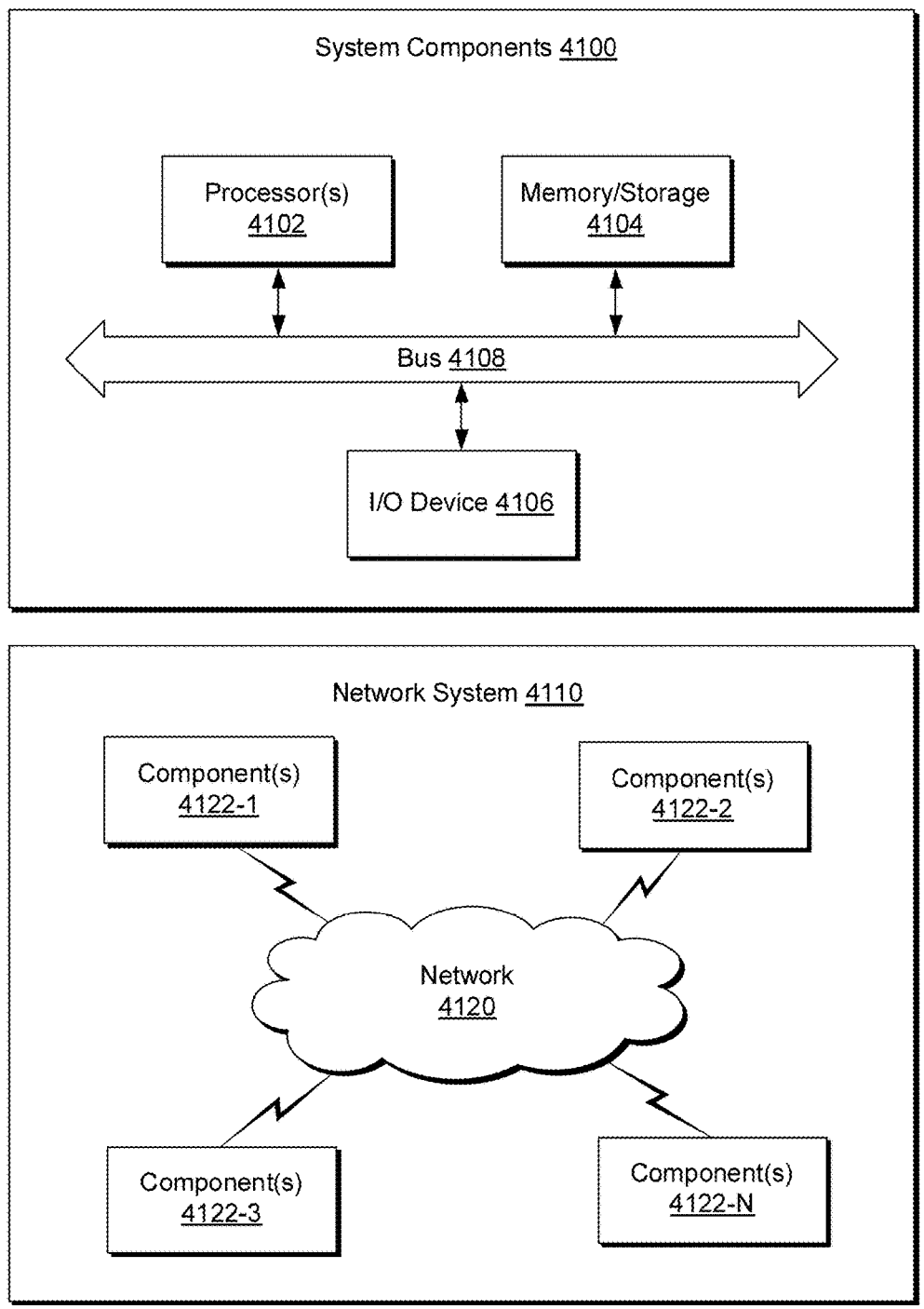
FIG. 41 illustrates example components of a system and a networked system.

FIG. 41 shows components of an example of a computing system 4100 and an example of a networked system 4110. The system 4100 includes one or more processors 4102, memory and/or storage components 4104, one or more input and/or output devices 4106 and a bus 4108. In an example embodiment, instructions may be stored in one or more computer-readable media (e.g., memory/storage components 4104). Such instructions may be read by one or more processors (e.g., the processor(s) 4102) via a communication bus (e.g., the bus 1908), which may be wired or wireless. The one or more processors may execute such instructions to implement (wholly or in part) one or more attributes (e.g., as part of a method). A user may view output from and interact with a process via an I/O device (e.g., the device 4106). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 4110. The network system 4110 includes components 4122-1, 4122-2, 4122-3, . . . 4122-N. For example, the components 4122-1 may include the processor(s) 1902 while the component(s) 4122-3 may include memory accessible by the processor(s) 4102. Further, the component(s) 4102-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A method comprising:
   training an artificial neural network based at least in part on clustered geologic property input values wherein the trained artificial neural network approximates at least one probability density function with a shape governed by a cross-property covariance matrix;
   receiving data for a geologic environment as acquired by field equipment;
   based on the data, estimating relationships for multiple properties of the geologic environment via the trained artificial neural network;
   based at least in part on the relationships, performing simultaneous joint inversion for at least one property of the geologic environment; and
   based at least in part on at least one of the at least one property, identifying a location of hydrocarbons in the geologic environment.

2. The method of claim 1 wherein the estimating relationships comprises polynomial fitting of a cross-property pattern.

3. The method of claim 1 wherein the estimating relationships comprises estimating an a priori joint probability density function (PDF) of a plurality of properties.

4. The method of claim 1 wherein the estimating relationships comprises estimating an a priori joint probability density function (PDF) of a plurality of properties by the trained artificial neural network (ANN).

5. The method of claim 1 wherein the trained artificial neural network (ANN) comprises a radial-basis function (RBF) artificial neural network and wherein the estimating relationships comprises estimating an a priori joint probability density function (PDF) of a plurality of properties by the trained radial-basis function (RBF) artificial neural network (ANN).

6. The method of claim 1 wherein estimating relationships comprises imposing a link relationship that applies to at least a portion of the multiple properties.

7. The method of claim 1 wherein the estimating relationships comprises linking at least a portion of the multiple properties.

8. The method of claim 1 wherein the estimating relationships comprises establishing at least one link that links at least a portion of the multiple properties.

9. The method of claim 1 wherein the estimating relationships comprises assigning geophysical property values to a hidden layer of the trained artificial neural network.

10. The method of claim 1 wherein the estimating comprises estimating at least in part via a hidden layer governed by the cross-property covariance matrix wherein the cross-property covariance matrix comprises a tunable cross-property covariance matrix.

11. The method of claim 1 comprising selecting the neurons via selecting cross-property data clusters from a plurality of cross-property data clusters.

12. A system comprising:
    a processor;
    memory operatively coupled to the processor; and
    processor-executable instructions stored in the memory to instruct the system to:
      train an artificial neural network based at least in part on clustered geologic property input values wherein the trained artificial neural network approximates at least one probability density function with a shape governed by a cross-property covariance matrix;
      receive data for a geologic environment as acquired by field equipment;
      based on the data, estimate relationships for multiple properties of the geologic environment via the trained artificial neural network;
      based at least in part on the relationship, perform simultaneous joint inversion for at least one property of the geologic environment; and based at least in part on at least one of the at least one property, identify a location of hydrocarbons in the geologic environment.

13. The system of claim 12 wherein the instructions to instruct the system to perform simultaneous joint inversion for at least one property of the geologic environment comprise simultaneous joint inversion (SJI) engine instructions.

14. The system of claim 12 wherein the instructions to instruct the system to estimate relationships for multiple properties of the geologic environment comprise artificial neural network instructions for the trained artificial neural network.

15. The system of claim 12 comprising artificial neural network circuitry wherein the instructions to instruct the system to estimate relationships for multiple properties of the geologic environment comprise instructions that instruct the artificial neural network circuitry for the trained artificial neural network.

16. One or more non-transitory computer-readable storage media comprising computer-executable instructions to instruct a computer to:
    train an artificial neural network based at least in part on clustered geologic property input values wherein the trained artificial neural network approximates at least one probability density function with a shape governed by a cross-property covariance matrix;
    receive data for a geologic environment as acquired by field equipment;
    based on the data, estimate relationships for multiple properties of the geologic environment via the trained artificial neural network;
    based at least in part on the relationship, perform simultaneous joint inversion for at least one property of the geologic environment; and
    based at least in part on at least one of the at least one property, identify a location of hydrocarbons in the geologic environment.

17. The one or more non-transitory computer-readable storage media of claim 16 comprising computer-executable instructions to receive seismic data and nonseismic data.

18. The one or more non-transitory computer-readable storage media of claim 16 comprising computer-executable instructions to select the neurons via selection of cross-property data clusters from a plurality of cross-property data clusters.

* * * * *